(12) United States Patent
Kasuga et al.

(10) Patent No.: US 8,732,316 B2
(45) Date of Patent: May 20, 2014

(54) COMMUNICATION SYSTEM

(75) Inventors: Kenji Kasuga, Tokyo (JP); Takuma Utsunomiya, Tokyo (JP); Shota Nakamura, Kawasaki (JP); Eri Kawai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 415 days.

(21) Appl. No.: 13/021,582

(22) Filed: Feb. 4, 2011

(65) Prior Publication Data

US 2012/0036269 A1 Feb. 9, 2012

(30) Foreign Application Priority Data

Mar. 31, 2010 (JP) ................................. 2010-081130

(51) Int. Cl.
*G06F 15/16* (2006.01)
*H04W 4/00* (2009.01)

(52) U.S. Cl.
USPC .......................................... 709/227; 370/338

(58) Field of Classification Search
USPC .................. 709/227–228; 370/331, 352, 338; 434/350
See application file for complete search history.

(56) References Cited

U.S. PATENT DOCUMENTS

| | | | | |
|---|---|---|---|---|
| 2004/0153549 A1* | 8/2004 | Naito et al. | ................... | 709/228 |
| 2004/0243712 A1* | 12/2004 | Sakai et al. | ................... | 709/227 |
| 2008/0071914 A1 | 3/2008 | Kimura et al. | | |
| 2008/0118905 A1* | 5/2008 | Itou | ............................... | 434/350 |
| 2009/0164645 A1* | 6/2009 | Sylvain | ......................... | 709/228 |
| 2009/0300189 A1* | 12/2009 | Takeda et al. | ................. | 709/227 |
| 2009/0310595 A1* | 12/2009 | Badger | ......................... | 370/352 |
| 2012/0014356 A1* | 1/2012 | Mutikainen et al. | .......... | 370/331 |

FOREIGN PATENT DOCUMENTS

| JP | 2008-078878 | 4/2008 |
|---|---|---|
| JP | 2010-010892 A | 1/2010 |

OTHER PUBLICATIONS

Rosenberg J., et al.; Best Current Practices for Third Party Call Control (3pcc) in the Sessin Initiation Protocol (SIP); Network Working Group, Request for Comments: 3725, Apr. 2004; pp. 1-27.
Sparks, R.; The Session Initiation Protocol (SIP) Refer Method; Network Working Group, Request for Comments: 3515; Apr. 2003; pp. 1-20.

* cited by examiner

*Primary Examiner* — Jungwon Chang
(74) *Attorney, Agent, or Firm* — Foley & Lardner LLP

(57) ABSTRACT

One of objects is to reduce a load in a session management and relay process on an SOAP-SIP adaptor for providing a 3PCC service. The SOAP-SIP adaptor (hereinafter the adaptor) receives a connection request message between a first terminal and a second terminal from a Web server, and establishes the sessions with each of the first terminal and the second terminal. After establishing the sessions with each of the first terminal and the second terminal, the adaptor sends a transfer request (REFER) of session to a call control device. Thereafter, the call control device manages session between the first terminal and the second terminal each having established the session with the adaptor.

17 Claims, 62 Drawing Sheets

| | 2010_1 ... 2010_n | |
|---|---|---|
| sessionID | 123456 | |
| SESSION STATE | CONNECTED | |
| CALL PARTICIPANT STATE | ※ FIG. 3B | |
| TERMINAL INFORMATION (FOR CLIENT A) | ※ FIG. 3C | |
| TERMINAL INFORMATION (FOR CLIENT B) | ※ FIG. 3C | |

FIG. 3A

| | 2020 | 2020_A | 2020_B |
|---|---|---|---|
| 2021 | URI | sip:2222222222@clientA.com | sip:3333333333@clientB.com |
| 2022 | CALL STATE | CallParticipantConnected | CallParticipantConnected |
| 2023 | START TIME | 2008.10.22 10:30.30 | 2008.10.22 10:30.45 |

FIG. 3B

| | | 2030_A | 2030_B |
|---|---|---|---|
| 2031 | HANDLE VALUE | 987654 | 765432 |
| 2032 | sessionID | 123456 | 123456 |
| 2033 | TERMINAL STATE | CallComplete | CallComplete |
| 2034 | ROLE | UA-A | UA-B |
| 2035 | SEND SDP INFORMATION | ....<br>10.0.1.1  10000 | ....<br>10.0.1.1  10000 |
| 2036 | RECV SDP INFORMATION | ....<br>10.0.2.1  20000 | ....<br>10.0.2.2  30000 |
| 2037 | FROM URI | sip:1111111111@SSA.com | sip:1111111111@SSA.com |
| 2038 | TO URI | sip:2222222222@clientA.com | sip:3333333333@clientB.com |

FIG. 3C

| | 2040 | 2040_1 ... 2040_n |
|---|---|---|
| 2041 | sessionID | 123456 |
| 2042 | MEDIA STREAM SENDING/RECEIVING IP ADDRESS | 10.0.1.1 |
| 2043 | MEDIA STREAM SENDING/RECEIVING PORT NUMBER | 10000 |
| 2044 | PARTNER IP ADDRESS 1 | 10.0.2.1 |
| 2045 | PARTNER PORT NUMBER 1 | 20000 |
| 2046 | PARTNER IP ADDRESS 2 | 10.0.2.2 |
| 2047 | PARTNER PORT NUMBER 2 | 30000 |

FIG. 3D

| | 5020 | 5020_1 | ... | 5020_n |
|---|---|---|---|---|
| HANDLE VALUE | 987654 | | | |
| connectionID | 123456 | | | |
| TERMINAL STATE | CallComplete | | | |
| SEND SDP INFORMATION | .... 10.0.1.1 10000 | | | |
| RECV SDP INFORMATION | .... 10.0.2.1 20000 | | | |
| FROM URI | sip:2222@SSA.com | | | |
| TO URI | sip:1111@SSA.com | | | |

FIG. 6B

| | 5030 | 5030_1 ... | 5030_n |
|---|---|---|---|
| | connectionID | 123456 | |
| 5031 | MEDIA STREAM SENDING/RECEIVING IP ADDRESS | 10.0.1.1 | |
| 5032 | MEDIA STREAM SENDING/RECEIVING PORT NUMBER | 10000 | |
| 5033 | PARTNER IP ADDRESS 1 | 10.0.2.1 | |
| 5034 | PARTNER PORT NUMBER 1 | 20000 | |
| 5035 | PARTNER IP ADDRESS 2 | 192.168.10.1 | |
| 5036 | PARTNER PORT NUMBER 2 | 30000 | |
| 5037 | | | |

FIG. 6C

| | 6020 | 6020_1 | ... | 6020_n |
|---|---|---|---|---|
| HANDLE VALUE | 345678 | | | |
| connectionID | 987654 | | | |
| TERMINAL STATE | CallComplete | | | |
| SEND SDP INFORMATION | .... 10.0.2.1 20000 | | | |
| RECV SDP INFORMATION | .... 10.0.1.1 10000 | | | |
| FROM URI | sip:1111@SSA.com | | | |
| TO URI | sip:2222@SSA.com | | | |

FIG. 21B

| | 6030 | 6030_1 | ... | 6030_n |
|---|---|---|---|---|
| | connectionID | 987654 | | |
| 6031 | MEDIA STREAM SENDING/RECEIVING IP ADDRESS | 10.0.2.1 | | |
| 6032 | MEDIA STREAM SENDING/RECEIVING PORT NUMBER | 20000 | | |
| 6033 | PARTNER IP ADDRESS 1 | 10.0.1.1 | | |
| 6034 | PARTNER PORT NUMBER 1 | 10000 | | |
| 6035 | PARTNER IP ADDRESS 2 | 192.168.10.2 | | |
| 6036 | PARTNER PORT NUMBER 2 | 40000 | | |

COMMUNICATION SYSTEM

CLAIM OF PRIORITY

The present application claims priority from Japanese patent application JP 2010-081130 filed on Mar. 31, 2010, the contents of which are hereby incorporated by reference into this application.

BACKGROUND OF THE INVENTION

1. Field of the Invention

The present invention relates to a communication system, and more particularly to a communication system of a point-to-point connection method under the third party call control.

2. Description of the Related Art

In recent years, the next generation communication networks have been actively examined by communication carriers using the Internet Protocol (IP) technology. This kind of next generation communication networks is called a Next Generation Network (NGN). In the NGN, a method for establishing a session between the server and the client trying to make the communication, and managing a band for each session is often used. Also, in the NGN, a session control protocol for use to secure the band is the Session Initiation Protocol (SIP), for example.

Also, there was disclosed a technique in which when a client device without mounting a band initiation session control protocol communicates over a band security network, a session alternate device establishes a band initiation session within the band security network, instead of the client device (e.g., refer to JP-A-2008-78878).

Also, the Simple Object Access Protocol (SOAP) for exchanging information between the applications is well known.

Also, a 3rd Party Call Control, call control by third party (3PCC) was disclosed in RFC3725, and a REFER method of SIP was disclosed in RFC3515, for example.

SUMMARY OF THE INVENTION

In the NGN, it is required that the IP address for establishing a signaling channel and the IP address for establishing a data channel are the same. Therefore, there is a problem that the alternate establishment of the data channel between two parties (first connection terminal and second connection terminal) to communicate is impossible as in the conventional 3rd Party Call Control (3PCC) service flow. Also, in the 3PCC service flow, there is a problem that when the speech communication is made between the first connection terminal and the second connection terminal after the session between a device mounting the 3PCC and the first connection terminal is firstly established, and then the session between the device mounting the 3PCC and the second connection terminal is established, the first connection terminal becomes silent at a stage where the establishment of session with the first connection terminal is completed, and the establishment of session with the second connection terminal is started. Also, most of the existent application terminals do not mount the SIP for securing the communication band in the NGN, whereby there is a problem that the communication on the NGN is impossible.

Also, there is a problem that if the number of sessions to be managed by the device mounting the 3PCC increases, the load of the device is larger.

In the light of the above-mentioned problems, it is an object of the invention to reduce a load in a session management and relay process on an SOAP-SIP adaptor for providing a 3PCC service. Also, it is another object of the invention to enable the SOAP-SIP adaptor to coordinate the communication between the terminals if the communication condition between the terminals is different.

According to the first solving means of this invention, there is provided a communication system comprising:

a server for receiving a connection request message between a first terminal and a second terminal from an upper-level apparatus, and establishing a session with the first terminal and a session with the second terminal respectively; and a call control device for managing a session between the first terminal and the second terminal;

wherein the server, after establishing sessions with each of the first terminal and the second terminal, sends a transfer request of session to the call control device, and thereafter the call control device manages the session between the first terminal and the second terminal each having established the session with the server.

With the first solving means, the load of the SOAP-SIP adaptor can be reduced. For example, the number of INVITE sessions to be managed in the SOAP-SIP adaptor can be cut down. Also, the load of a relay process of media in the SOAP-SIP adaptor can be reduced. Also, if a call control device acts for a transfer function, even the terminal having no REFER and INVITE (replaces) function can make the transfer.

In the communication system described above, the server may extract predetermined key information from data received in a process for establishing the sessions with the first and second terminals, and judge whether to perform a media relay by the server itself or to hand over a management of session to the call connection device, based on the key information;

send the transfer request to the call control device, if it is judged to hand over the management of session to the call connection device; and relay the media information between the first and second terminals after making a predetermined conversion or an additional service for the media information, using the sessions established with the first terminal and the second terminal, if it is judged to perform the media relay by the server itself.

In this case, the communication for providing a specific service is specified, in which for this communication, a process coping with the relevant service can be performed via the SOAP-SIP adaptor, while for the communication not providing the specific service, the management of session is transferred to the call control device to reduce the load, and efficiently utilize the processing resources in the SOAP-SIP adaptor.

According to the second solving means of this invention, there is provided a communication system for communicating between a first terminal and a second terminal, the communication system comprising a server for receiving a connection request message between the first terminal and the second terminal from an upper-level apparatus and establishing a session with the first terminal and a session with the second terminal, wherein the server acquires each communication condition information including codec identification information of media information received by the first and second terminals each having established the session;

judges a codec of the media information received by the first and second terminals, based on acquired communication condition information; and decides the codec for use in accordance with a judgment result to notify decided codec to the first terminal and/or the second terminal.

In the communication system described above, the server may transmit a connection request including one or more pieces of predetermined first communication condition information to the first terminal;

receive a connection response including second communication condition information receivable by the first terminal, which is selected from the first communication condition information by the first terminal;

transmit a connection request including third communication condition information created based on the second communication condition information to the second terminal;

receive a connection response including fourth communication condition information receivable by the second terminal, which is selected from the third communication condition information by the second terminal; and decide the codec for use from the fourth communication condition information to notify the first terminal of decided codec.

According to the third solving means of this invention, there is provided a communication system for communicating between a first terminal and a second terminal, the communication system comprising a server for receiving a connection request message between the first terminal and the second terminal from an upper-level apparatus and establishing a session with the first terminal and a session with the second terminal, wherein the server acquires each communication condition information including codec identification information of media information received by the first and second terminals each having established the session;

collates acquired communication condition information of each first and second terminal; and converts a codec of the media information sent or received by the first and second terminals so that the codec corresponds to collation result.

With the third solving means, if the communication condition between the terminals is different, the SOAP-SIP adaptor can coordinate the communication between the terminals.

According to the invention, it is possible to reduce a load in a session management and relay process on an SOAP-SIP adaptor for providing a 3PCC service. Also, according to the invention, it is possible to enable the SOAP-SIP adaptor to coordinate the communication between the terminals if the communication condition between the terminals is different.

BRIEF DESCRIPTION OF THE DRAWINGS

FIG. 3A is an explanatory view showing one example of the organization of a session information table 2010 in the SOAP-SIP adaptor 2 according to the first embodiment.

FIG. 3B is an explanatory view showing one example of the organization of a call participants information table 2020 in the SOAP-SIP adaptor 2 according to the first embodiment.

FIG. 3C is an explanatory view showing one example of the organization of a terminal information table 2030 in the SOAP-SIP adaptor 2 according to the first embodiment.

FIG. 3D is an explanatory view showing one example of the organization of a media stream control information table 2040 in the SOAP-SIP adaptor 2 according to the first embodiment.

FIG. 6B is an explanatory view showing one example of the organization of a terminal information table 5020 in the SOAP-SIP adaptor 6a according to the second embodiment.

FIG. 6C is an explanatory view showing one example of the organization of a media stream control information table 5030 in the SOAP-SIP adaptor 6a according to the second embodiment.

FIG. 21B is an explanatory view showing one example of the organization of a terminal information table 6020 in the SOAP-SIP adaptor 6b according to the second embodiment.

FIG. 21C is an explanatory view showing one example of the organization of a media stream control information table 6030 in the SOAP-SIP adaptor 6b according to the second embodiment.

DETAILED DESCRIPTION OF THE PREFERRED EMBODIMENTS

1. First Embodiment
(Network Configuration)

Figure 1:
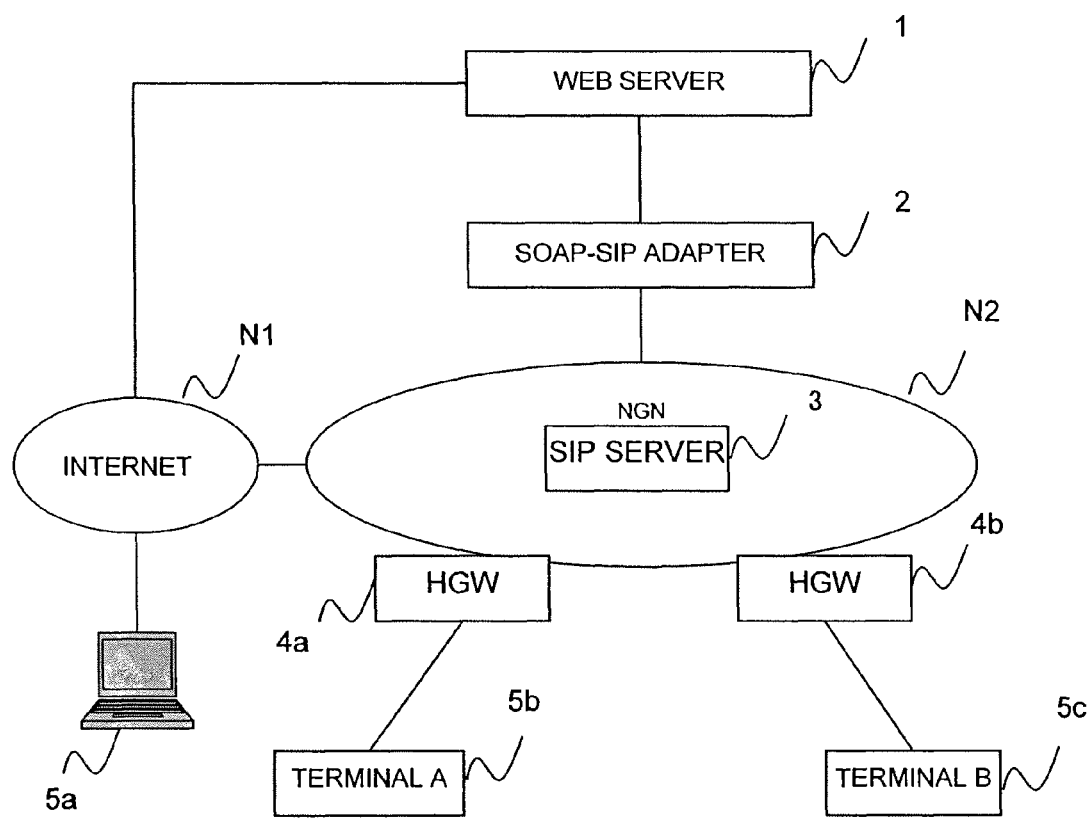
FIG. 1 is an explanatory view showing a configuration example of a communication network according to a first embodiment.

FIG. 1 is an explanatory view showing a configuration example of a communication network according to a first embodiment.

This communication network (system) includes a Web server 1, an SOAP-SIP adaptor 2, an SIP server 3, and Home Gateways (HGWs) 4a and 4b, for example. The SIP server 3 is installed in an NGN N2, for example.

The Web server 1 communicates with the SOAP-SIP adaptor 2. Also, the Web server 1 communicates with a terminal 5a via a network such as an Internet N1. The SOAP-SIP adaptor 2 communicates with a terminal A5b via the NGN N2 and the HGW 4a. Also, the SOAP-SIP adaptor 2 and a terminal B5c communicate in the same way.

Figure 2:
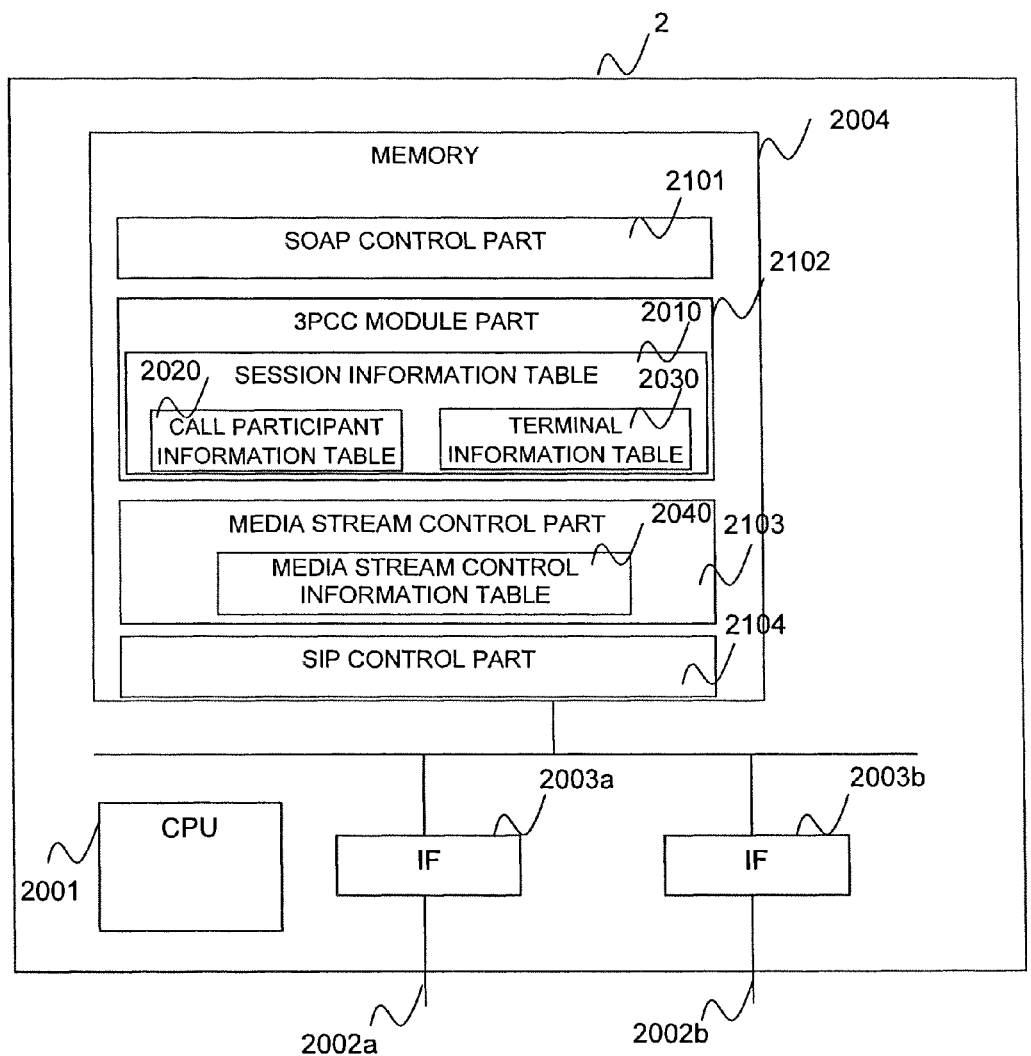
FIG. 2 is an explanatory view showing a configuration example of an SOAP-SIP adaptor 2 according to the first embodiment.

FIG. 2 is an explanatory view showing a configuration example of the SOAP-SIP adaptor 2 according to the first embodiment.

The SOAP-SIP adaptor 2 includes a processor (hereinafter CPU) 2001, the interfaces (hereinafter IFs) 2003a and 2003b, and a memory 2004, for example. The memory 2004 has an SOAP control part 2101, a 3PCC module part 2102, a media stream control part 2103, and an SIP control part 2104. The 3PCC module part 2102 has a session information table 2010, and the media stream control part 2103 has a media stream control information table 2040. The session information table 2010 has a call participants information table 2020 and a terminal information table 2030.

The CPU 2001 performs each process in the SOAP-SIP adaptor 2. The SOAP control part 2102, the 3PCC module part 2102, the media stream control part 2103 and the SIP control part 2104 on the memory 2004 are performed by the CPU 2001. An IF 2003 is the interface for communicating with the Web server 1 or the NGN N2 via a line 2002.

FIG. 3A is an explanatory view showing one example of the organization of the session information table 2010 in the SOAP-SIP adaptor 2 according to the first embodiment.

The session information table 2010 stores, associated with a session ID 2011, a session state 2012, a call participants state 2020, and a terminal information 2030, for example.

The session ID 2011 is a session identifier corresponding to a connection request from the Web server 1. The session ID 2011 identifies the communication between the terminal A5b and the terminal B5c. The session state 2012 is a state of session designated by the session ID 2011. The session state 2012 is "Initial (initial state)", "Connected (connected state)" or "Terminated (terminated state)", for example. The call participants state 2020 is equivalent to the call participants information table 2020. The details of the call participants information table 2020 will be described later. The terminal information 2030 is equivalent to the terminal information table 2030. The terminal information 2030 is stored for each terminal. In an illustrated example, a terminal information (for Client A) 2030_A corresponding to the terminal A5b and a terminal information (for Client B) 2030_B corresponding to the terminal B5c are stored. The details of the terminal information table 2030 will be described later.

FIG. 3B is an explanatory view showing one example of the organization of the call participants information table 2020 in the SOAP-SIP adaptor 2 according to the first embodiment.

The call participants information table 2020 stores, for each terminal, a URI 2021, a call state 2022 and a start time (hour) 2023, for example.

The URI 2021 indicates an SIP-URI corresponding to each user. The call state 2022 indicates a state of session of SIP between the SOAP-SIP adaptor 2 and each terminal 5b, 5c. The call state 2022 is "Call Participant Initial (initial state)", "Call Participant Connected (connected state)" or "Call Participant Terminated (terminated state)", for example. The start time 2023 indicates the time when the SOAP-SIP adaptor 2 establishes the session of SIP with each terminal 5b, 5c.

FIG. 3C is an explanatory view showing one example of the organization of the terminal information table 2030 in the SOAP-SIP adaptor 2 according to the first embodiment.

The terminal information table 2030 stores the parameters for use in the SIP, for example. The terminal information table 2030 includes a handle value 2031, a session ID 2032, a terminal state 2033, Role 2034, send Session Description Protocol (SDP) information 2035, recv SDP information 2036, From URI 2037, and To URI 2038, for example.

The handle value 2031 is the information for identifying the session of SIP between the SOAP-SIP adaptor 2 and the terminal 5b and the session of SIP between the SOAP-SIP adaptor 2 and the terminal B5c. The session ID 2032 corresponds to the session ID 2011 of the session information table 2010. The terminal state 2033 indicates the state until the session between the SOAP-SIP adaptor 2 and each terminal 5b, 5c is established. The terminal state 2033 is "Initial (initial state)", "Connect Wait (state waiting for 'response')", "Call Complete (state in which 'response' is accepted and the session with UA is established)", "Close Wait (state waiting for 'disconnect complete notification')", or "Closed (terminated state)", for example. The "Initial" and "Connect Wait" correspond to "Call Participant Initial" of the call state 2022 stored in the call participants information table 2020. Also, the "Call Complete" and "Close Wait" correspond to "Call Participant Connected" of the call state 2022 stored in the call participants information table 2020. The "Closed (terminated state)" corresponds to "Call Participant Terminated" of the call state 2022.

The Role 2034 is the information indicating the call originating side or call incoming side. The send SDP information 2035 includes the IP address and port number of the SOAP-SIP adaptor 2, for example. The recv SDP information 2036 includes the IP address and port number of the terminal A5b or terminal B5c, for example. The From URI 2037 indicates a sender URI of an SIP message sent by the SOAP-SIP adaptor 2. The From URI 2037 is the SIP-URI of the SOAP-SIP adaptor 2, for example. The To URI 2038 indicates a send destination URI of the SIP message sent by the SOAP-SIP adaptor 2. The To URI 2038 is the SIP-URI of the terminal A5b or terminal B5c, for example.

FIG. 3D is an explanatory view showing one example of the organization of the media stream control information table 2040 in the SOAP-SIP adaptor 2 according to the first embodiment.

The media stream control information table 2040 stores, associated with a session ID 2041, a media stream sending or receiving IP address 2042, a media stream sending or receiving port number 2043, a partner IP address (1) 2044, a partner port number (1) 2045, a partner IP address (2) 2046, and a partner port number (2) 2047, for example.

The session ID 2041 corresponds to the session ID 2011 of the session information table 2010. The media stream sending or receiving IP address 2042 and the media stream sending or receiving port number 2043 are the IP address and port number of the IF 2003 for use when the SOAP-SIP adaptor 2 transfers the media stream. The pairs of the partner IP address (1) 2044 and the partner port number (1) 2045 and the partner IP address (2) 2046 and the partner port number (2) 2047 indicate the transfer destination of the media stream. For example, when the sender of the media stream has the partner IP address (1) 2044 and the partner port number (1) 2045, the media stream is transferred to the corresponding partner IP address (2) 2046 and the partner port number (2) 2047 as the transfer destination. Similarly, when the sender of the media stream has the partner IP address (2) 2046 and the partner port number (2) 2047, the media stream is transferred to the corresponding partner IP address (1) 2044 and the partner port number (1) 2045 as the transfer destination. In an illustrated example, the partner IP address (1) 2044 and the partner port number (1) 2045 indicate the IP address and port number of the terminal A5b, and the partner IP address (2) 2046 and the partner port number (2) 2047 indicate the IP address and port number of the terminal B5c.

Figure 24:
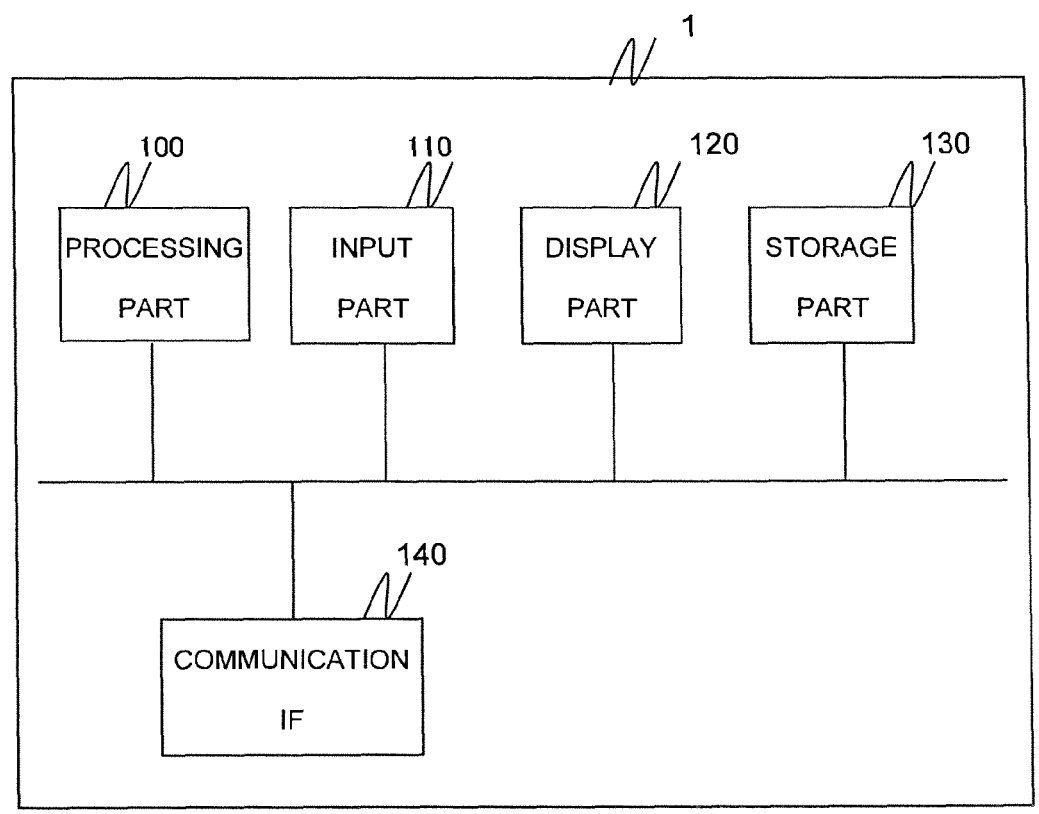
FIG. 24 is a block diagram of a web server 1.
Figure 25A:
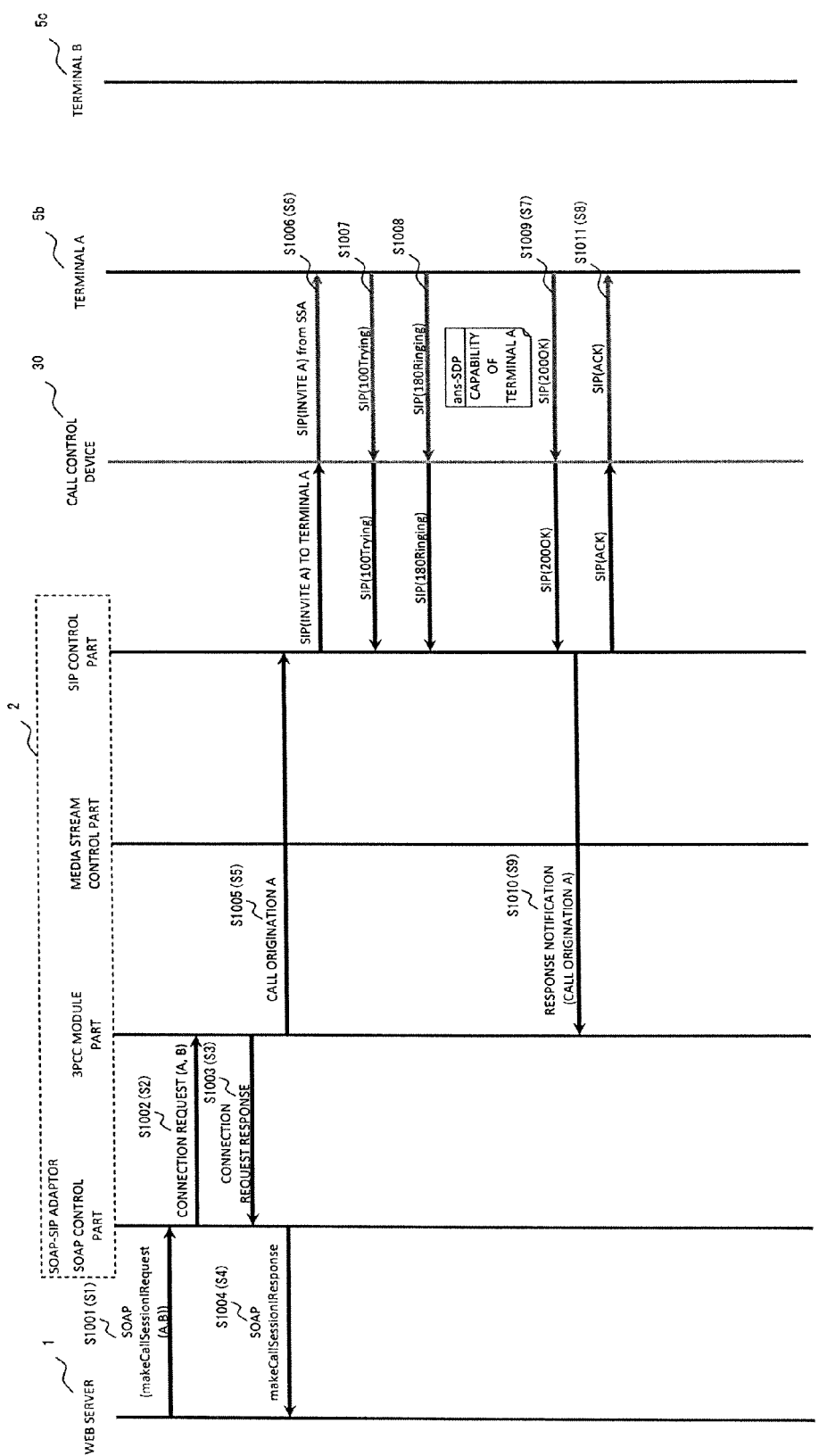
FIG. 25A is a first sequence chart (1) according to a third embodiment of the invention.
Figure 25B:
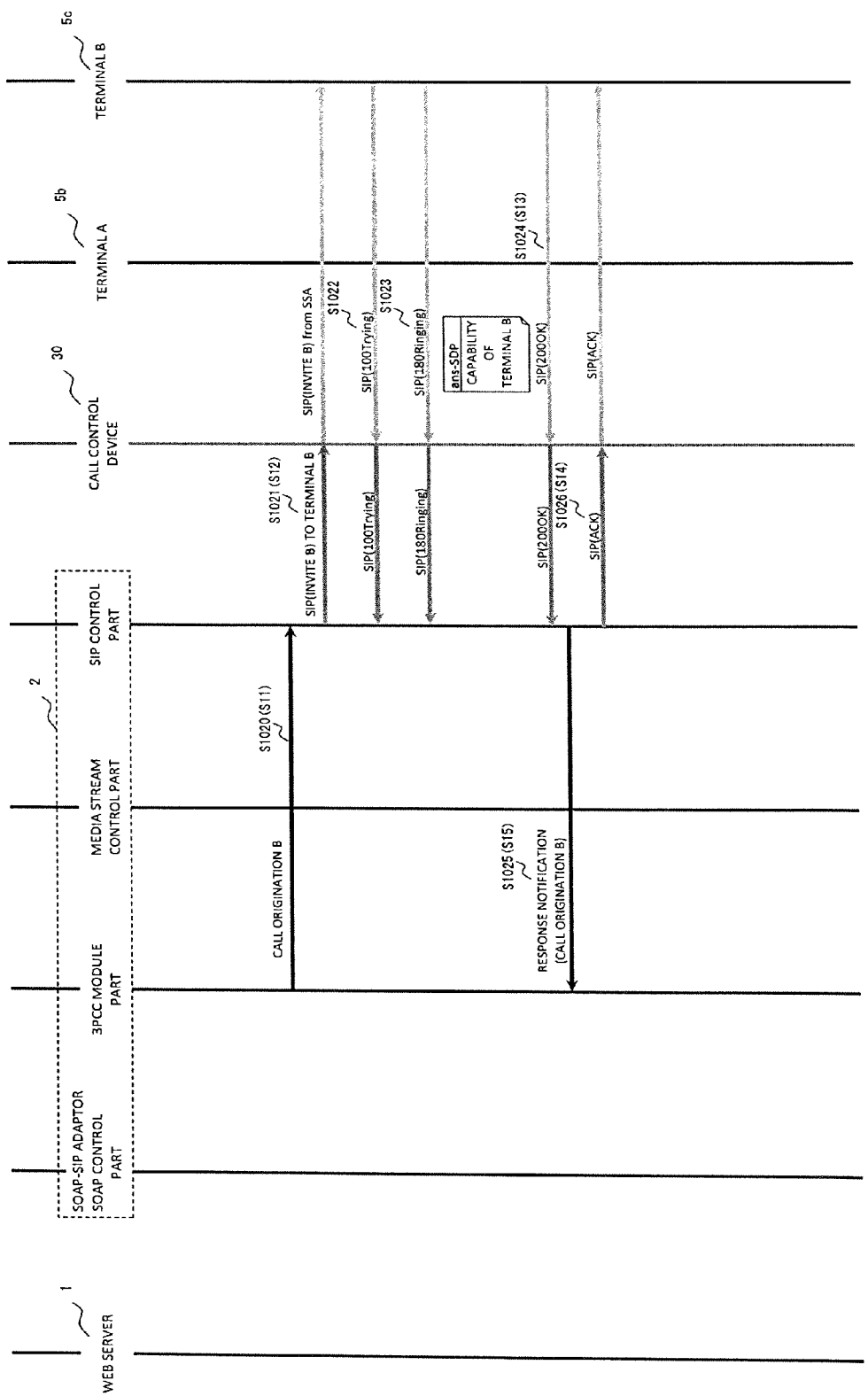
FIG. 25B is a first sequence chart (2) according to a third embodiment of the invention.
Figure 25C:
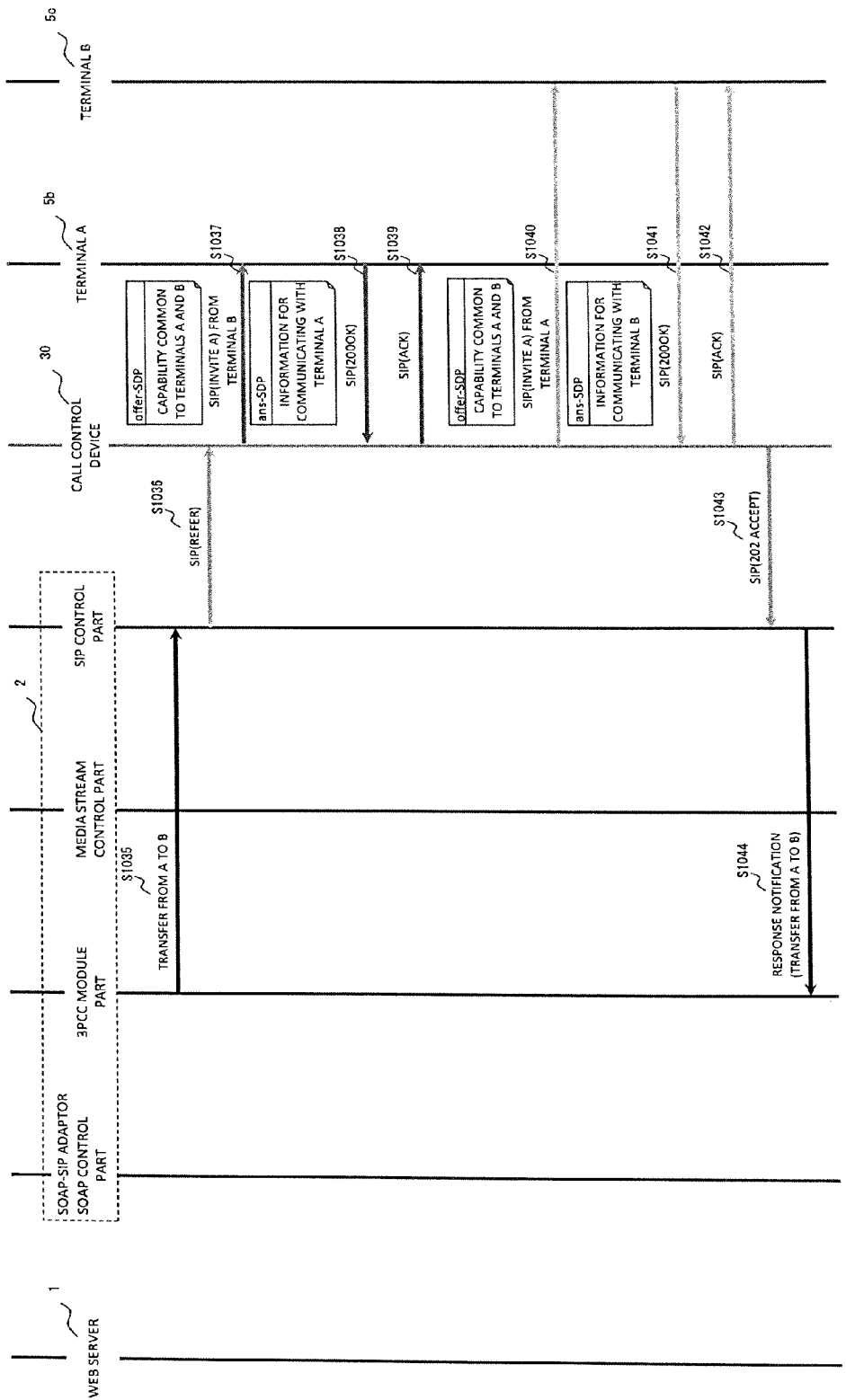
FIG. 25C is a first sequence chart (3) according to a third embodiment of the invention.
Figure 25D:
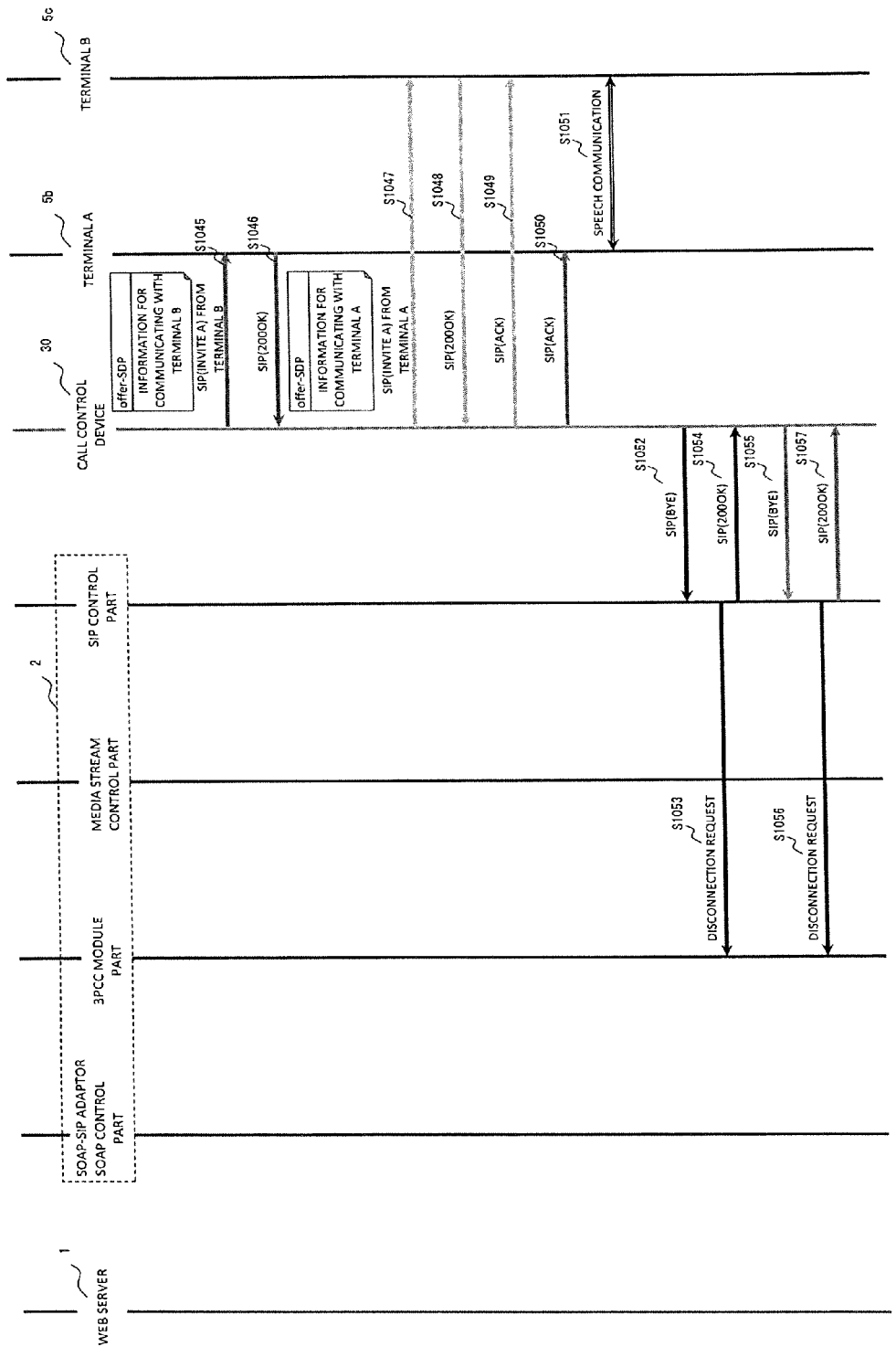
FIG. 25D is a first sequence chart (4) according to a third embodiment of the invention.
Figure 26A:
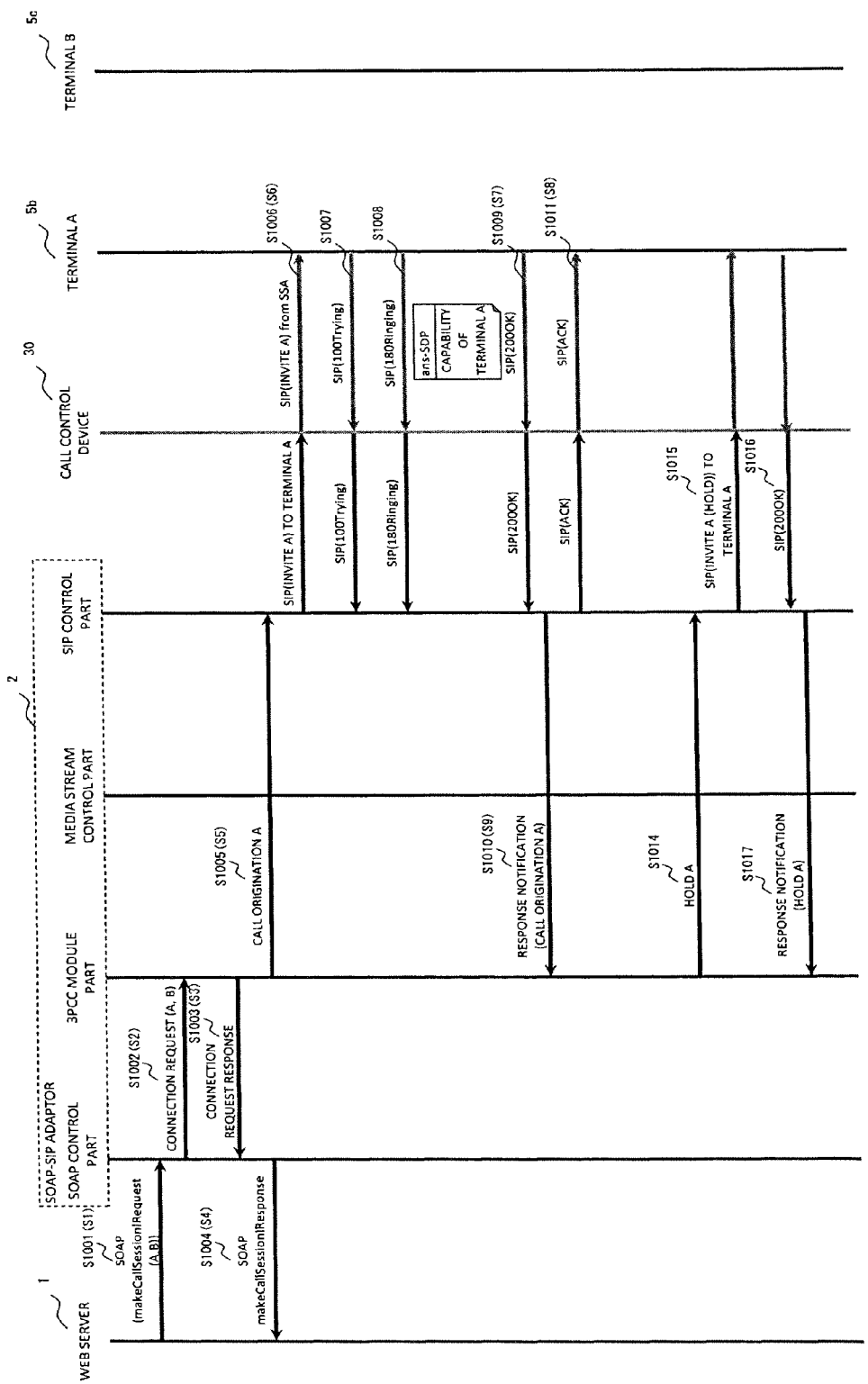
FIG. 26A is a second sequence chart (1) according to a third embodiment of the invention.
Figure 26B:
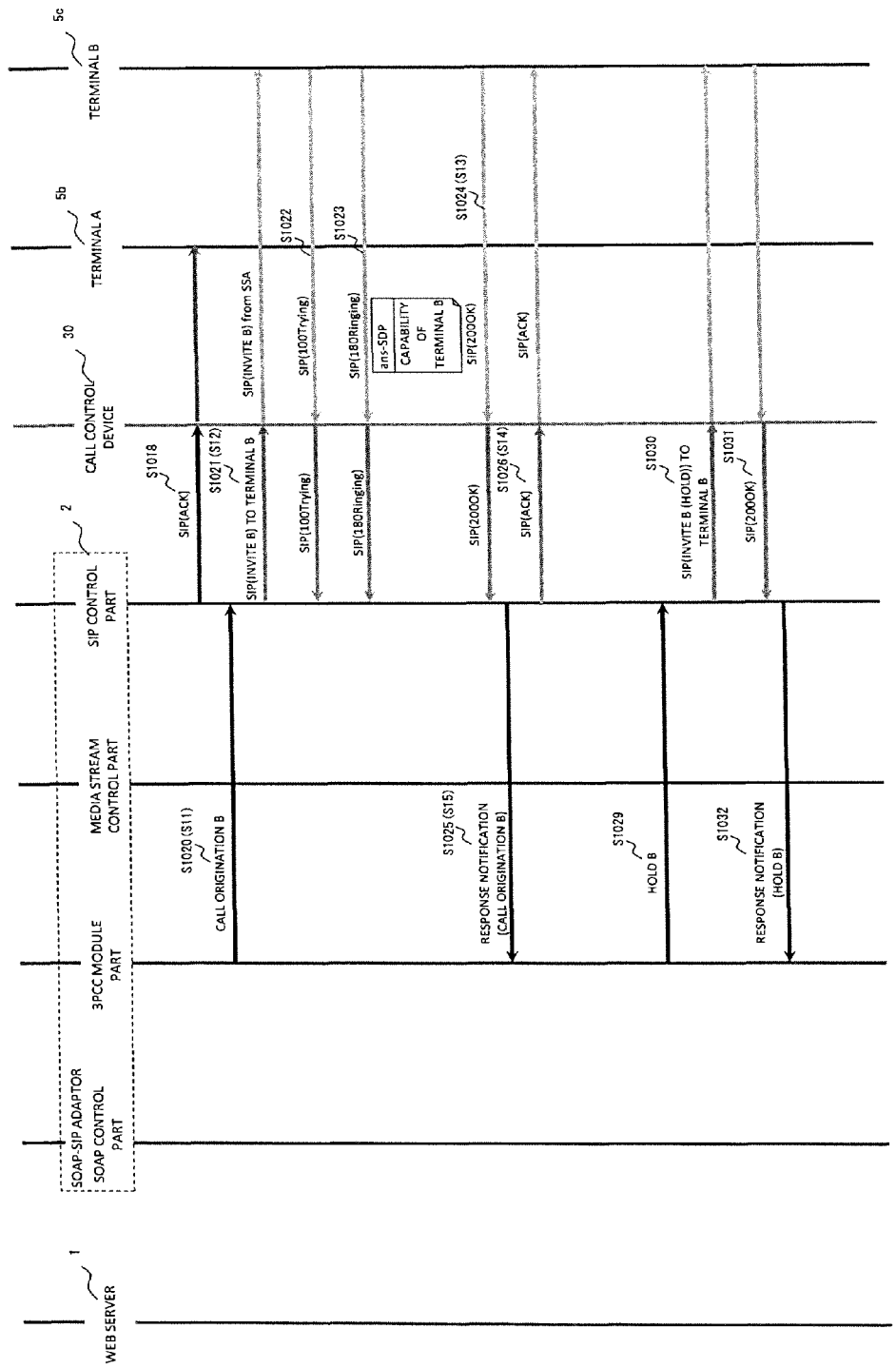
FIG. 26B is a second sequence chart (2) according to a third embodiment of the invention.
Figure 26C:
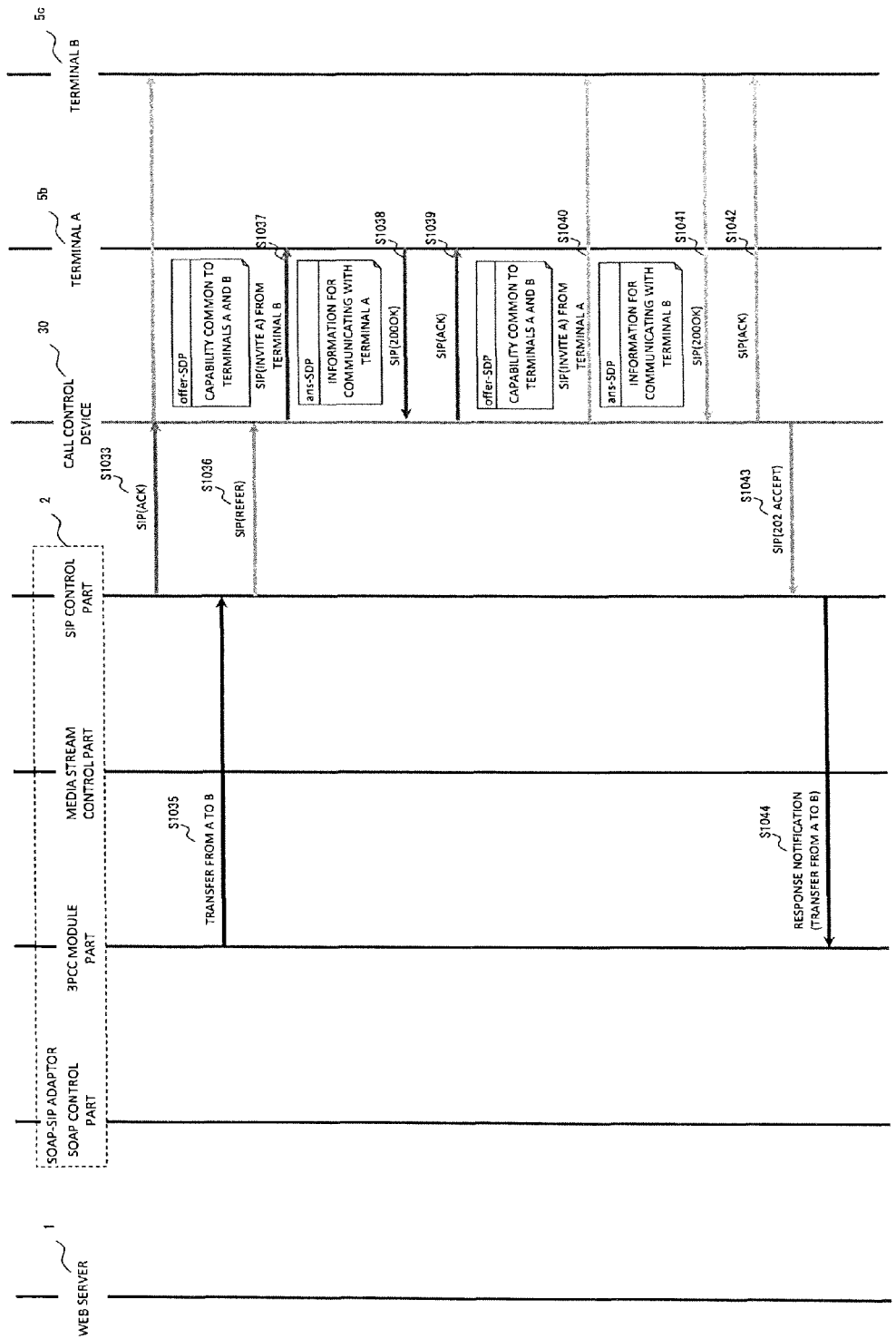
FIG. 26C is a second sequence chart (3) according to a third embodiment of the invention.
Figure 26D:
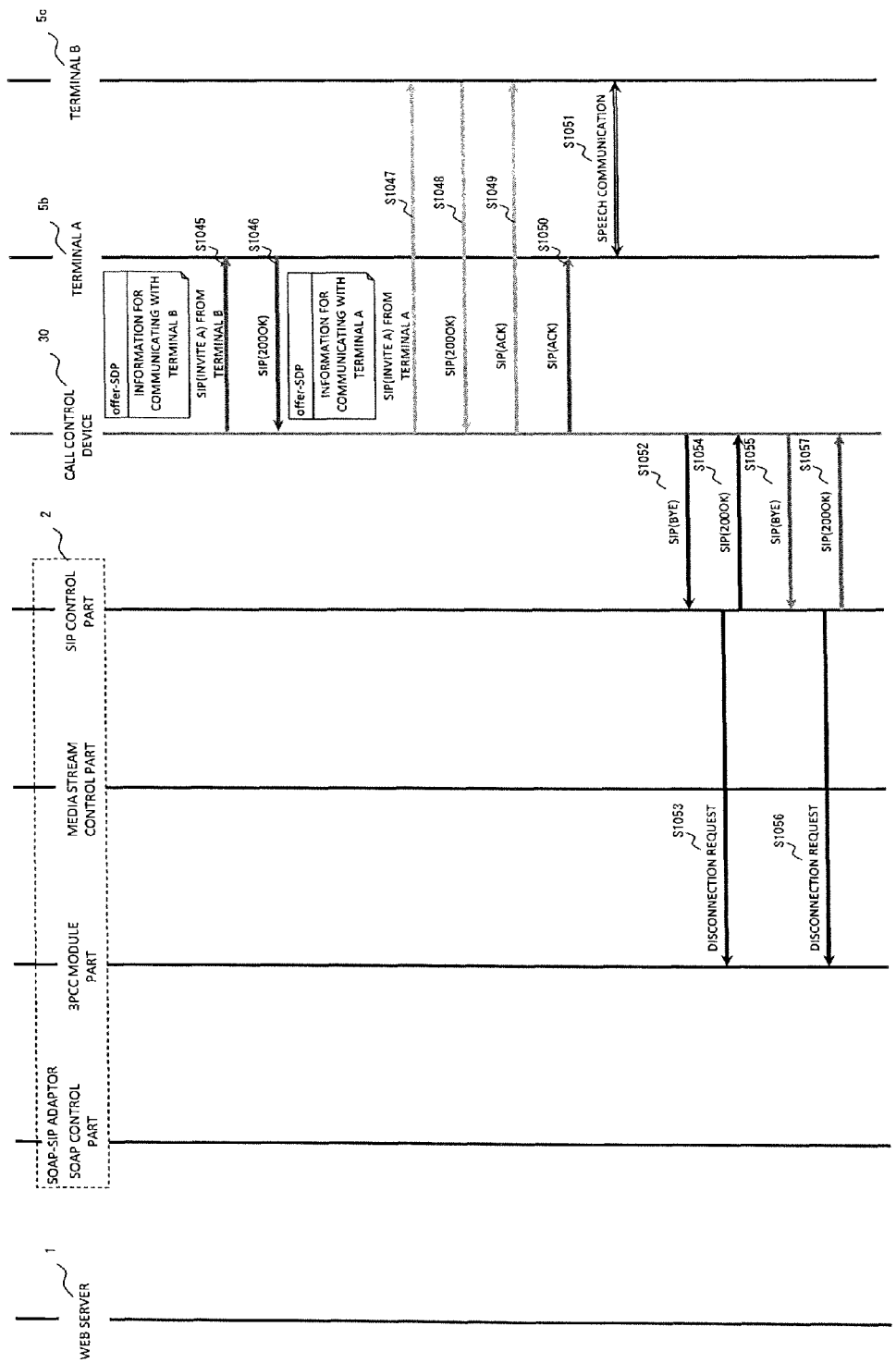
FIG. 26D is a second sequence chart (4) according to a third embodiment of the invention.
Figure 27A:
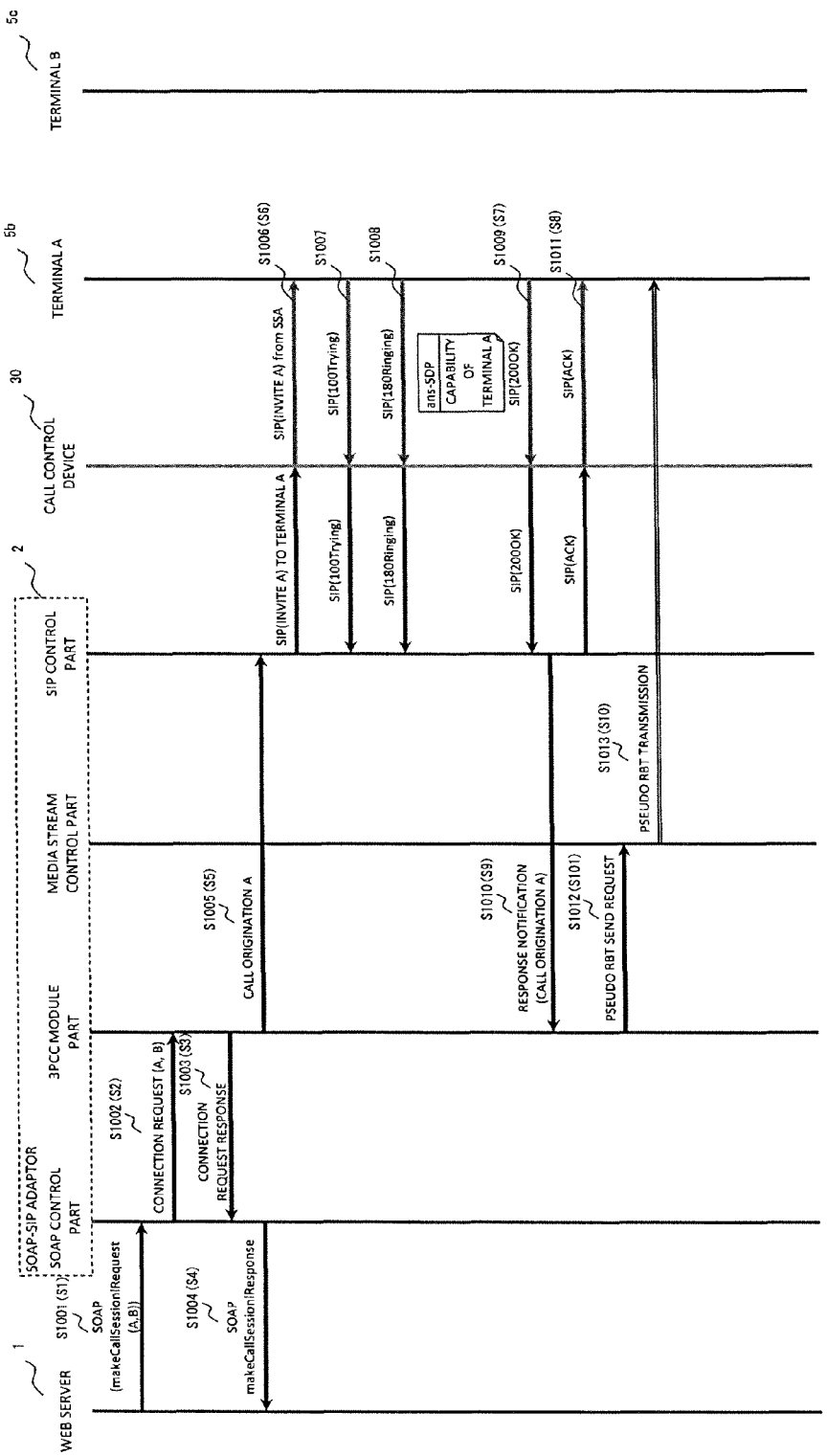
FIG. 27A is a third sequence chart (1) according to a third embodiment of the invention.
Figure 27B:
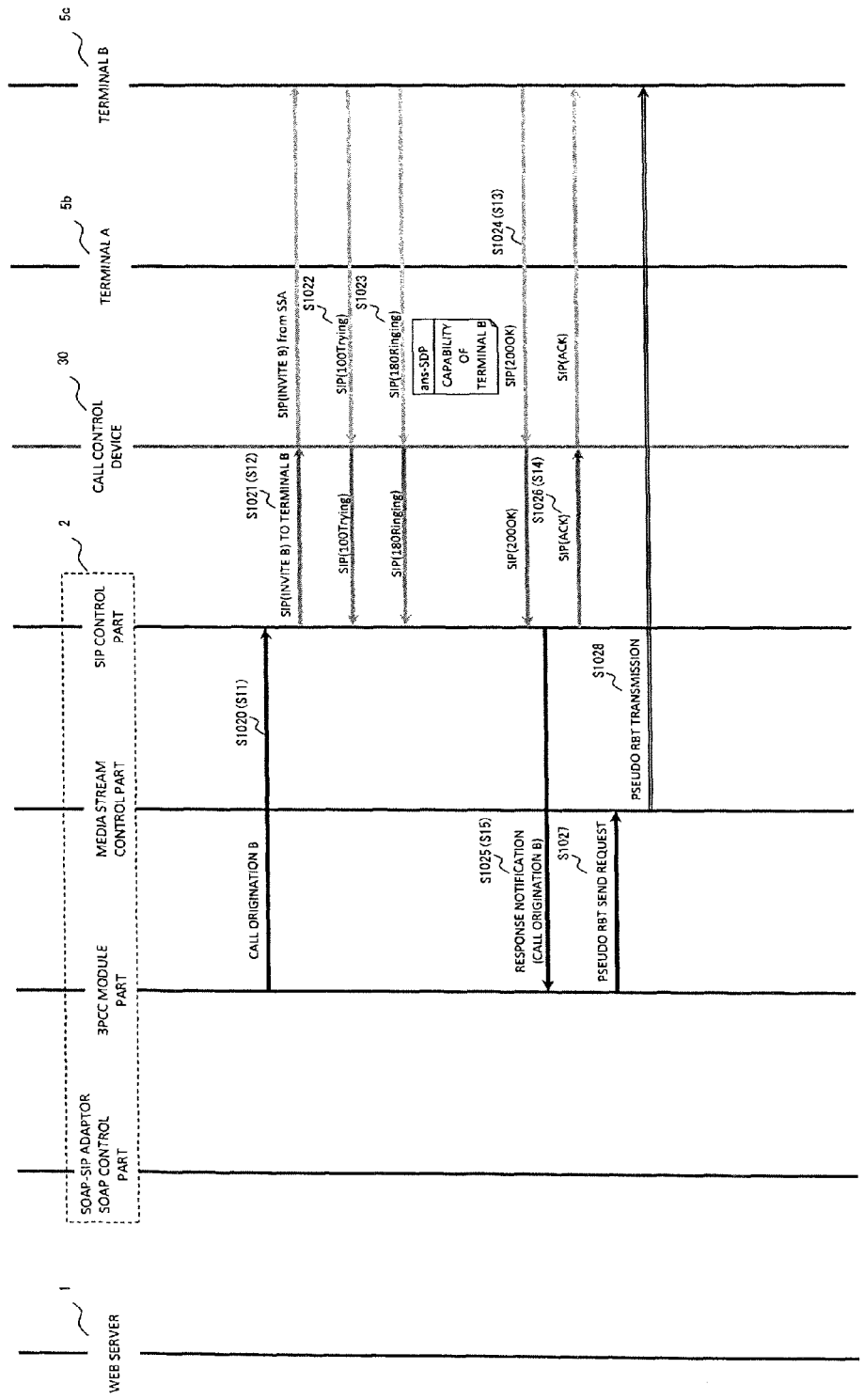
FIG. 27B is a third sequence chart (2) according to a third embodiment of the invention.
Figure 27C:
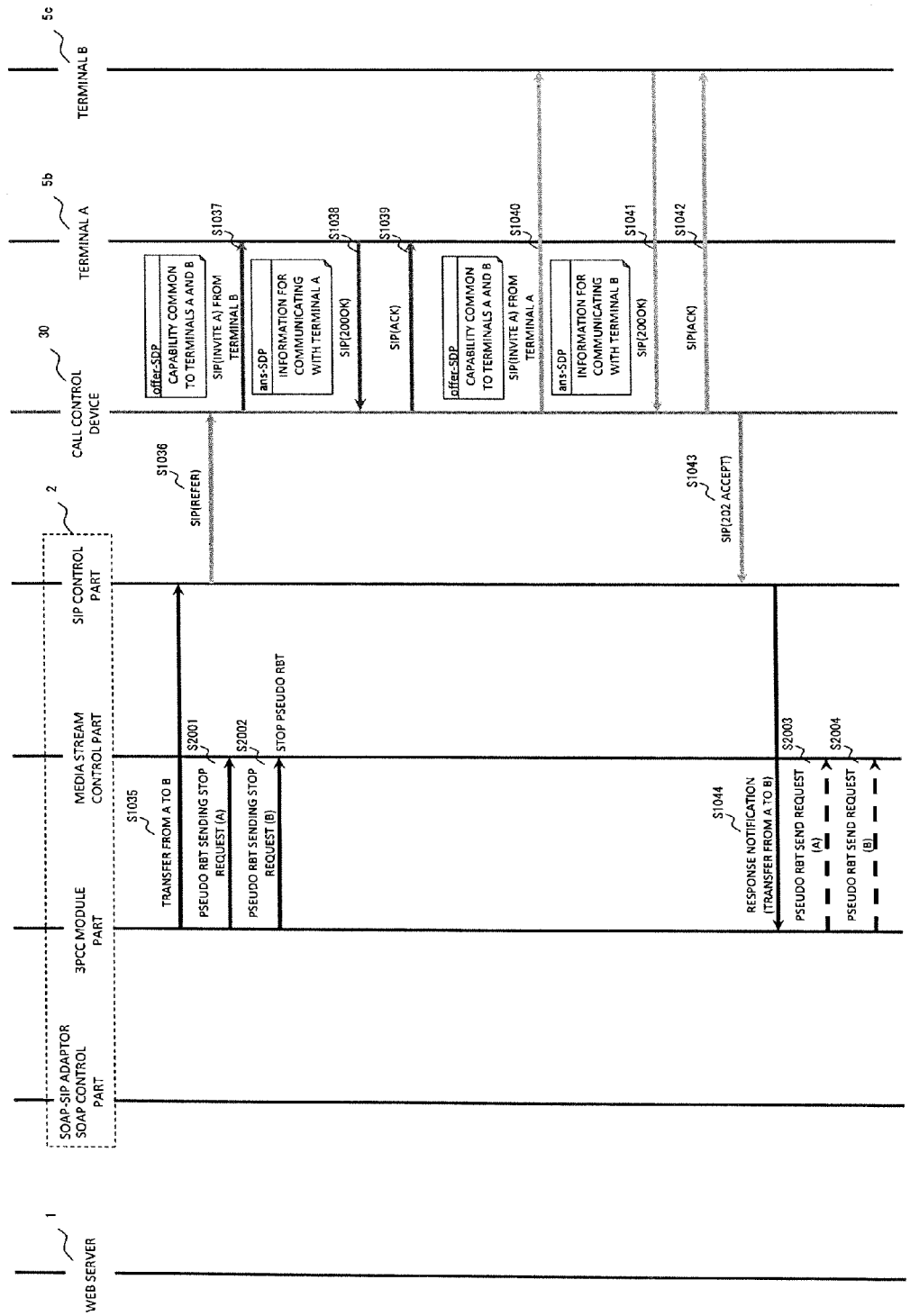
FIG. 27C is a third sequence chart (3) according to a third embodiment of the invention.
Figure 27D:
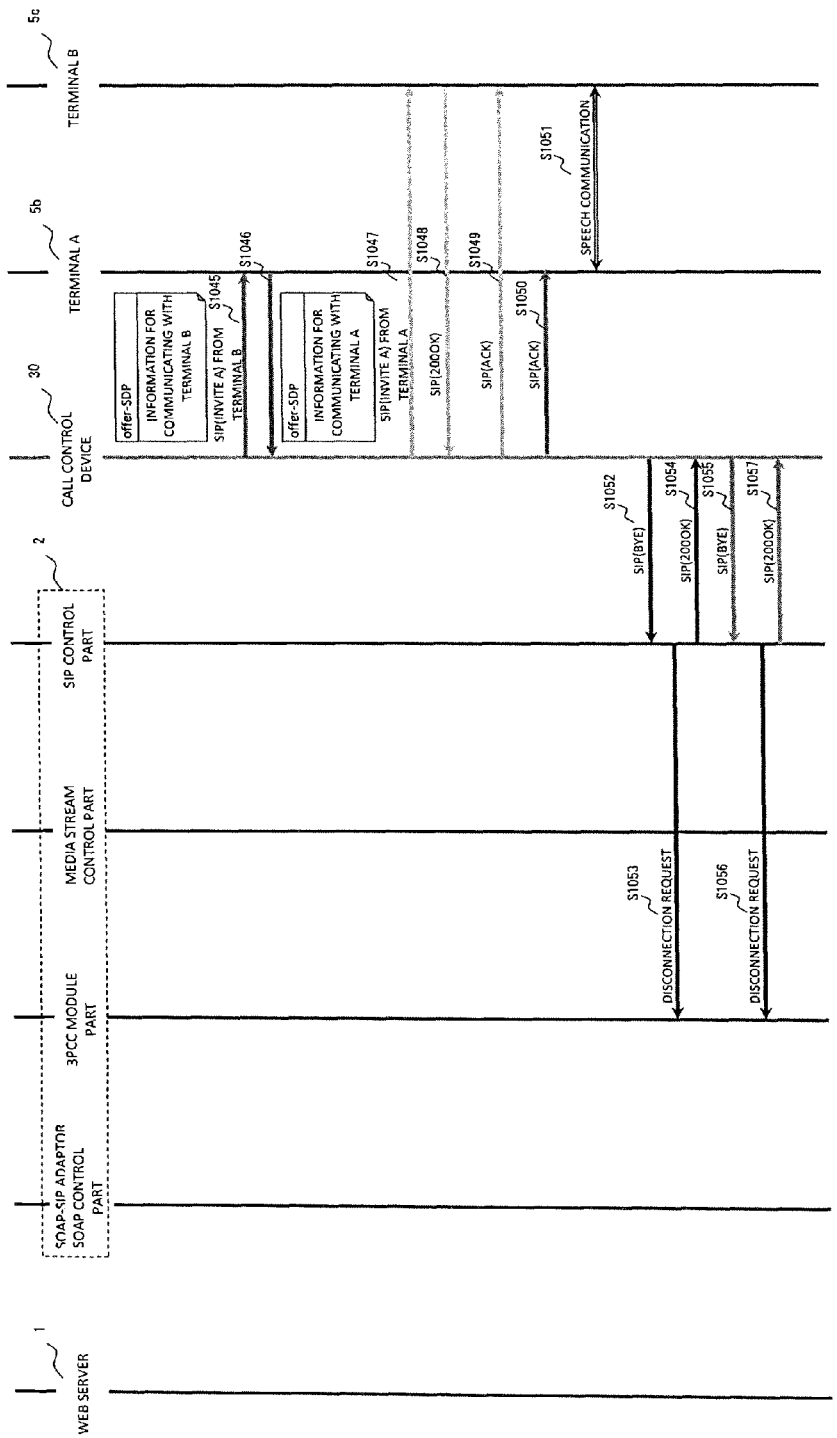
FIG. 27D is a third sequence chart (4) according to a third embodiment of the invention.
Figure 28A:
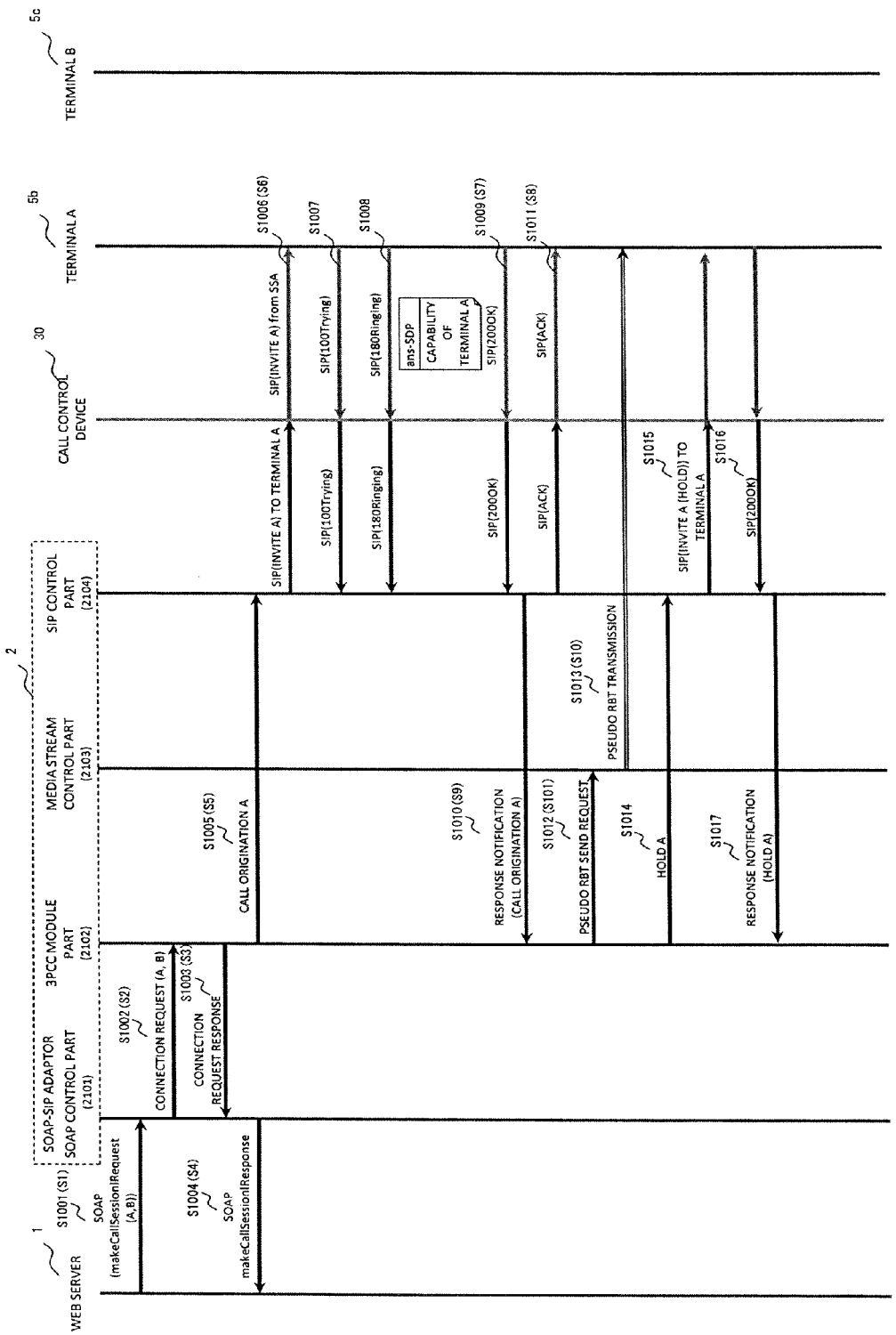
FIG. 28A is a fourth sequence chart (1) according to a third embodiment of the invention.
Figure 28B:
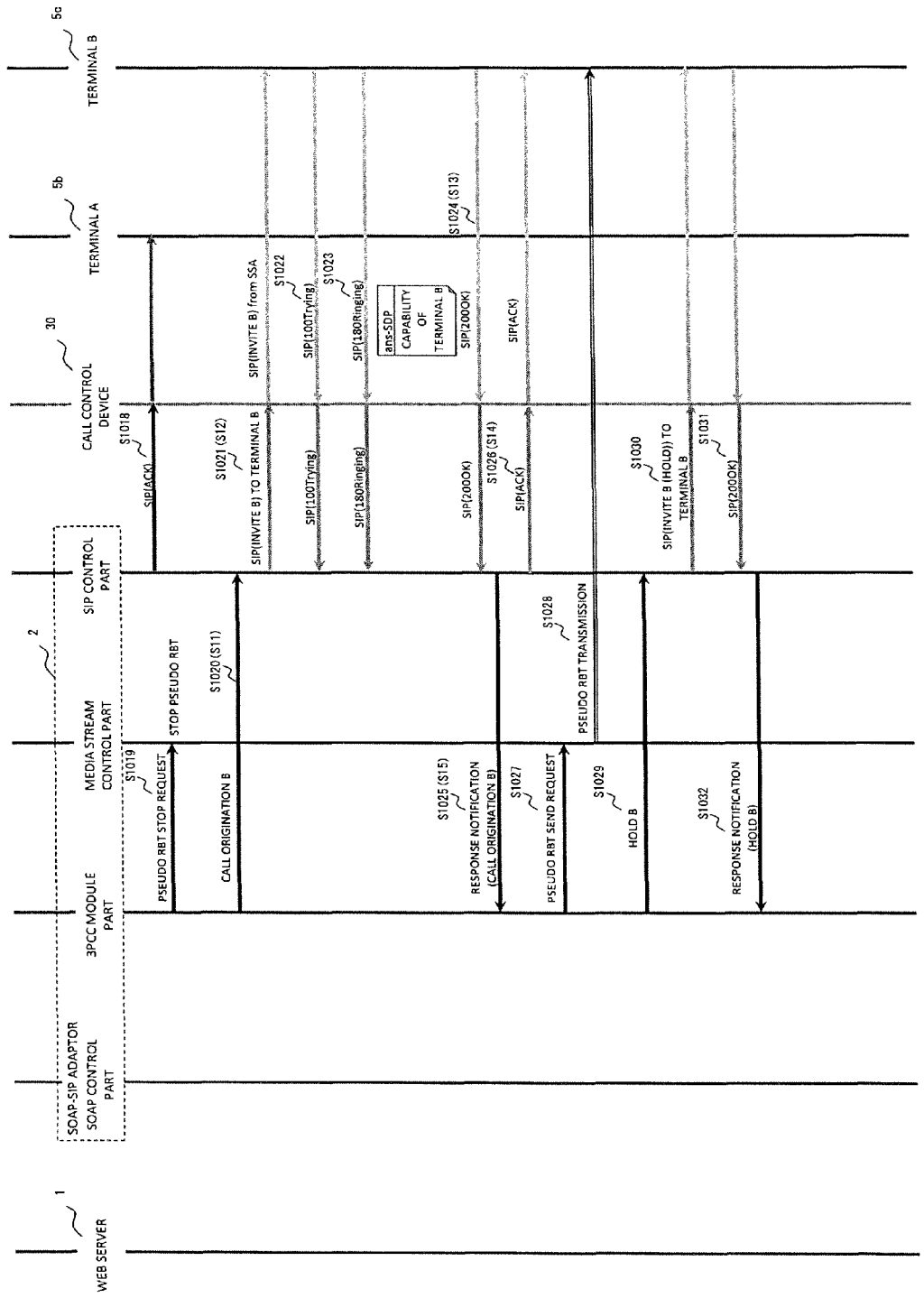
FIG. 28B is a fourth sequence chart (2) according to a third embodiment of the invention.
Figure 28C:
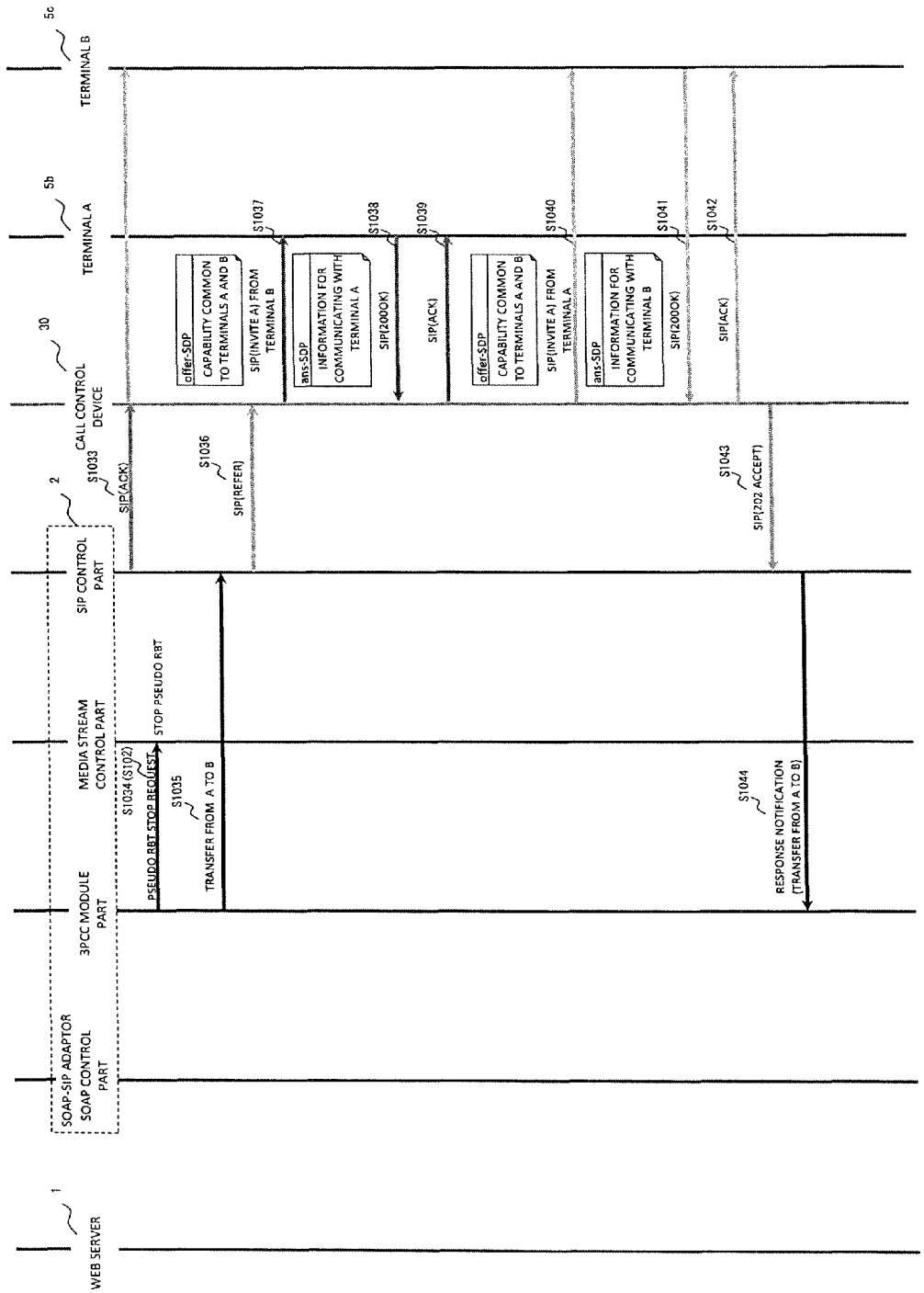
FIG. 28C is a fourth sequence chart (3) according to a third embodiment of the invention.
Figure 28D:
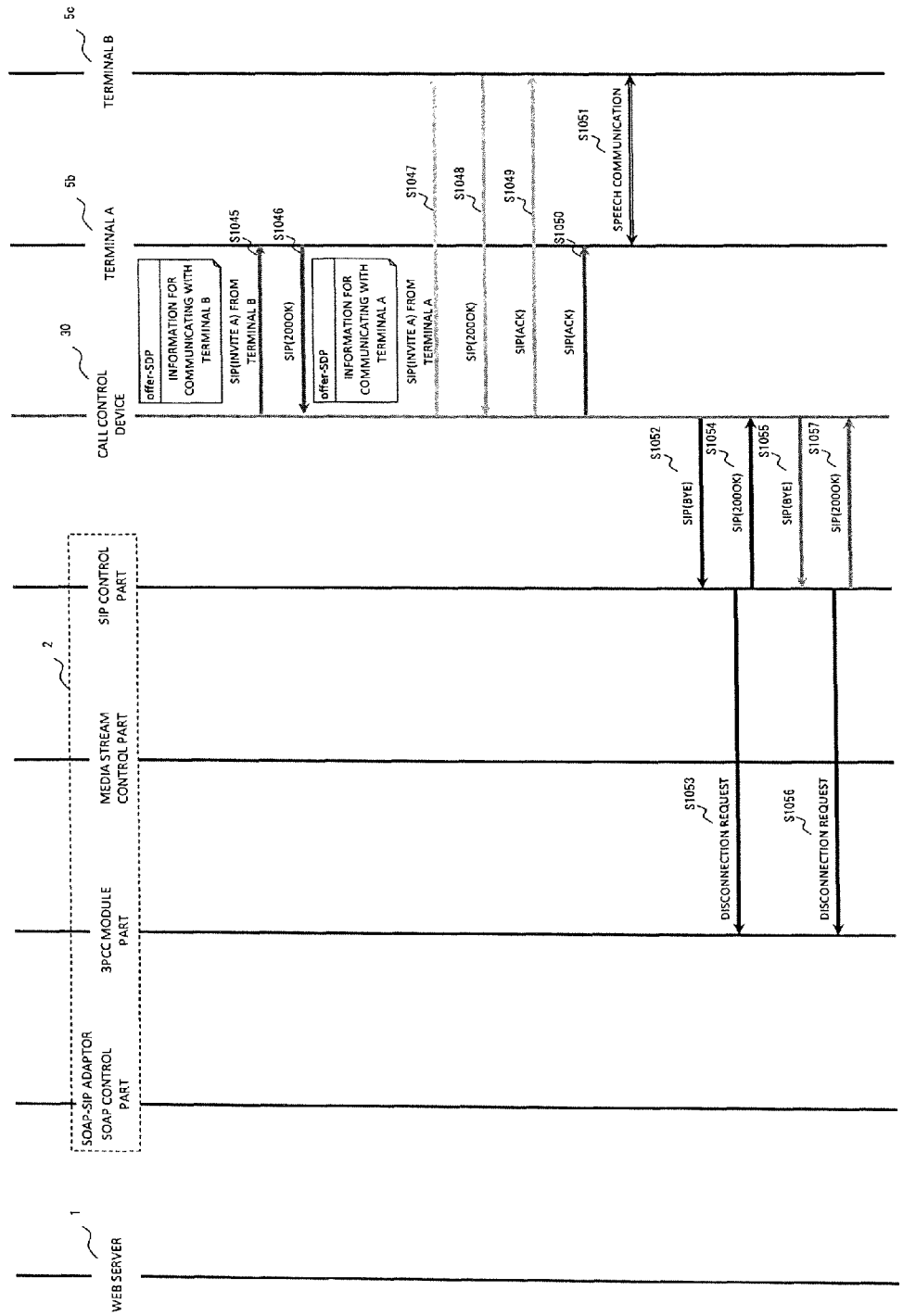
FIG. 28D is a fourth sequence chart (4) according to a third embodiment of the invention.
Figure 29A:
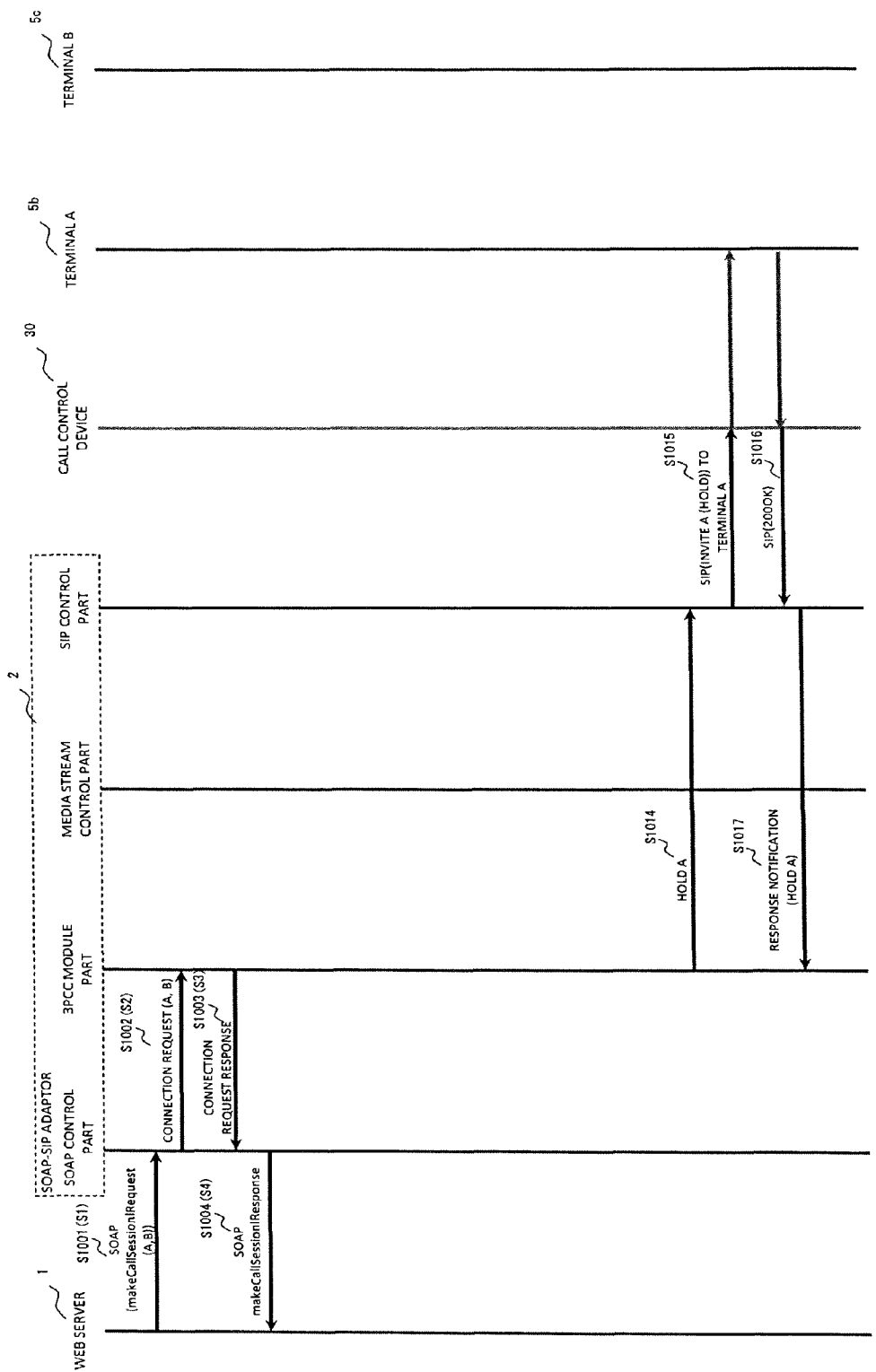
FIG. 29A is a fifth sequence chart (1) according to a third embodiment of the invention.
Figure 29B:
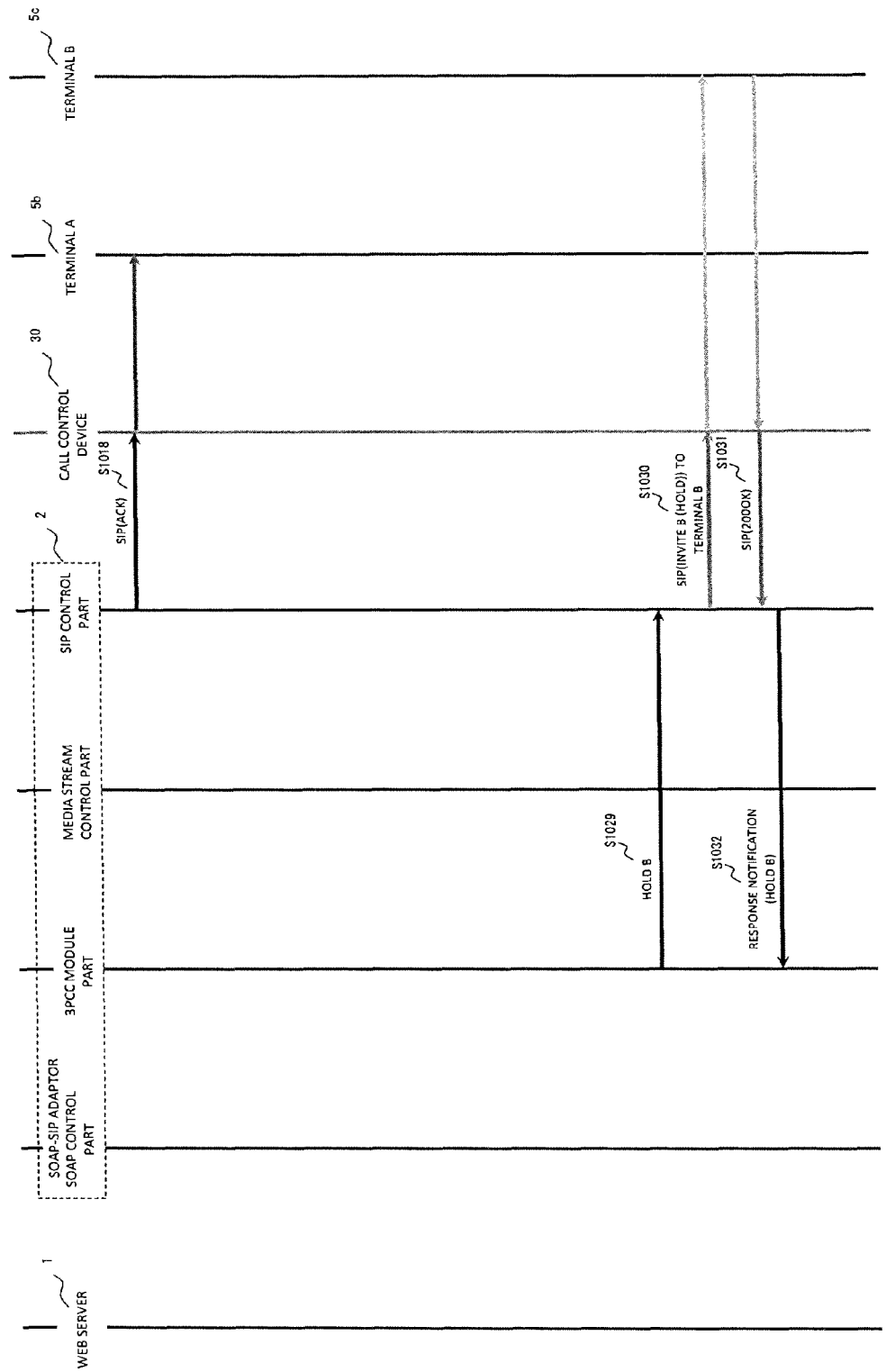
FIG. 29B is a fifth sequence chart (2) according to a third embodiment of the invention.
Figure 29C:
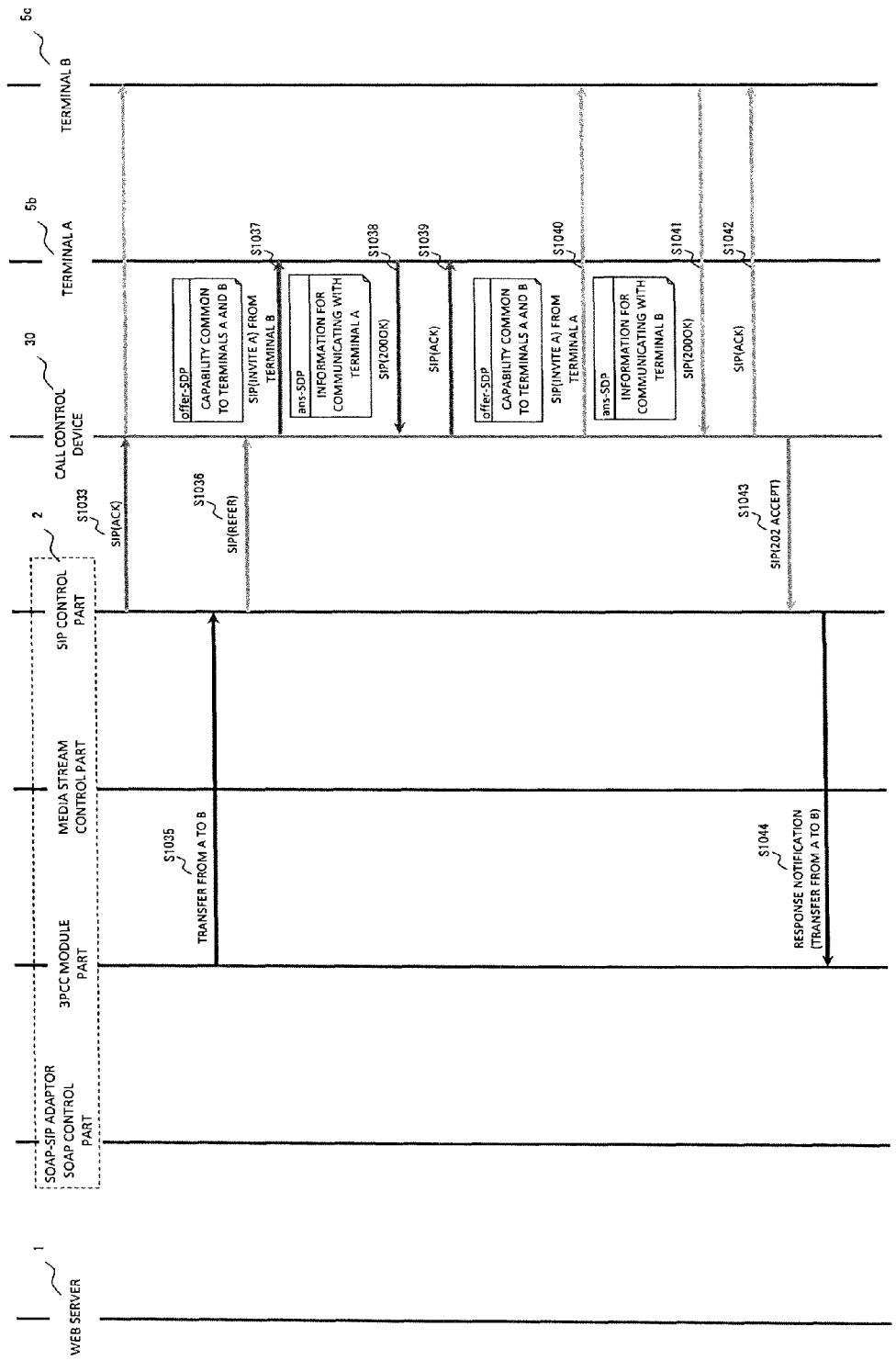
FIG. 29C is a fifth sequence chart (3) according to a third embodiment of the invention.
Figure 29D:
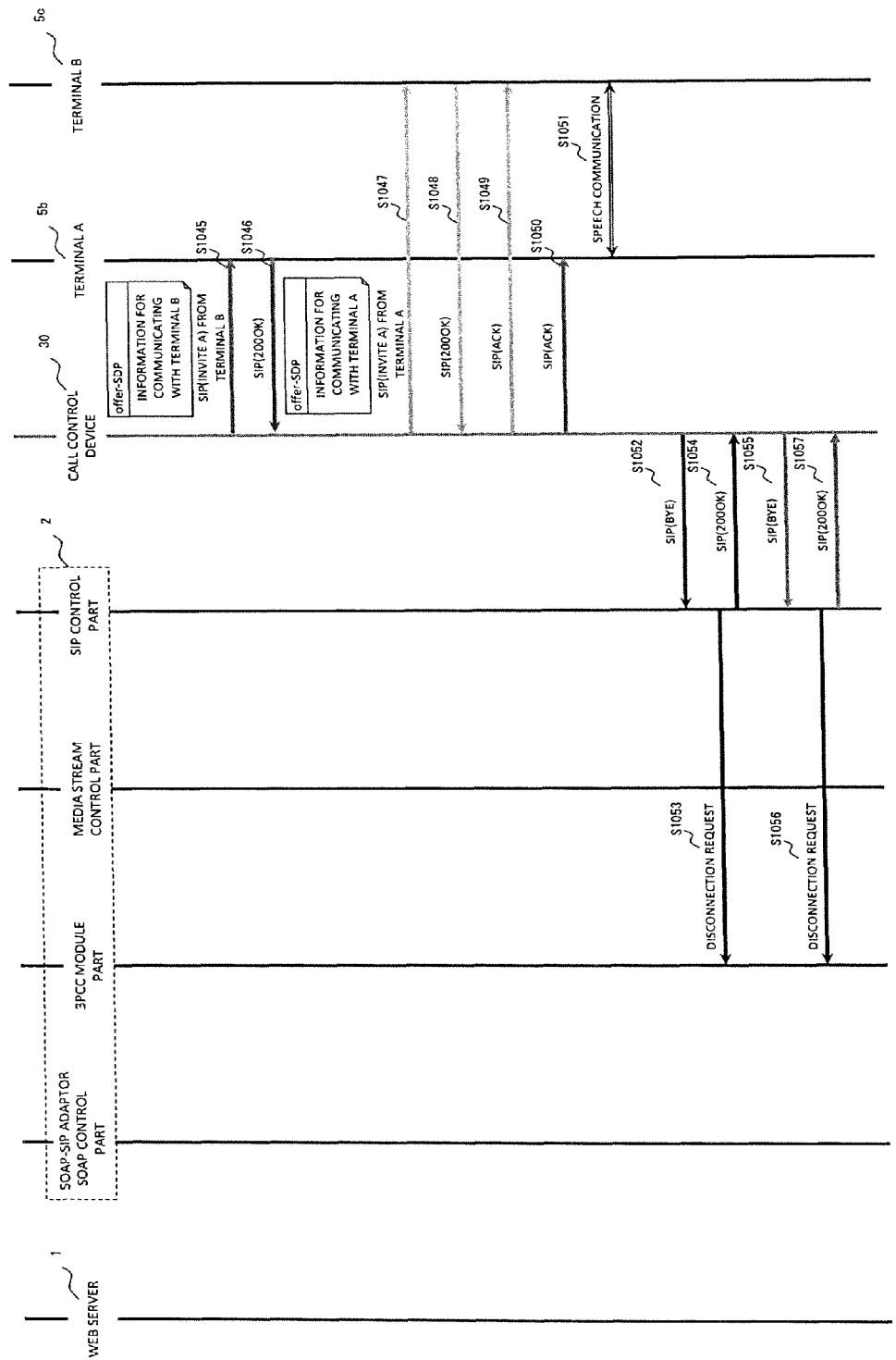
FIG. 29D is a fifth sequence chart (4) according to a third embodiment of the invention.
Figure 30A:
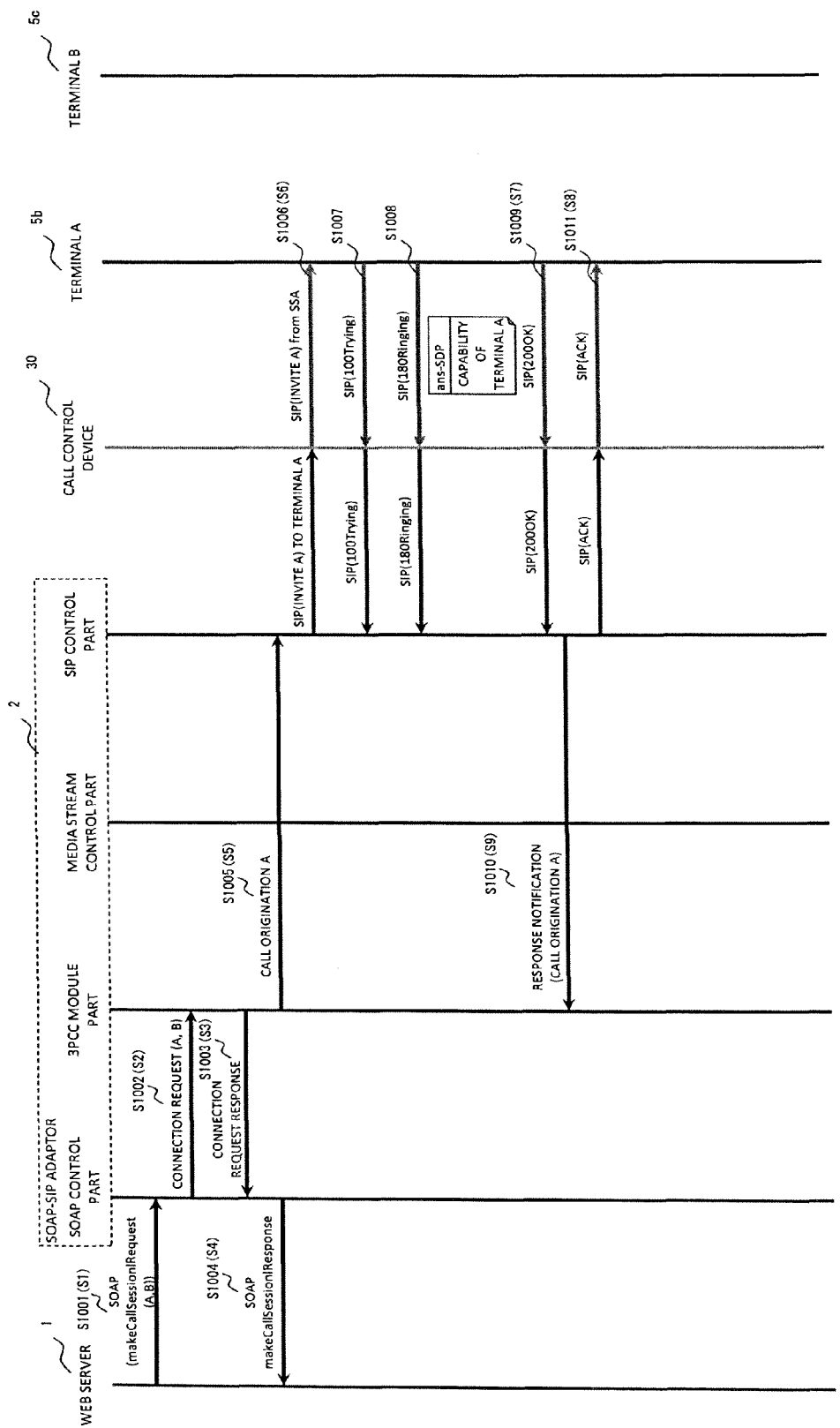
FIG. 30A is a first sequence chart (1) according to a fourth embodiment of the invention.
Figure 30B:
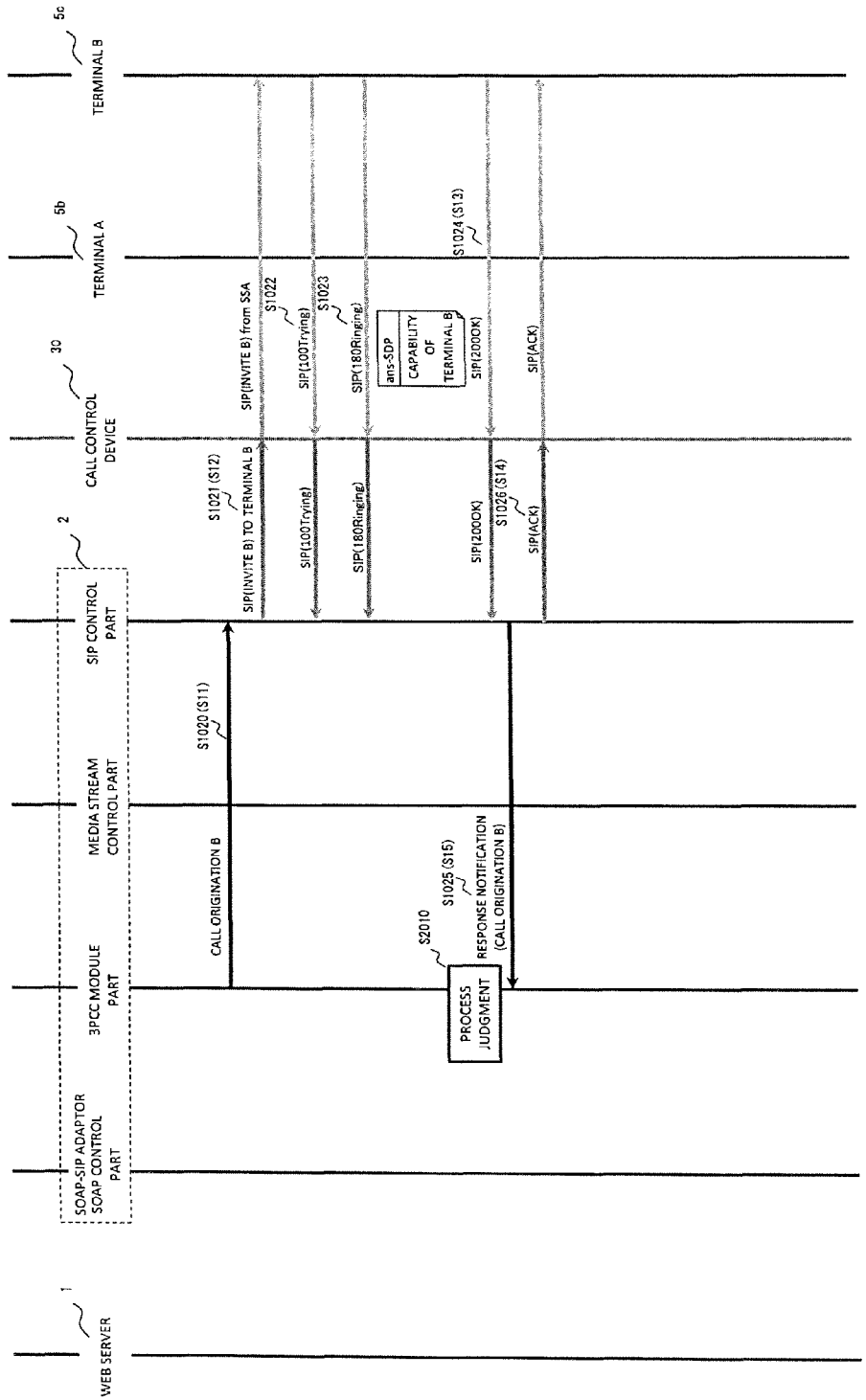
FIG. 30B is a first sequence chart (2) according to a fourth embodiment of the invention.
Figure 30C:
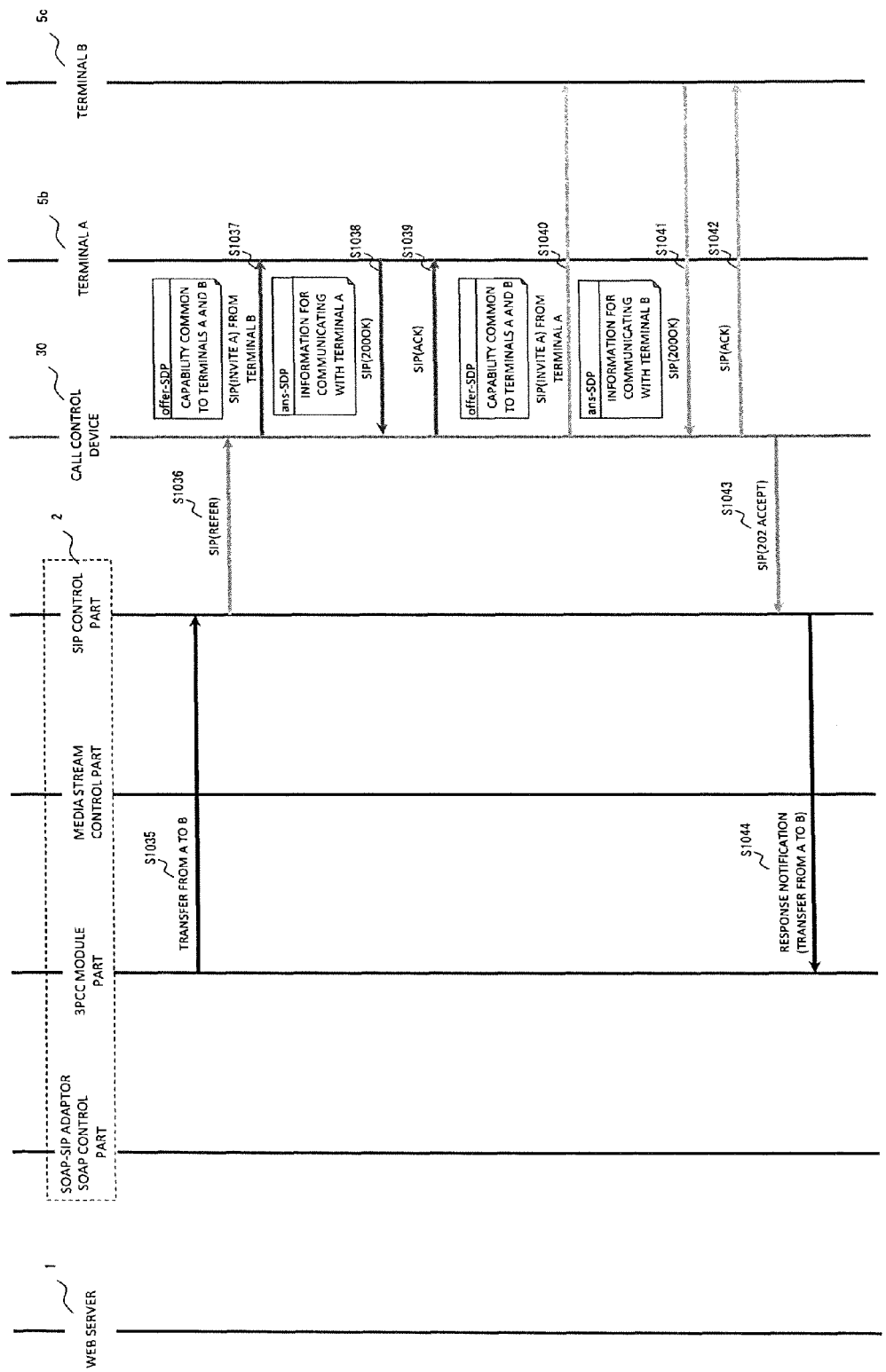
FIG. 30C is a first sequence chart (3) according to a fourth embodiment of the invention.
Figure 30D:
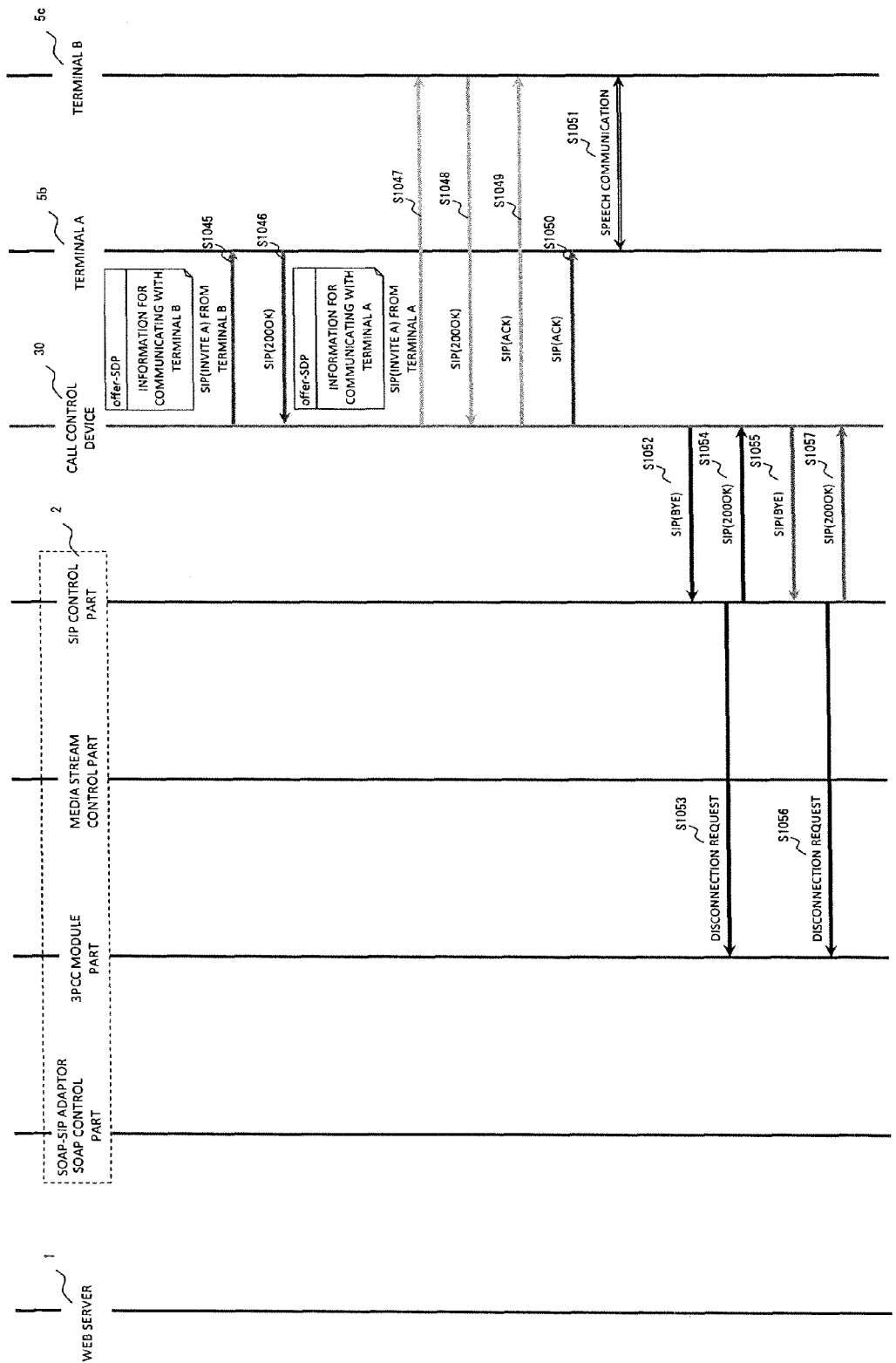
FIG. 30D is a first sequence chart (4) according to a fourth embodiment of the invention.
Figure 31A:
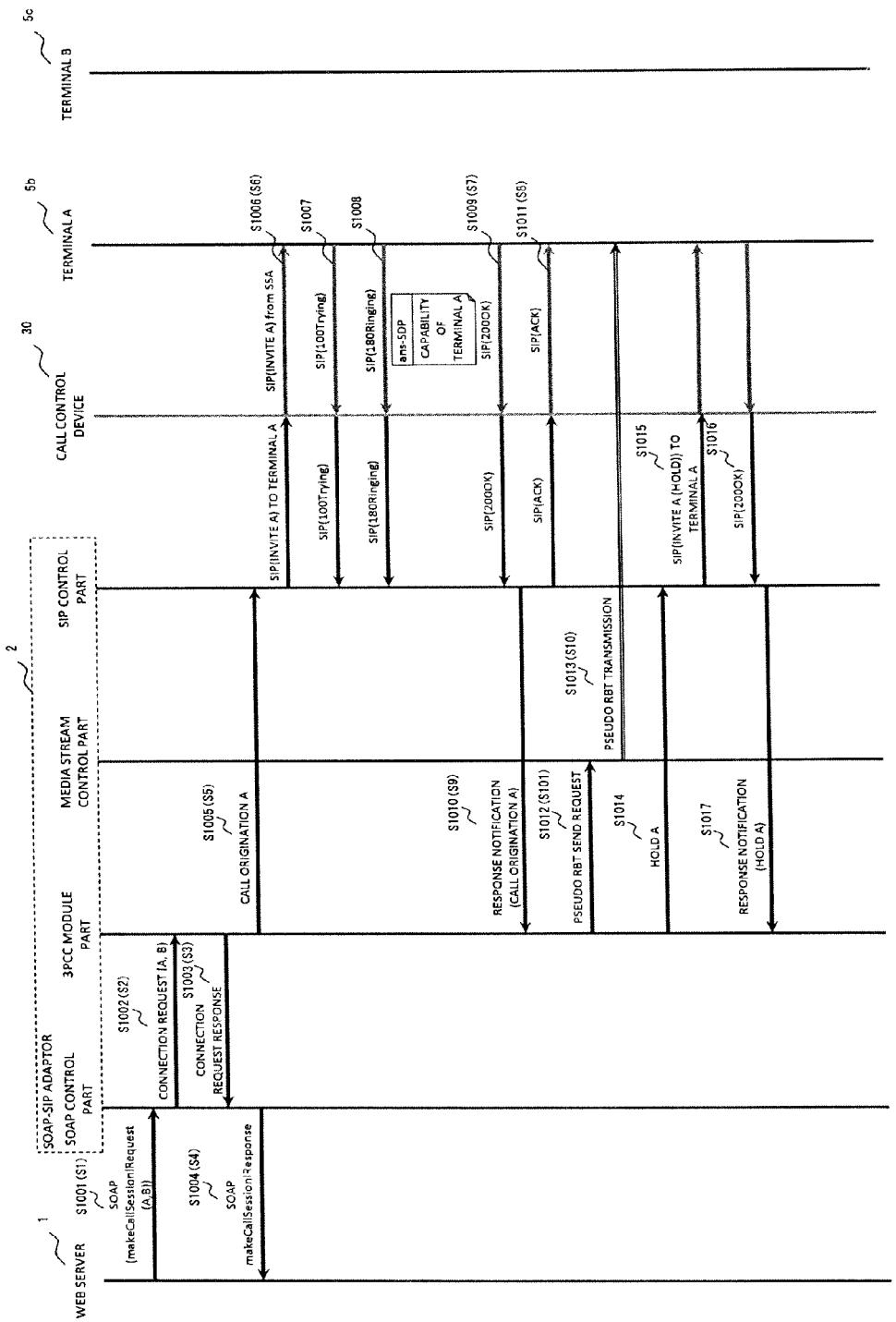
FIG. 31A is a second sequence chart (1) according to a fourth embodiment of the invention.
Figure 31B:
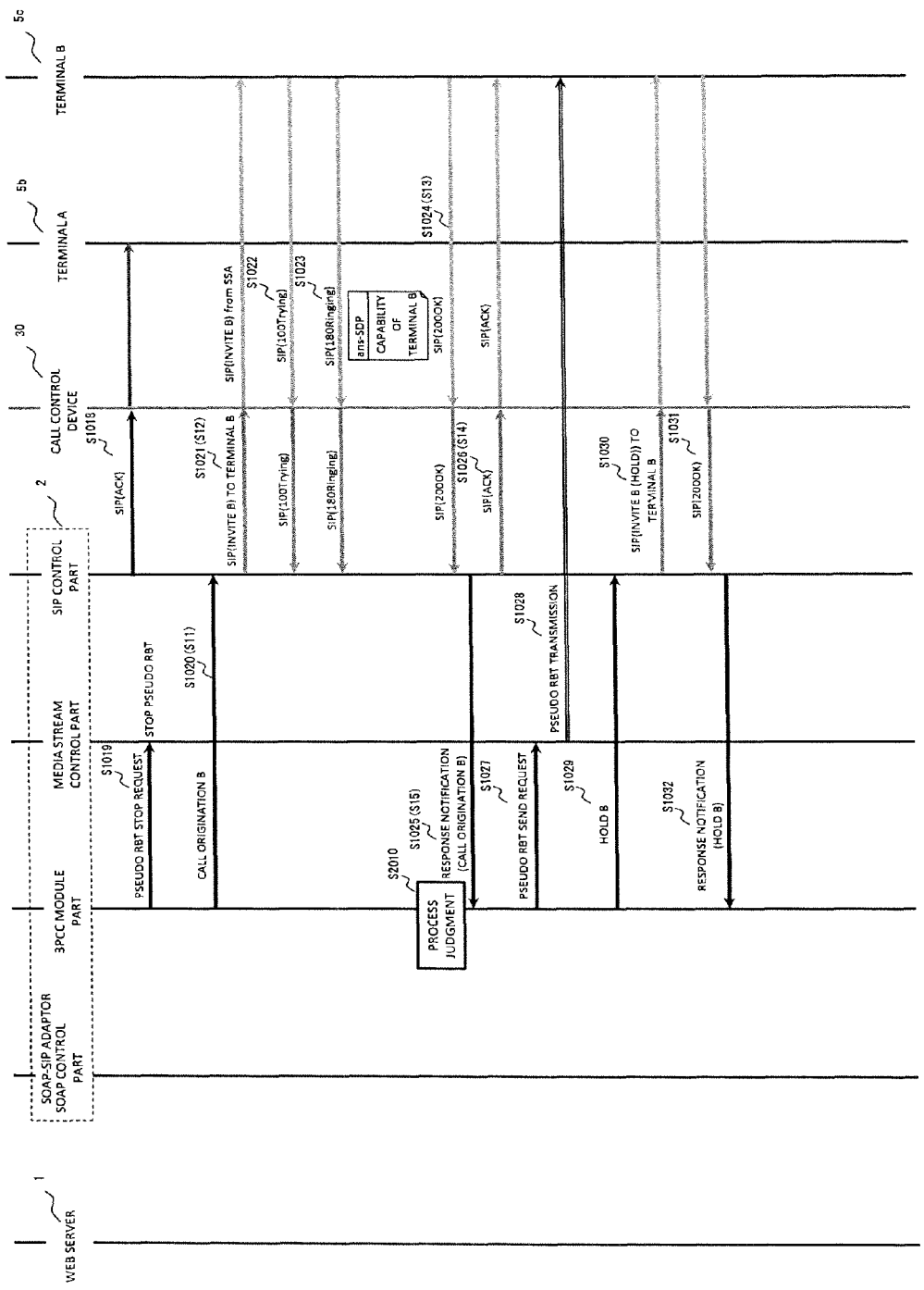
FIG. 31B is a second sequence chart (2) according to a fourth embodiment of the invention.
Figure 31C:
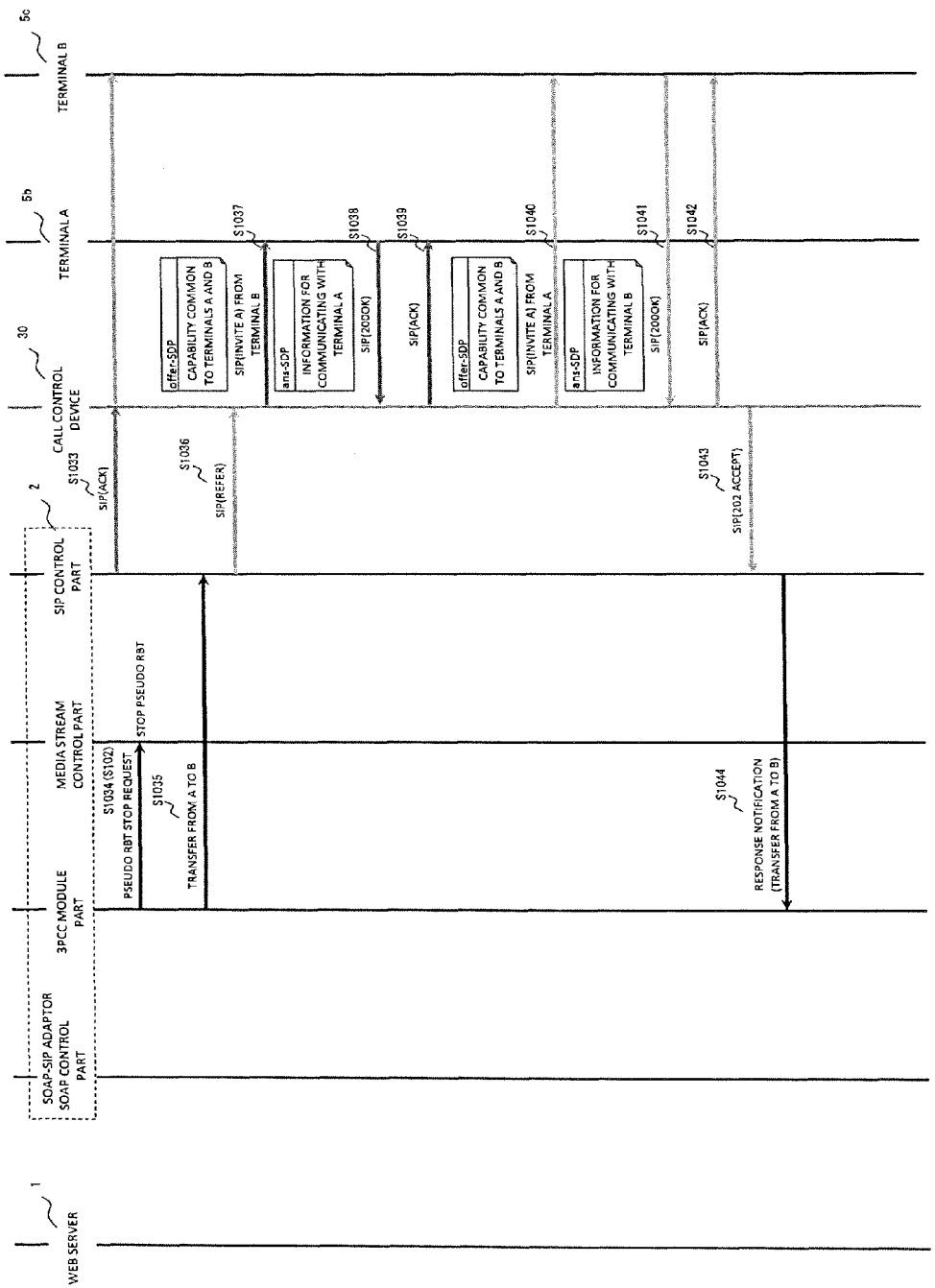
FIG. 31C is a second sequence chart (3) according to a fourth embodiment of the invention.
Figure 31D:
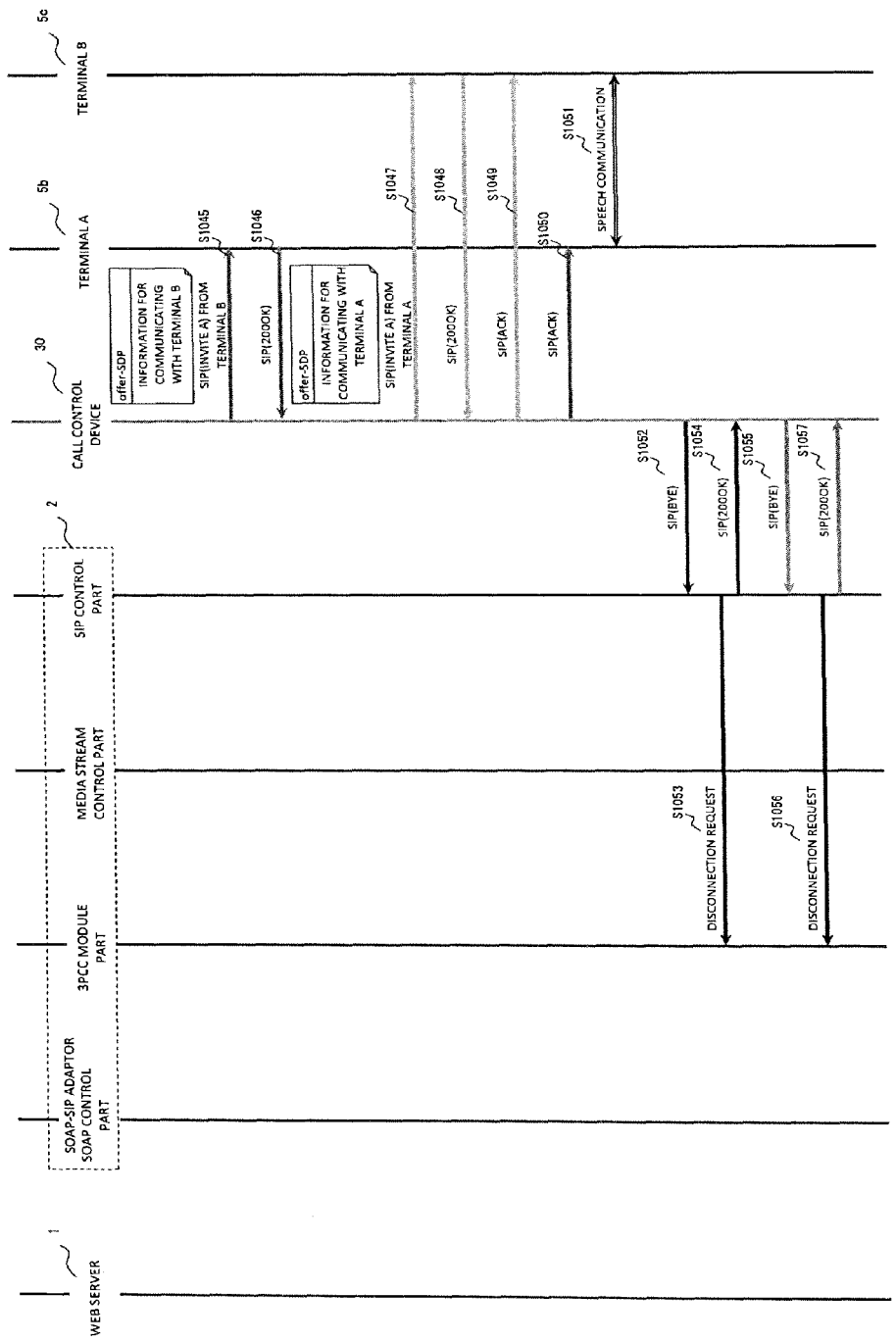
FIG. 31D is a second sequence chart (4) according to a fourth embodiment of the invention.

FIG. 24 is a block diagram of the web server 1.

The web server 1 includes a processing unit 100, an input unit 110, a display unit 120, a storage unit 130, and a communication interface 140, for example. The input unit 110 accepts an input of the session ID or user identifier, for example. The display unit 120 displays the user identifier and the SIP-URI. The storage unit 130 stores the received session ID, for example. The communication interface 140 is the interface for communicating with the SOAP-SIP adaptor 2, for example. The processing unit 100 performs various kinds of processes in the web server 1.

(Operation)

Figure 7:
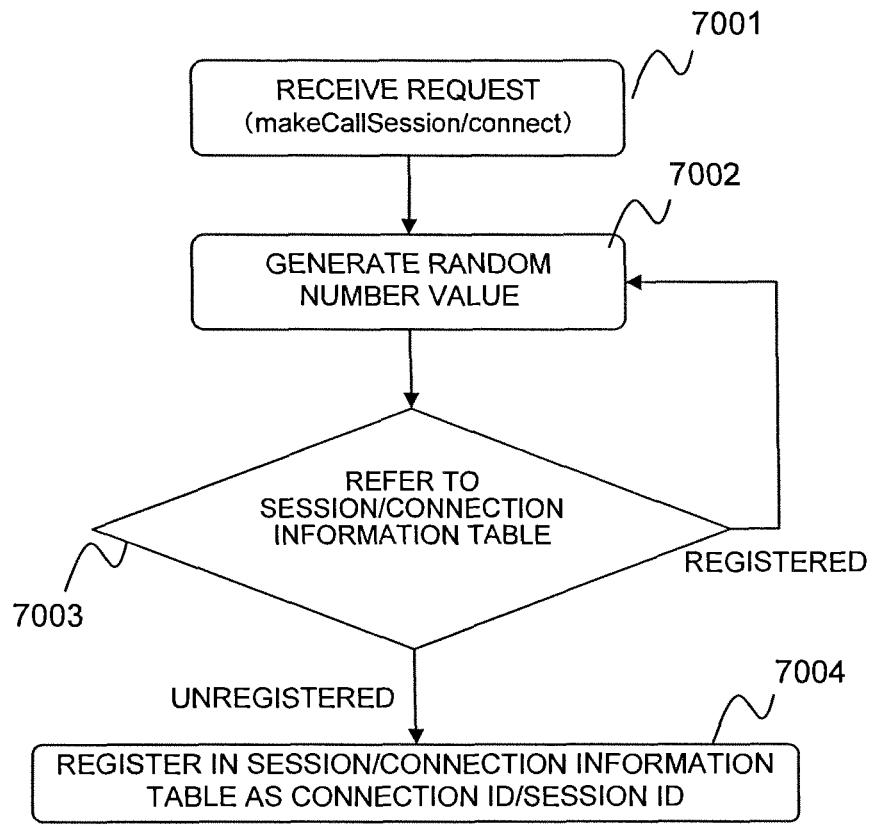
FIG. 7 is a flowchart for explaining the generation of session ID/connection ID in the SOAP-SIP adaptor.
Figure 8:
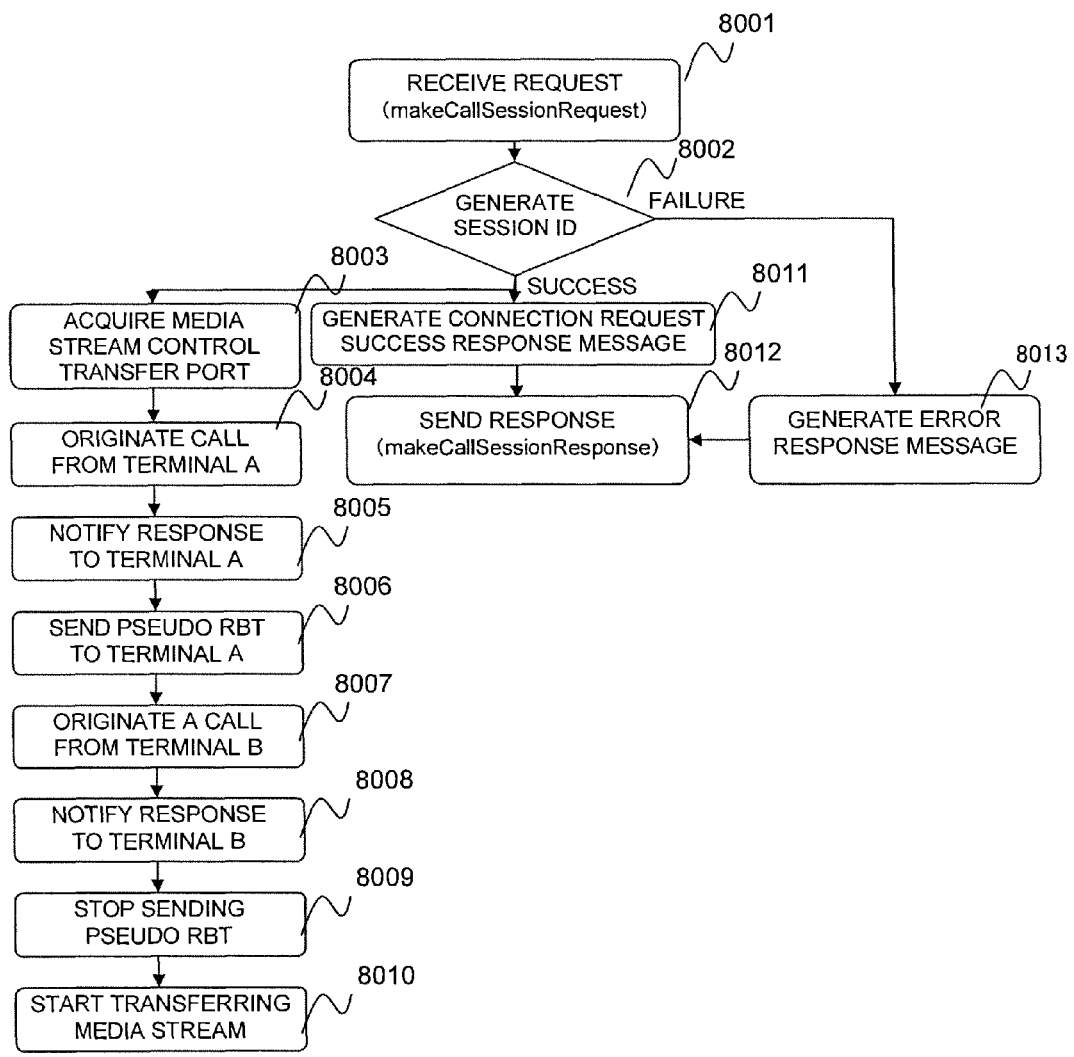
FIG. 8 is a flowchart for explaining the operation in receiving a call start request in the SOAP-SIP adaptor 2 according to the first embodiment.
Figure 12:
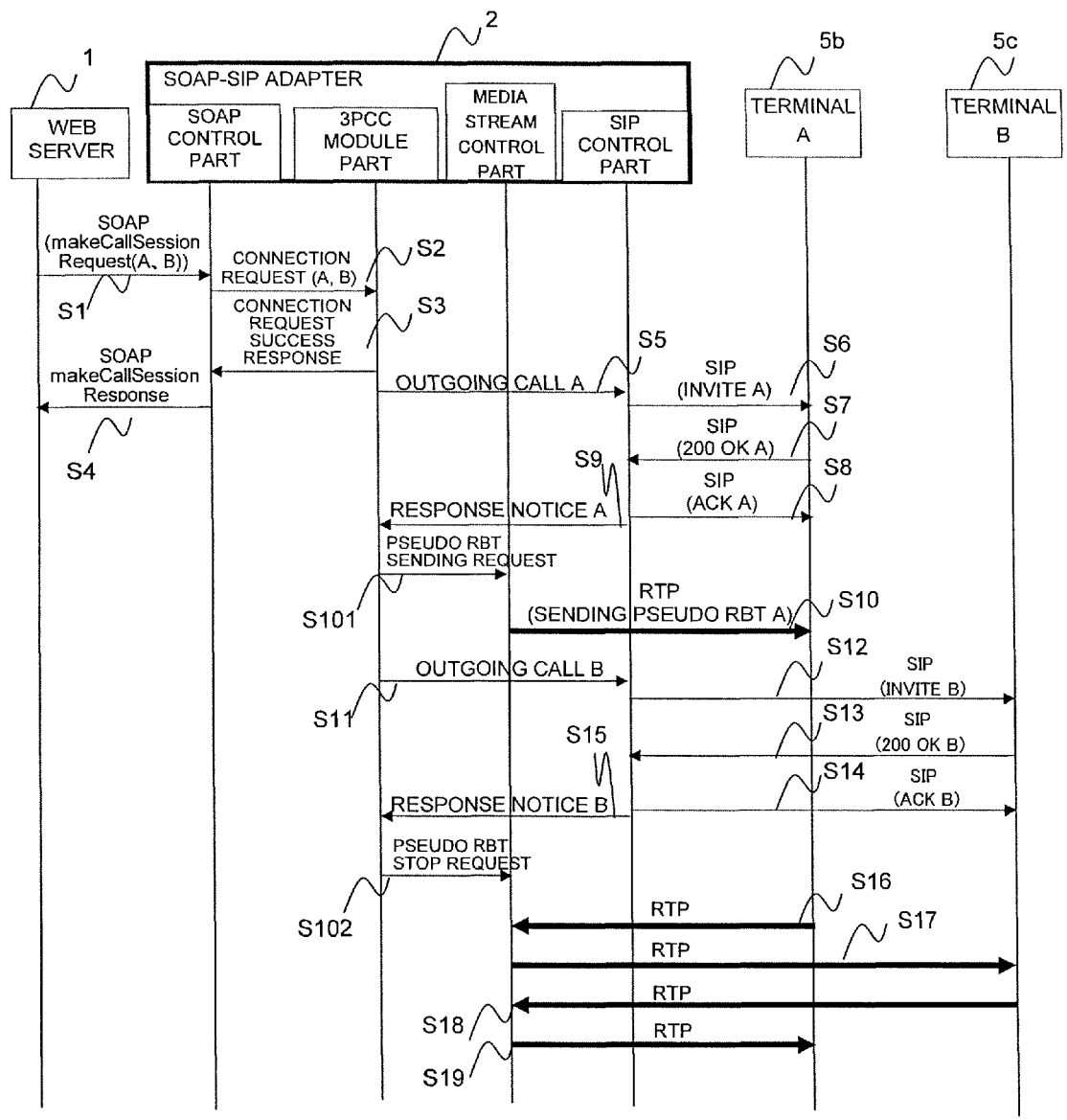
FIG. 12 is a sequence chart (1) for explaining a procedure of a 3PCC service according to the first embodiment.

FIG. 12 is a sequence chart for explaining a procedure of a 3PCC service according to the first embodiment. FIG. 7 is a flowchart for explaining the generation of a session ID/connection ID in the SOAP-SIP adaptor. The connection ID is employed in the second embodiment. FIG. 8 is a flowchart for explaining the operation in receiving a call start request in the SOAP-SIP adaptor 2 according to the first embodiment.

According to this embodiment, the 3PCC service on the NGN with the assured communication quality can be provided.

A flow for the 3PCC service includes the following (a) to (c). (a) Establishment of session between the SOAP-SIP adaptor 2 and the first connection terminal A5b. (b) Establishment of session between the SOAP-SIP adaptor 2 and the second connection terminal B5c. (c) Speech communication between the first connection terminal A5b and the second connection terminal B5c. However, there is a problem that at the stage where (a) is completed and (b) is started, the first connection terminal A5b is placed in a silent state. Thus, the SOAP-SIP adaptor 2 artificially sends a Ringing Back Tone (RBT, connection hold message) to the first connection terminal A5b to resolve this problem.

Also, in the NGN, which has a condition of requiring that the IP addresses for establishing a signaling channel and a data channel are the same, there is a problem that it is impossible to act for the establishment of data channel between the two parties (first connection terminal A5b and second connection terminal B5c) for communication as in the conventional 3PCC service flow. Thus, in this embodiment, the data from the first connection terminal A5b is received by the SOAP-SIP adaptor 2, and transferred to the second connection terminal B5c. The data from the second connection terminal B5c is received by the SOAP-SIP adaptor 2, and transferred to the first connection terminal A5b. Also, the SOAP- SIP adaptor 2 creates the media stream control information table 2040 for implementing the above transfer.

The procedure of this embodiment will be described below by referring to the sequence chart and each flowchart.

First of all, the third party user logs in the Web server 1 by operating the terminal 5a. The Web server 1 inputs the user identifiers (e.g., user names of two parties corresponding to the terminal A5b and the terminal B5c) of the users for communication from the terminal 5a. For example, the two party users for communication may be selected based on a screen displayed at the terminal 5a that has logged in the Web server 1 by the user operation.

The Web server 1 transmits an SOAP make Call Session Request (connection request) to the SOAP-SIP adaptor 2 (S1). The SOAP make Call Session Request includes the SIP-URI corresponding to the two party users to be connected. For example, the Web server acquires the SIP-URI corresponding to the inputted user identifier, in which the user identifier and the SIP-URI of the user are pre-stored associated. The Web server 1 generates the SOAP make Call Session Request including the acquired SIP-URI, and transmits it to the SOAP-SIP adaptor 2.

The SOAP-SIP adaptor 2 starts the connection to each terminal 5b, 5c corresponding to the SIP-URI included in the received SOAP make Call Session Request, and transmits an SOAP make Call Session Response including the session ID generated in the SOAP-SIP adaptor 2 (S2 to S15). The detailed operation of steps S2 to S15 in the SOAP-SIP adaptor 2 will be described below.

The SOAP control part 2101 of the SOAP-SIP adaptor 2 receives the SOAP make Call Session Request, and sends the connection request to the 3PCC module part 2102 (S2). This connection request can be generated in accordance with a proper protocol for use in the SOAP-SIP adaptor 2, based on the received SOAP make Call Session Request, for example, and includes the SIP-URI within the SOAP make Call Session Request.

The 3PCC module part 2102 receives the connection request (7001, 8001), and generates the session ID (8002). Referring to FIG. 7, the generation of the session ID will be described below.

The 3PCC module part 2102, receiving the connection request, generates the random number value (7002). The 3PCC module part 2102 judges whether or not the generated random number value is already registered in the session ID 2011 of the session information table 2010 (7003). If the generated random number value is already registered (i.e., already used), the 3PCC module part 2102 returns to step 7002 to repeat the following process. On the other hand, if the generated random number value is not registered, the 3PCC module part 2102 stores the generated session ID in the session information table 2010 (7004). Further, the 3PCC module part 2102 sets the session state 2012 of the session information table 2010 to "Initial (initial state)".

Also, the 3PCC module part 2102 stores the SIP-URI included in the received connection request in the call participants information table 2020. In an example of the call participants information table 2020 as shown in FIG. 3B, the SIP-URI of the terminal A5b (see 2020_A) and the SIP-URI of the terminal B5c (see 2020_B) are stored. The 3PCC module part 2102 sets the call state 2022 corresponding to each terminal 5b, 5c in the call participants information table 2020 to "Call Participant Initial (initial state)".

Further, the 3PCC module part 2102 stores the terminal information of the terminal A5b and the terminal B5c. Specifically, the 3PCC module part 2102 stores the generated session ID in the terminal information table 2030, corresponding to each terminal 5b, 5c. Also, the 3PCC module part 2102 stores each SIP-URI included in the received connection request in the To URI 2038 corresponding to each terminal 5b, 5c in the terminal information table 2030. The 3PCC module part 2102 sets the terminal state 2032 corresponding to each terminal 5b, 5c in the terminal information table 2030 to "Initial (initial state)". The 3PCC module part 2102 sets the information indicating the call originating side or call incoming side to the Role 2033 corresponding to each terminal 5b, 5c in the terminal information table 2030. Which of the terminals 5b and 5c is the call originating side can be appropriately decided. Also, the 3PCC module part 2102 stores the IP address and port number of the SOAP-SIP adaptor 2 in the send SDP information 2035 of the terminal information table 2030. Also, the 3PCC module part 2102 stores the SIP-URI of the SOAP-SIP adaptor 2 in the From URI 2037 corresponding to each terminal 5b, 5c in the terminal information table 2030. The SIP-URI, IP address and port number of the SOAP-SIP adaptor 2 are pre-stored in the proper storage part.

The 3PCC module part 2102 generates a connection request success response, and sends it to the SOAP control part 2101 (S3, 8011). The connection request success response includes the generated session ID. The SOAP control part 2101 receives the connection request success response, and transmits an SOAP make Call Session Response (connection request success response) to the Web server 1 (S4, 8012). The SOAP make Call Session Response includes the generated session ID, and is generated in accordance with the SOAP, based on the received connection request success response. The Web server 1 receives the SOAP make Call Session Response, and stores the session ID included in the received SOAP make Call Session Response in the proper storage part.

If the generation of the session ID fails at step 8002, the 3PCC module part 2102 generates a connection request failure response (error response message) (8013), and sends it to the SOAP control part 2101. The SOAP control part 2101 receives the connection request failure response, and transmits an SOAP make Call Session Response indicating the failure of connection request to the Web server 1 (8012).

Next, the session between the SOAP-SIP adaptor 2 and the terminal A5b is established.

More specifically, the 3PCC module part 2102 acquires a port for control and transfer of the media stream (8003). The 3PCC module part 2102 sends a call origination request (A) for the terminal A5b to the SIP control part 2104 (S5, 8004). For example, the 3PCC module part 2102 sends a call origination request including the send SDP information 2035, the From URI 2037 and the To URI 2038 corresponding to the terminal A5b stored in the terminal information table 2030 to the SIP control part 2104. Also, the 3PCC module part 2102 stores the current time in the start time 2023 corresponding to the terminal A5b in the call participants information table 2020 as one example. In the example of the call participants information table 2020 as shown in FIG. 3B, "2008.10.22 10:30.30" is stored. The start time 2023 is not limited to the current time, but may be the appropriate time indicating the start of session with the terminal A5b.

The SIP control part 2104 transmits an INVITE message (A) to the terminal A5b in accordance with the To URI included in the call origination request (A) (S6). The INVITE message (A) includes at least the send SDP information, the From URI and the To URI included in the received call origination request, for example. Also, the SIP control part 2104 generates a handle value for identifying the session with the terminal A5b.

The terminal A5b receives the INVITE message (A), and stores the IP address and port number of the SOAP-SIP adaptor 2 included in the send SDP information of the received INVITE message (A) in the proper storage part. The stored IP address and port number are employed in transmitting the media stream, for example. Also, the terminal A5b generates the recv SDP information including the IP address and port number of its own and transmits the 200 OK (A) of the SIP including the generated SDP information to the SOAP-SIP adaptor 2 (S7). The SIP control part 2104 of the SOAP-SIP adaptor 2 receives the 200 OK (A), and transmits ACK (A) of the SIP to the terminal A5b (S8).

The SIP control part 2104 sends a response notification (A) to the 3PCC module part 2102 (S9, 8005). The response notification (A) includes the handle value generated at step S6 and the recv SDP information of the terminal A5b included in the 200 OK received at step S7, for example. The 3PCC module part 2102 stores the handle value and the recv SDP information included in the received response notification (A) in the terminal information table 2030, corresponding to the terminal A5b. The handle value may be stored at an appropriate timing from step S6 to step S8. The 3PCC module part 2102 updates the terminal state 2033 corresponding to the terminal A5b in the terminal information table 2030 to "Call Complete (session established state)". Also, the 3PCC module part 2102 updates the call state 2022 corresponding to the terminal A5b in the call participants information table 2020 to "Call Participant Connected (connected state)". The terminal state 2033 may be properly updated in sending or receiving the SIP message (e.g., 200 OK), for example.

Also, the 3PCC module part 2102 sends the generated session ID, the IP address and port number of the SOAP-SIP adaptor 2, and the IP address and port number of the terminal A5b included in the received recv SDP information to the media stream control part 2103. The media stream control part 2103 stores the pieces of received information in the media stream control information table 2040. For example, the media stream control part 2103 stores the received IP address and port number of the SOAP-SIP adaptor 2 in the media stream sending or receiving IP address 2042 and the media stream sending or receiving port number 2043, and stores the received IP address and port number of the terminal A5b in the partner IP address (1) 2044 and the partner port number (1) 2045. Also, the media stream control part 2103 stores the received session ID.

The 3PCC module part 2102 sends a pseudo RBT send request to the media stream control part 2103 (S101). The media stream control part 2103, receiving the pseudo RBT send request, transmits a pseudo RBT to the terminal A5b in accordance with a Real-time Transport Protocol (RTP), for example (S10, 8006). The media stream control part 2103 may use an announcement or proper music to the effect that the partner is being called as the pseudo RBT, for example. In this embodiment, at a stage where the establishment of session with the terminal A5b is completed, and the establishment of session with the terminal B5c is started, the terminal A5b is prevented from being silent. This pseudo RBT can be continually sent until there is a stop request as will be described later.

Next, the session between the SOAP-SIP adaptor 2 and the terminal B5c is established.

The 3PCC module part 2102 sends a call origination request (B) for the terminal B5c to the SIP control part 2104 (S11, 8007). For example, the 3PCC module part 2102 sends a call origination request including the send SDP information 2035, the From URI 2037 and the To URI 2038 corresponding to the terminal B5c stored in the terminal information table 2030 to the SIP control part 2104. Also, the 3PCC module part 2102 stores the current time in the start time 2023 corresponding to the terminal B5c in the call participants information table 2020. In the example of the call participants information table 2020 as shown in FIG. 3B, "2008.10.22 10:30.45" is stored.

The SIP control part 2104 transmits an INVITE message (B) to the terminal B5c in accordance with the To URI included in the call origination request (B) (S12). The INVITE message (B) includes at least the send SDP information, From URI and To URI included in the received call origination request, for example. Also, the SIP control part 2104 generates a handle value for identifying the session with the terminal B5c.

The terminal B5c receives the INVITE message (B), and stores the IP address and port number of the SOAP-SIP adaptor 2 included in the send SDP information of the received INVITE message (B) in the proper storage part. Also, the terminal B5c generates the recv SDP information including the IP address and port number of its own and transmits the 200 OK (B) including the generated recv SDP information to the SOAP-SIP adaptor 2 (S13). The SIP control part 2104 of the SOAP-SIP adaptor 2 receives the 200 OK (B), and transmits ACK (B) to the terminal B5c (S14).

The SIP control part 2104 sends a response notification (B) to the 3PCC module part 2102 (S15, 8008). The response notification (B) includes the handle value generated at step S12 and the recv SDP information of the terminal B5c included in the 200 OK received at step S13, for example. The 3PCC module part 2102 stores the handle value and the recv SDP information included in the received response notification (B) in the terminal information table 2030, corresponding to the terminal B5c. The handle value may be stored at an appropriate timing from step S12 to step S14. The 3PCC module part 2102 updates the terminal state 2033 corresponding to the terminal B5c in the terminal information table 2030 to "Call Complete (session established state)". Also, the 3PCC module part 2102 updates the call state 2022 corresponding to the terminal B5c in the call participants information table 2020 to "Call Participant Connected (connected state)". Also, the 3PCC module part 2102 updates the session state in the session information table 2010 to "Connected (connected state)".

The 3PCC module part 2102 sends the session ID, the IP address and port number of the terminal B5c included in the received recv SDP information to the media stream control part 2103. The media stream control part 2103 stores the IP address and port number of the terminal B5c in the partner IP address (2) 2046 and the partner port number (2) 2047 in the media stream control information table 2040, corresponding to the received session ID.

The 3PCC module part 2102 sends a pseudo RBT stop request to the media stream control part 2103 (S102, 8009). The media stream control part 2103 stops the transmission of a pseudo RBT in accordance with the pseudo RBT stop request.

The SOAP-SIP adaptor 2 starts to transfer the media stream between the terminal A5b and the terminal B5c (8010).

For example, the terminal A5b transmits the media stream to the SOAP-SIP adaptor 2 in accordance with the RTP (S16). At this time, the terminal A5b sets the destination at the IP address and port number of the SOAP-SIP adaptor 2 stored at step S6 and sets the sender at the IP address and port number of its own.

The media stream control part 2103 of the SOAP-SIP adaptor 2 transfers the received media stream to the terminal B5c by referring to the media stream control information table

2040 (S17). For example, the media stream control part 2103 acquires the corresponding partner IP address and port number by referring to the media stream control information table 2040 based on the IP address and port number of the sender in the received media stream. In an example of the media stream control information table 2040 as shown in FIG. 3D, the IP address and port number of the sender in the received media stream are the IP address (10.0.2.1) and the port number (20000) of the terminal A5*b*, whereby the corresponding partner IP address (2) 2046 (10.0.2.2) and port number (2) 2047 (30000) are acquired. The media stream control part 2103 transfers the received media stream to the terminal B5*c* in accordance with the acquired IP address and port number.

Similarly, the terminal B5*c* transmits the media stream to the SOAP-SIP adaptor 2 in accordance with the RTP (S18). The terminal B5*c* sets the destination at the IP address and port number of the SOAP-SIP adaptor 2 stored at step S12 and sets the sender at the IP address and port number of its own, like the terminal A5*b*.

The media stream control part 2103 of the SOAP-SIP adaptor 2 transfers the received media stream to the terminal A5*b* by referring to the media stream control information table 2040 (S19). In the example of the media stream control information table 2040 as shown in FIG. 3D, the IP address and port number of the sender in the received media stream are the IP address (10.0.2.2) and the port number (30000) of the terminal B5*c*, whereby the corresponding partner IP address (1) 2044 (10.0.2.1) and port number (1) 2045 (20000) are acquired. The media stream control part 2103 transfers the received media stream to the terminal A5*b* in accordance with the acquired IP address and port number.

As described above, the IP address for establishing the signaling channel and the IP address for establishing the data channel are the same, whereby the 3PCC service on the NGN with the assured communication quality can be provided in such a way that the data from the terminal A5*b* is received by the SOAP-SIP adaptor 2, and transferred to the terminal B5*c*, and the data from the terminal B5*c* is received by the SOAP-SIP adaptor 2, and transferred to the terminal A5*b*.

Figure 9:
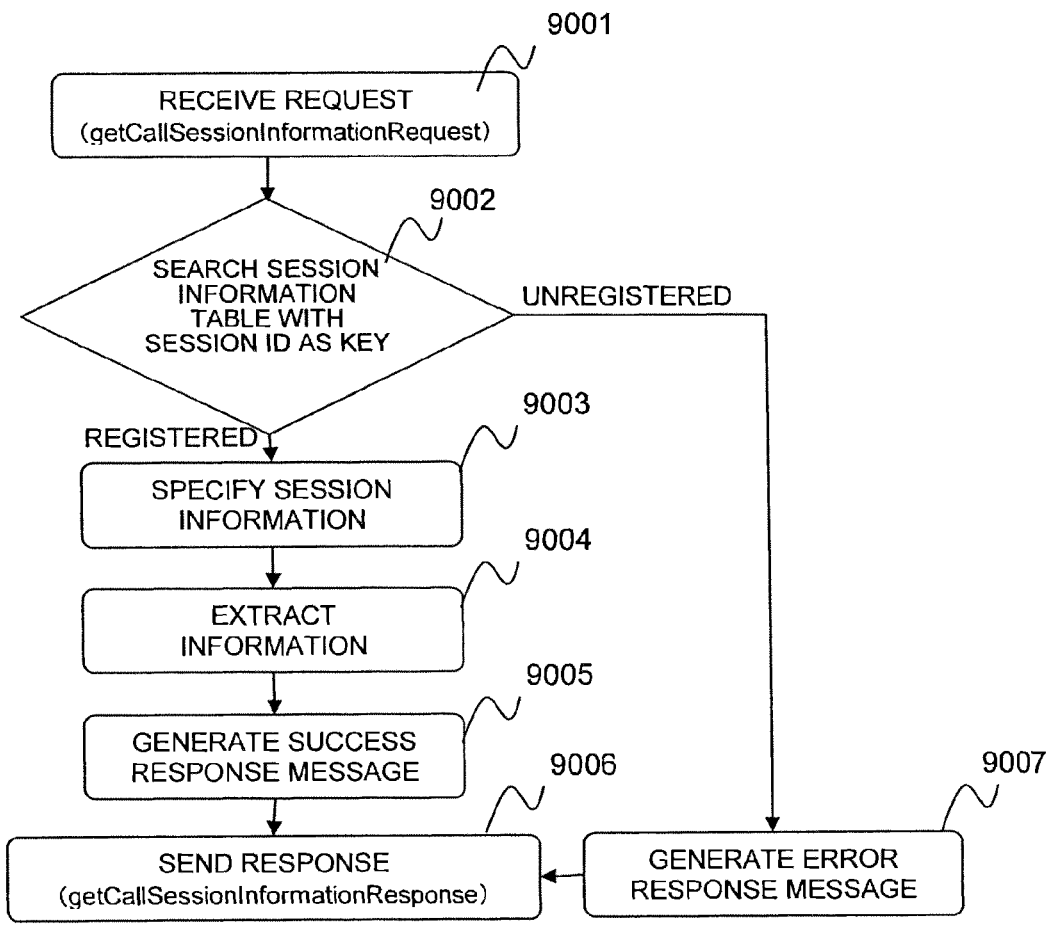
FIG. 9 is a flowchart for explaining the operation in receiving a call information (session information) request in the SOAP-SIP adaptor 2 according to the first embodiment.
Figure 13:
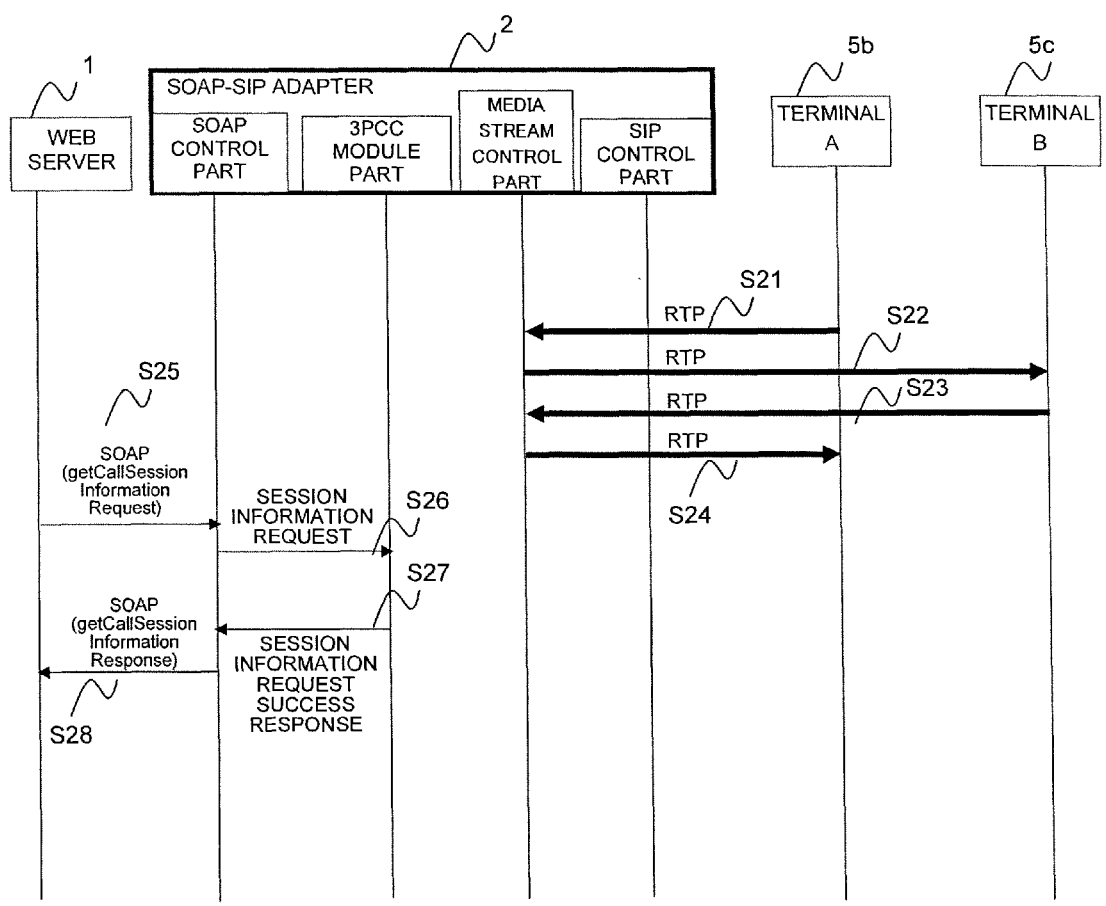
FIG. 13 is a sequence chart (2) for explaining a procedure of a 3PCC service according to the first embodiment.

FIG. 13 is a sequence chart (2) for explaining a procedure of the 3PCC service according to the first embodiment. FIG. 9 is a flowchart for explaining the operation in receiving a call information (session information) request in the SOAP-SIP adaptor 2 according to the first embodiment.

Referring to FIGS. 9 and 13, the operation of the Web server 1 acquiring the call information will be described below. Herein, the Web server 1 can acquire the information corresponding to the designated session ID. The process of steps S21 to S24 in FIG. 13 corresponds to the process of steps S16 to S19 as described above.

The Web server 1 transmits an SOAP get Call Session Information Request (session information request, call information request) to the SOAP-SIP adaptor 2 (S25). The SOAP get Call Session Information Request includes the session ID of the call information to be acquired. Specifically, the Web server generates the SOAP get Call Session Information Request including the session ID stored at step S4 as described above, and transmits it to the SOAP-SIP adaptor 2. The Web server 1 may select the session ID of the call information to be acquired from the session ID stored at step S4 as described above, based on the user operation, from the terminal 5*a*.

The SOAP-SIP adaptor 2 searches the session information table 2010 held in the SOAP-SIP adaptor 2 with the session ID included in the SOAP get Call Session Information Request as the key, and sends an SOAP get Call Session Information Response including the table information with the matched session ID 2011 (S26 to S28). The detailed operation of steps S26 to S28 in the SOAP-SIP adaptor 2 will be described below.

First of all, the SOAP control part 2101 of the SOAP-SIP adaptor 2 receives an SOAP get Call Session Information Request, and sends the session information request to the 3PCC module part 2102 (S26). This session information request includes the session ID within the SOAP get Call Session Information Request.

The 3PCC module part 2102, receiving the session information request (9001), searches the session information table 2010 for the session ID 2011 based on the session ID included in the received session information request (9002). If the session ID included in the received session information request is already registered in the session information table 2010, the session information corresponding to the applicable session ID 2011 is specified (9003). The 3PCC module part 2102 acquires the URI 2021 and the call state 2022 corresponding to each terminal 5*b*, 5*c*, for example, by referring to the call participants information table (call participants state) 2020 corresponding to the applicable session ID 2011 (9004). Further, the 3PCC module part 2102 acquires the recv SDP information 2036 of each terminal from the terminal information (for Client A) 2030_A and the terminal information (for Client B) 2030_B corresponding to the applicable session ID 2011, for example.

The 3PCC module part 2102 generates a session information request success response including the session ID 2011, and the acquired URI 2021, call state 2022 and recv SDP information 2036 (9005), and sends the generated session information request success response to the SOAP control part 2101 (S27). The SOAP control part 2101 receives the session information request success response, and transmits an SOAP get Call Session Information Response (session information request success response) to the Web server 1 (S28, 9006). The SOAP get Call Session Information Response includes the session ID, URI, call state and recv SDP information within the received session information request success response, and is generated in accordance with the SOAP. If the session ID included in the received session information request is not registered at step 9002, the 3PCC module part 2102 generates a session information request failure response (error response message) (9007), and sends the generated session information request failure response to the SOAP control part 2101. The SOAP control part 2101 receives the session information request failure response, and transmits an SOAP get Call Session Information Response indicating the failure of the session information request to the Web server 1 (9006).

The Web server 1 receives the SOAP get Call Session Information Response, and can confirm the state of session as to whether or not the requested communication holds by referring to the call state included in the received SOAP get Call Session Information Response, for example. Also, if the call is terminated from the terminal, for example, the call state becomes "Call Participant Terminated (terminated state)", whereby the Web server 1 can judge that the call is terminated from the terminal A5*b* or terminal B5*c*. Also, if the call state is not normal, for example, the Web server 1 may stop the communication using an SOAP end Call Session Request as will be described later.

Figure 10:
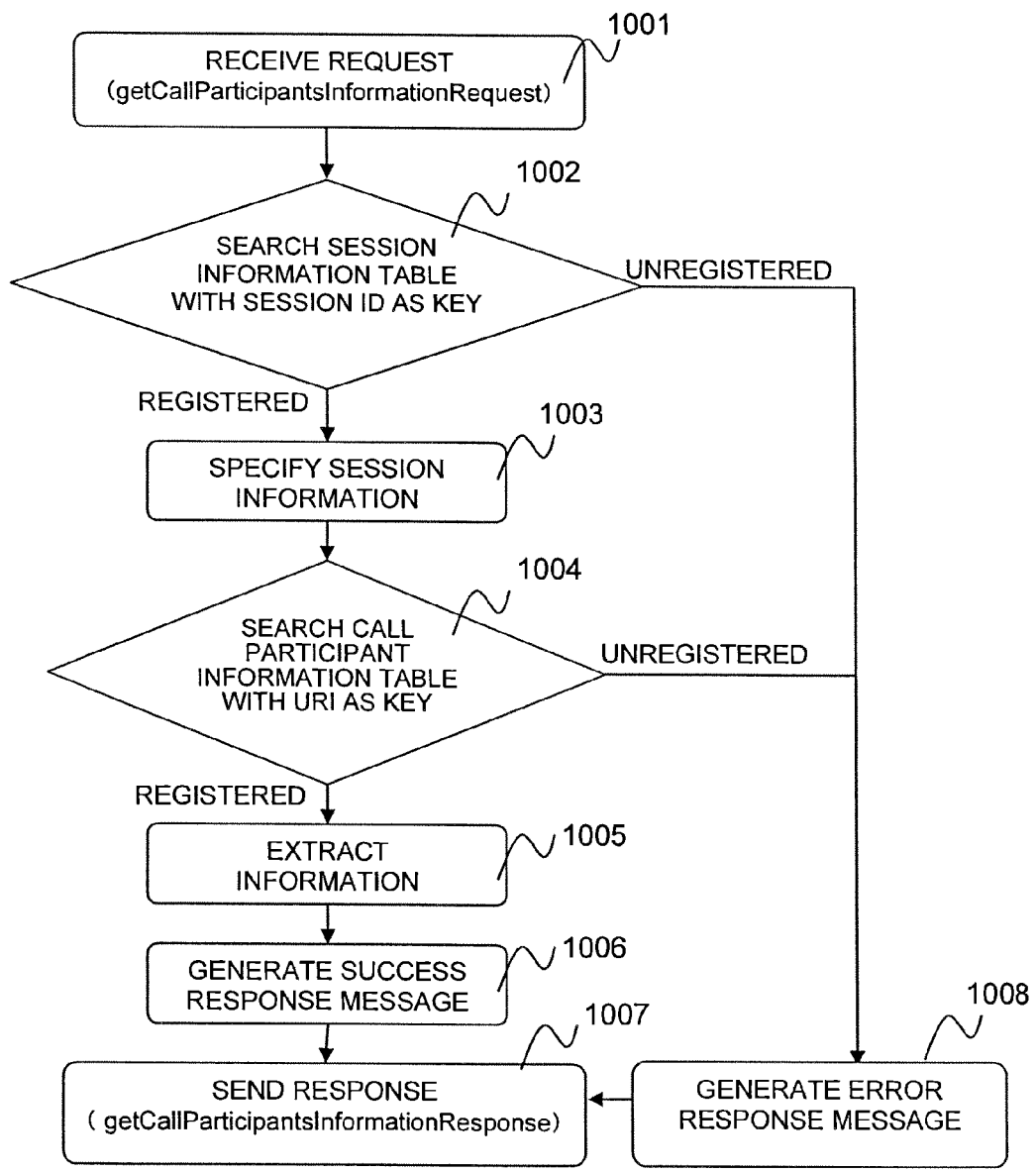
FIG. 10 is a flowchart for explaining the operation in receiving a call participants information request in the SOAP-SIP adaptor 2 according to the first embodiment.
Figure 14:
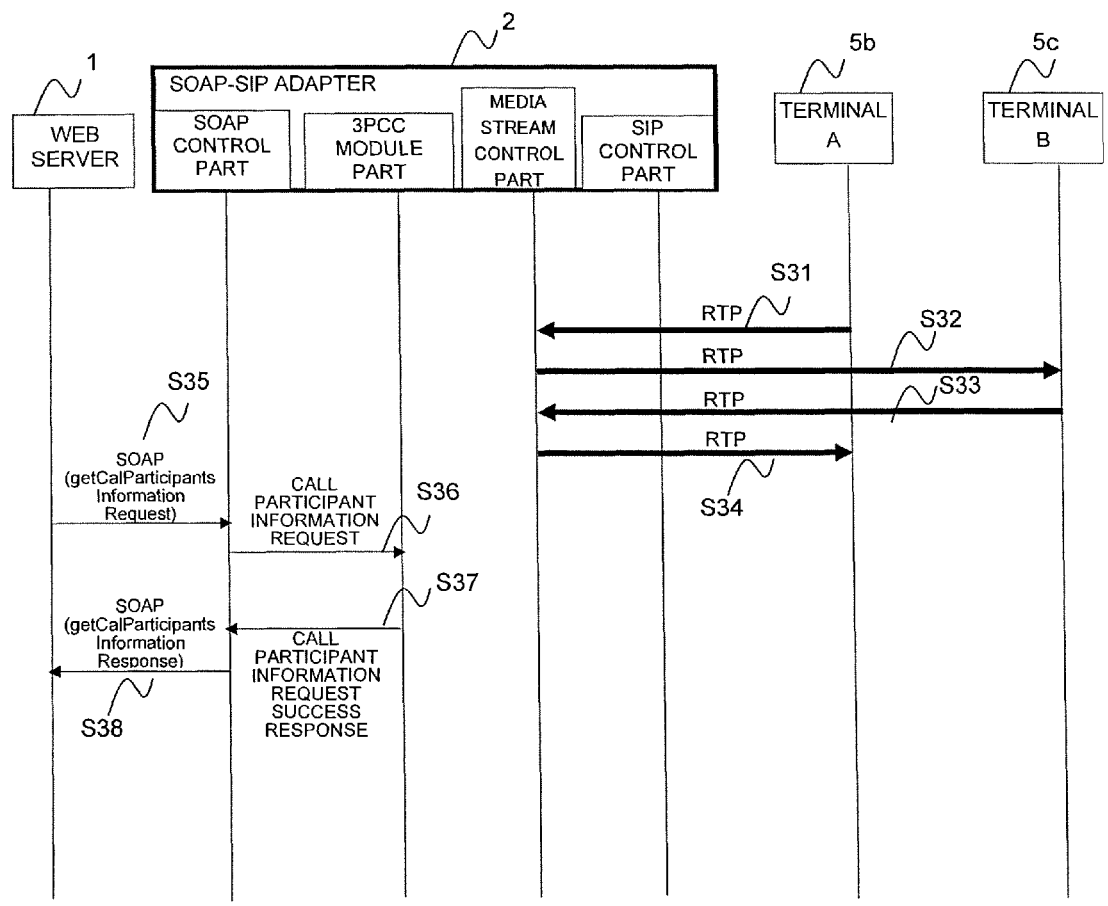
FIG. 14 is a sequence chart (3) for explaining a procedure of a 3PCC service according to the first embodiment.

FIG. 14 is a sequence chart (3) for explaining a procedure of the 3PCC service according to the first embodiment. FIG. 10 is a flowchart for explaining the operation in receiving a call participants information request in the SOAP-SIP adaptor 2 according to the first embodiment.

Referring to FIGS. 10 and 14, the operation of the Web server 1 acquiring the call participants information will be described below. Herein, the user information corresponding to the designated SIP-URI can be acquired. The process of steps S31 to S34 in FIG. 14 corresponds to the process of steps S16 to S19 as described above.

The Web server 1 transmits an SOAP get Call Participants Information Request (call participants information request) to the SOAP-SIP adaptor 2 (S35). The SOAP get Call Participants Information Request includes the session ID and URI of the call participants information to be acquired. Specifically, the Web server 1 generates an SOAP get Call Session Information Request including the session ID stored at step S4 as described above and the SIP-URI of the desired call participant, and transmits it to the SOAP-SIP adaptor 2. As one example, the Web server 1 may select the session ID and the user identifier (e.g., user name corresponding to the terminal A5b or terminal B5c) of the call information to be acquired, based on the user operation, from the terminal 5a. The Web server 1 can acquire the SIP-URI corresponding to the inputted user identifier, in which the user identifier and the SIP-URI of the user are pre-stored associated.

The SOAP-SIP adaptor 2 searches the session information table 2010 held in the SOAP-SIP adaptor 2 with the session ID included in the SOAP get Call Participants Information Request as the key, and specifies the table information with the matched session ID 2011. Further, the SOAP-SIP adaptor 2 searches the call participants information table 2020 with the SIP-URI included in the get Call Participants Information Request as the key, and transmits an SOAP get Call Participants Information Response including the table information corresponding to the matched SIP-URI 2021 (S36 to S38). The operation of steps S36 to S38 in the SOAP-SIP adaptor 2 will be described below.

The SOAP control part 2101 of the SOAP-SIP adaptor 2 receives the SOAP get Call Participants Information Request, and sends the call participants information request to the 3PCC module part 2102 (S36). This call participants information request includes the session ID and the SIP-URI within the SOAP get Call Participants Information Request. The 3PCC module part 2102 receives the call participants information request (1001), and searches the session information table 2010 for the session ID 2011, based on the session ID included in the received call participants information request (1002). If the session ID included in the received call participants information request is already registered in the session information table 2010, the session information is specified by the applicable session ID 2011 (1003). The 3PCC module part 2102 searches the call participants information table (call participants state) 2020 corresponding to the applicable session ID 2011 for the URI 2021, based on the SIP-URI included in the received call participants information request (1004). If the SIP-URI included in the received call participants information request is already registered, the 3PCC module part 2102 acquires the call state 2022 corresponding to the applicable URI 2021 (1005). Also, the 3PCC module part 2102 acquires the corresponding recv SDP information 2036 by referring to the To URI 2038 in the terminal information table 2030 based on the SIP-URI included in the received call participants information request.

The 3PCC module part 2102 generates a call participants information request success response including the URI 2021, and the acquired call state 2022 and recv SDP information 2036 (1006), and sends the generated call participants information request success response to the SOAP control part 2101 (S37). The SOAP control part 2101 receives the call participants information request success response, and transmits an SOAP get Call Participants Information Response (call participants information request success response) to the Web server 1 (S38, 1007). The SOAP get Call Participants Information Response includes the URI, call state and recv SDP information within the received call participants information request success response, and is generated in accordance with the SOAP.

If the session ID included in the received call participants information request is not registered at step 1002, and if the SIP-URI included in the received call participants information request is not registered at step 1004, the 3PCC module part 2102 generates a call participants information request failure response (error response message) (1008), and sends the generated call participants information request failure response to the SOAP control part 2101. The SOAP control part 2101 receives the call participants information request failure response, and transmits an SOAP get Call Participants Information Response indicating the failure of the call participants information request to the Web server 1 (1007).

Figure 11:
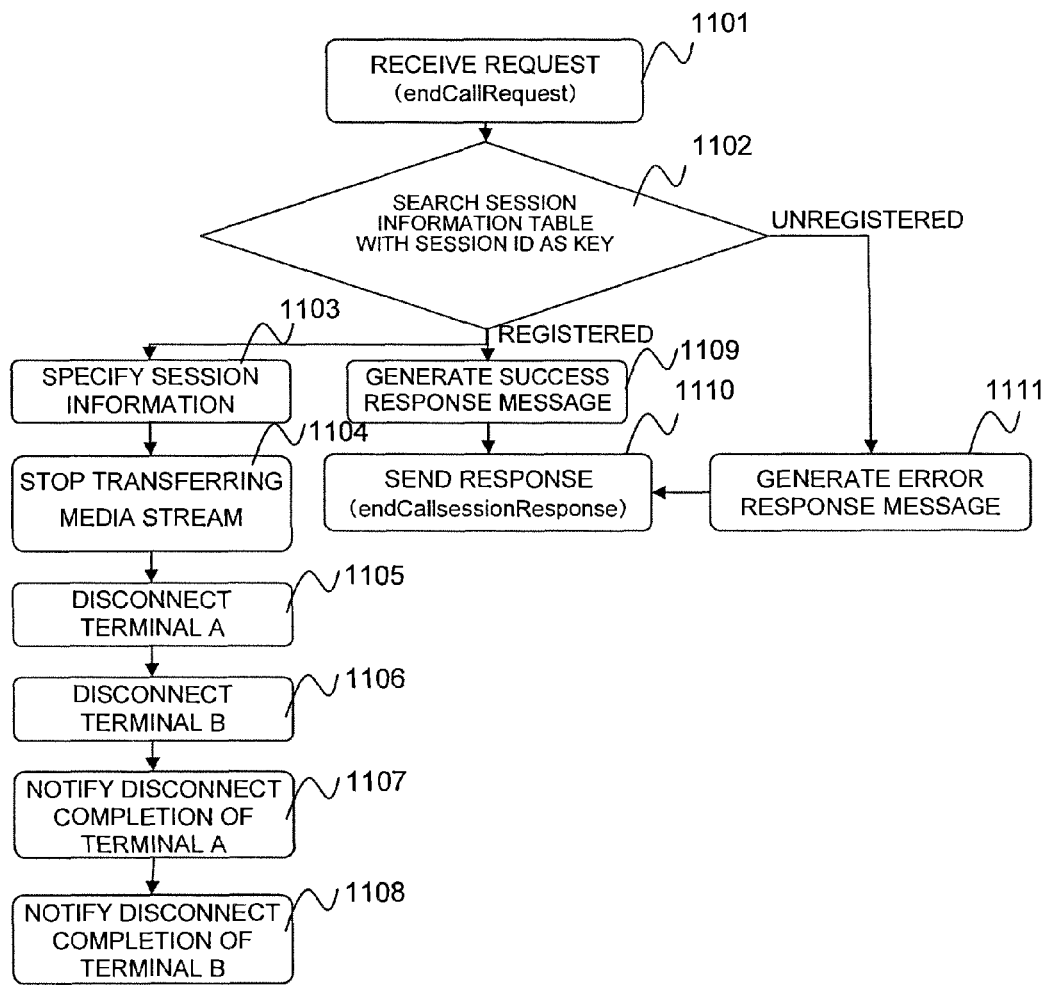
FIG. 11 is a flowchart for explaining the operation in receiving a call end request in the SOAP-SIP adaptor 2 according to the first embodiment.
Figure 15:
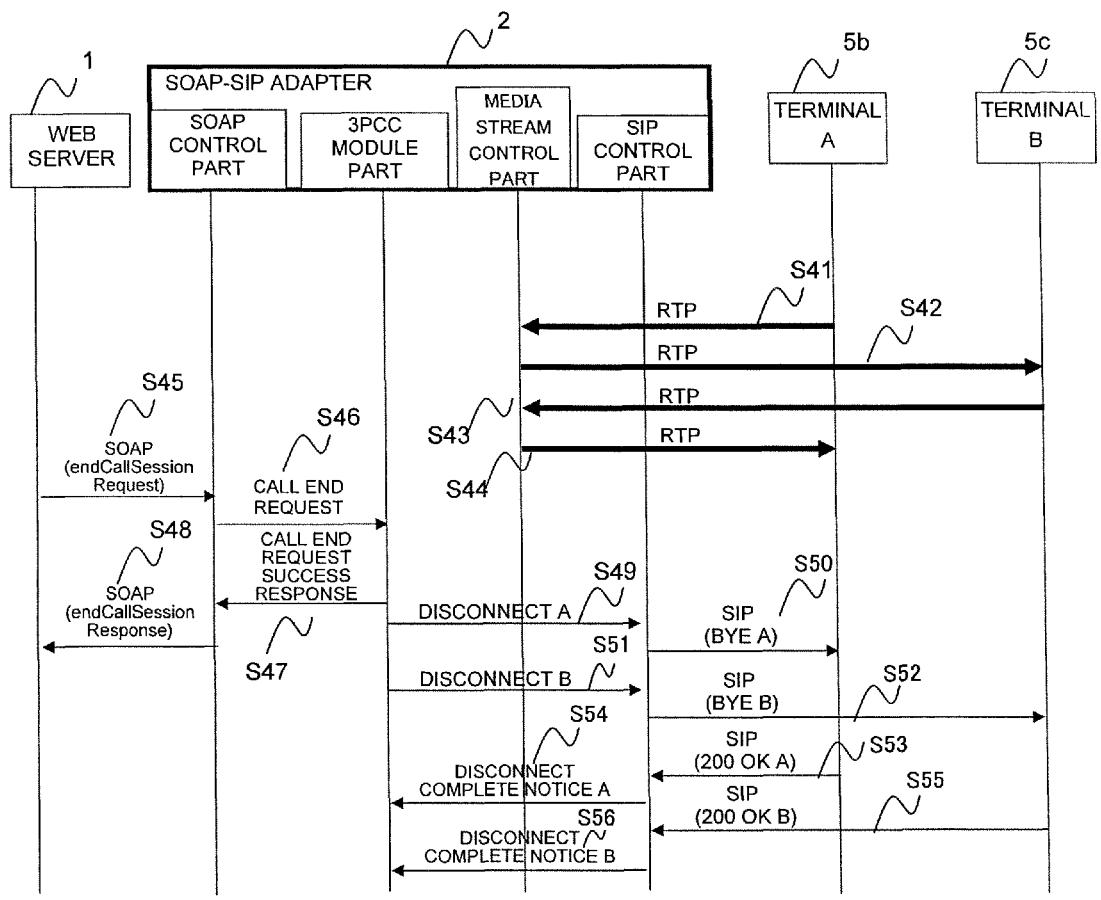
FIG. 15 is a sequence chart (4) for explaining a procedure of a 3PCC service according to the first embodiment.

FIG. 15 is a sequence chart (4) for explaining a procedure of the 3PCC service according to the first embodiment. FIG. 11 is a flowchart for explaining the operation in receiving a call end request in the SOAP-SIP adaptor 2 according to the first embodiment.

Referring to FIGS. 11 and 15, the operation of the Web server 1 ending the call will be described below. The process of steps S41 to S44 in FIG. 15 corresponds to the process of steps S16 to S19 as described above.

The Web server 1 transmits an SOAP end Call Session Request (call end request) to the SOAP-SIP adaptor 2 (S45). The SOAP end Call Session Request includes the session ID of the call to be ended. Specifically, the Web server 1 generates the SOAP end Call Session Request including the session ID stored at step S4 as described above and transmits it to the SOAP-SIP adaptor 2. As one example, the Web server 1 may select the session ID of the call to be ended from the session ID stored at step S4 as described above, based on the user operation, from the terminal 5a.

The SOAP-SIP adaptor 2 searches the session information table 2010 held in the SOAP-SIP adaptor 2 with the session ID included in the SOAP end Call Session Request as the key, specifies the terminals 5b, 5c to be disconnected from the table information with the matched session ID 2011, and disconnects thereof (S46 to S56). The detailed operation of steps S46 to S56 in the SOAP-SIP adaptor 2 will be described below.

The SOAP control part 2101 of the SOAP-SIP adaptor 2 receives the SOAP end Call Session Request (call end request), and sends the call end request to the 3PCC module part 2102 (S46). This call end request includes the session ID within the SOAP end Call Session Request. The 3PCC module part 2102 receives the call end request (1101), and searches the session information table 2010 for the session ID 2011, based on the session ID included in the received call end request (1102).

If the session ID included in the received call end request is already registered in the session information table 2010, the 3PCC module part 2102 generates a call end request success response (1109), and sends the generated call end request success response to the SOAP control part 2101 (S47). The SOAP control part 2101, receiving the call end request success response, transmits an SOAP end Call Session Response (call end request success response) to the Web server 1 (S48, 1110). For the SOAP end Call Session Response, only the success response may be transmitted.

Also, the session information is specified by the applicable session ID 2011, and two parties (herein the terminal A5b and terminal B5c) during speech communication are specified (1103). For example, the 3PCC module part 2102 acquires the SIP-URI 2021 of each terminal A5b or terminal B5c by referring to the call participants information table 2020 corresponding to the session ID included in the received call end request. The media stream control part 2103 stops transferring the media stream (1104). A media stream transfer stop request may be sent from the 3PCC module part 2102 to the media stream control part 2103.

The 3PCC module part 2102 sends a disconnect request (A) including the acquired SIP-URI to the SIP control part 2104 in accordance with one of the acquired SIP-URIs (S49, 1105). The SIP control part 2104 receives the disconnect request (A), and transmits a BYE message (A) of the SIP to the terminal A5b with the SIP-URI included in the received disconnect request (A) as the To URI (S50).

Similarly, the 3PCC module part 2102 sends a disconnect request (B) including the acquired SIP-URI to the SIP control part 2104 in accordance with the other acquired SIP-URI (S51, 1106). The SIP control part 2104 receives the disconnect request (B), and transmits a BYE message (B) to the terminal B5c with the SIP-URI included in the received disconnect request (B) as the To URI (S52).

The terminal A5b transmits the 200 OK (A) for the BYE message (A) received at step S50 to the SOAP-SIP adaptor 2 (S53). The SIP control part 2104 of the SOAP-SIP adaptor 2 receives the 200 OK (A), and sends a disconnect complete notification (A) to the 3PCC module part 2102 (S54, 1107).

Similarly, the terminal B5c transmits the 200 OK (B) for the BYE message (B) received at step S52 to the SOAP-SIP adaptor (S55). The SIP control part 2104 of the SOAP-SIP adaptor 2 receives the 200 OK (B), and sends a disconnect complete notification (B) to the 3PCC module part 2102 (S56, 1108).

If the session ID included in the received call end request is not registered at step 1102, the 3PCC module part 2102 generates a call end request failure response (error response message) (1111), and sends the generated call end request failure response to the SOAP control part 2101. The SOAP control part 2101 receives the call end request failure response, and transmits an SOAP end Call Session Response indicating the failure of the call end request to the Web server 1 (1110).

2. Second Embodiment (Network Configuration)

Figure 4:
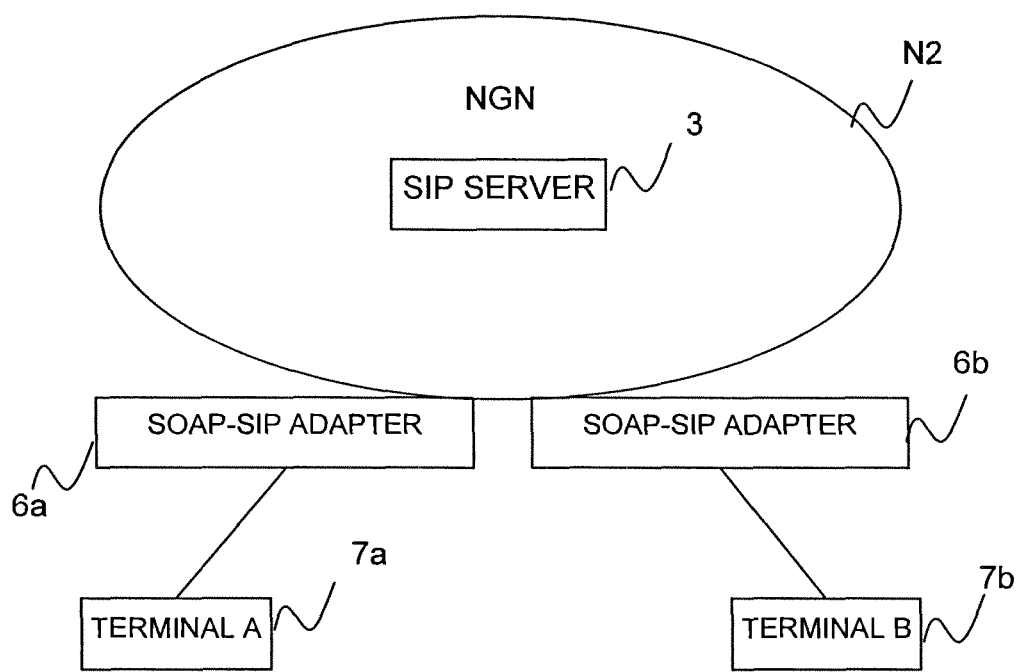
FIG. 4 is an explanatory view showing a configuration example of a communication network according to a second embodiment.

FIG. 4 is an explanatory view showing a configuration example of a communication network according to a second embodiment.

The communication network (system) of this embodiment includes the SIP server 3 and SOAP-SIP adaptors 6a and 6b, for example. The SIP server 3 is installed in the NGN N2.

The SOAP-SIP adaptor 6a communicates with an SOAP-SIP adaptor 6b via the NGN N2. Also, terminals A7a and B7b communicate via the SOAP-SIP adaptors 6a and 6b. To which of SOAP-SIP adaptors 6 a terminal 7 is connected is predetermined, in which the SOAP-SIP adaptor 6a and the terminal A7a correspond one to one, and the SOAP-SIP adaptor 6b and the terminal B7b correspond one to one as well. For example, when it is desired to communicate with the terminal B7b, it is possible to communicate with the terminal B7b by designating the SOAP-SIP adaptor 6b. Also, the SOAP-SIP adaptors 6 and the terminals 7 may be provided in a one-to-many relationship, and the correspondence between the SOAP-SIP adaptors 6 and the terminals 7 connected may be stored in a proper device.

Figure 5:
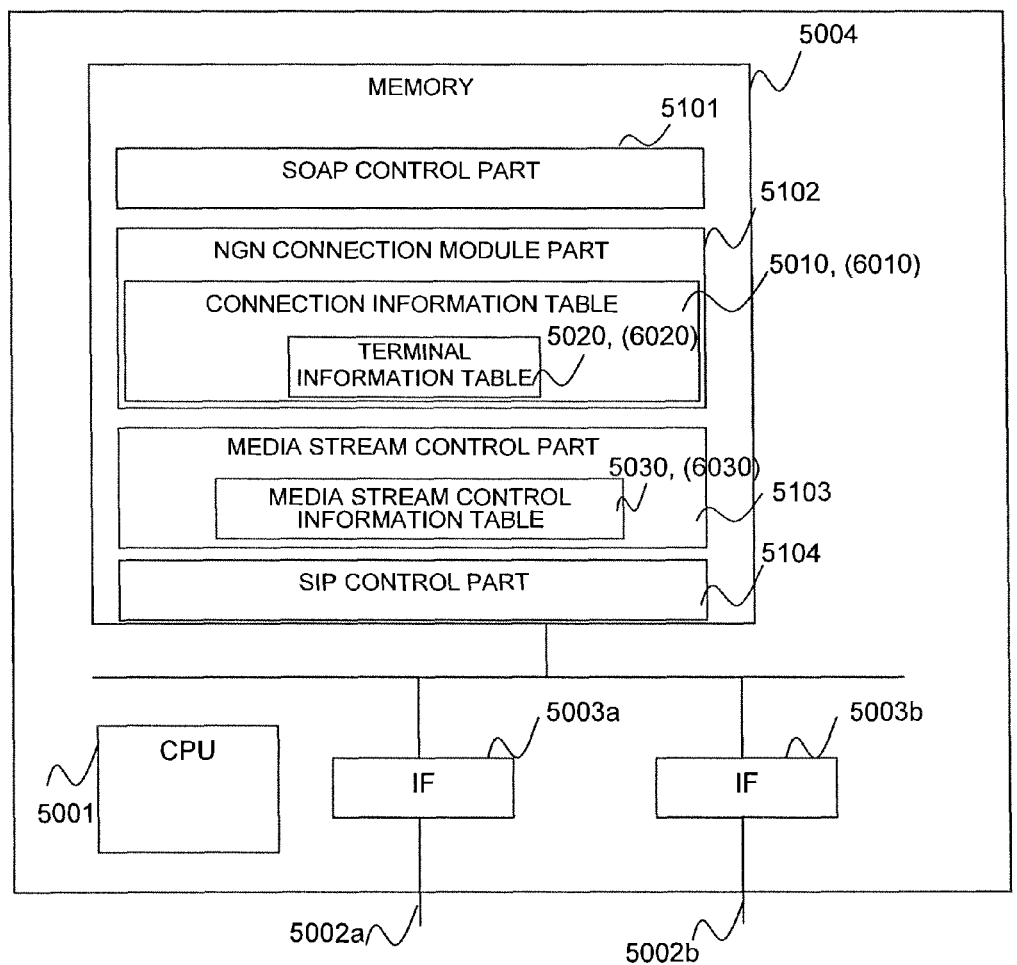
FIG. 5 is an explanatory view showing a configuration example of an SOAP-SIP adaptor 6 according to the second embodiment.

FIG. 5 is an explanatory view showing a configuration example of the SOAP-SIP adaptor 6 according to the second embodiment.

The SOAP-SIP adaptor 6 of this embodiment includes an NGN connection module part 5102, instead of the 3PCC module part 2102 of the first embodiment, for example. The NGN connection module part 5102 has a connection information table 5010 that has a terminal information table 5020. A CPU 5001, the IFs 5003a and 5003b, an SOAP control part 5101, a media stream control part 5103, and an SIP control part 5104 are the same as in the first embodiment.

Figure 6A:
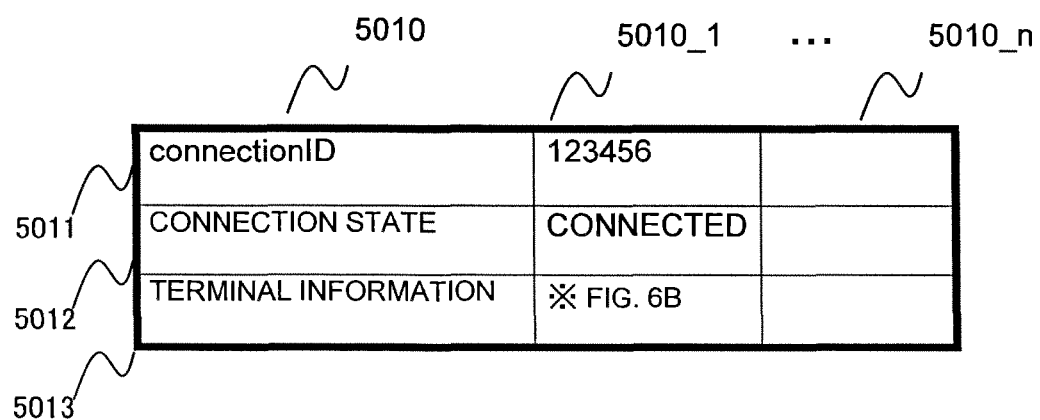
FIG. 6A is an explanatory view showing one example of the organization of a connection information table 5010 in an SOAP-SIP adaptor 6a according to the second embodiment.

FIG. 6A is an explanatory view showing one example of the organization of the connection information table 5010 in the SOAP-SIP adaptor 6a according to the second embodiment.

The connection information table 5010 stores, associated with a connection ID 5011, a connection state 5012 and terminal information 5013, for example.

The connection ID 5011 is the information for identifying the connection corresponding to a connection request from the terminal 7. For example, it identifies the connection in a Transmission Control Protocol (TCP). The connection ID 5011 is generated for each SOAP-SIP adaptor 6. The connection state 5012 indicates the state of connection, equivalent to the session state 2012 of the first embodiment, for example, and stores the same state. The terminal information 5013 is equivalent to the terminal information table 5020.

FIG. 6B is an explanatory view showing one example of the organization of the terminal information table 5020 in the SOAP-SIP adaptor 6a according to the second embodiment.

The terminal information table 5020 stores a handle value 5021, a connection ID 5022, a terminal state 5023, send SDP information 5024, recv SDP information 5025, From URI 5026, and To URI 5027, for example.

The handle value 5021 is the information for identifying the session of SIP between the SOAP-SIP adaptor 6a and the SOAP-SIP adaptor 6b. The connection ID 5022 corresponds to the connection ID 5011 of the connection information table 5010 as described above. The terminal state 5023 indicates the state of session between the SOAP-SIP adaptor 6a and the SOAP-SIP adaptor 6b. The terminal state 5023 stores the same state as the terminal state 2033 of the first embodiment, for example. The send SDP information 5024 includes the IP address and port number of the SOAP-SIP adaptor 6 of its own, for example. In an example of the SOAP-SIP adaptor 6a as shown in FIG. 6B, it includes the IP address (10.0.1.1) and port number (10000) of the SOAP-SIP adaptor 6a. The recv SDP information 5025 includes the IP address and port number of the SOAP-SIP adaptor 6 to be connected, for example. In the example of FIG. 6B, it includes the IP address (10.0.2.1) and port number (20000) of the SOAP-SIP adaptor 6b. The From URI 5026 indicates the SIP-URI of the SOAP-SIP adaptor 6 of its own, for example. In the example of FIG. 6B, it indicates the SIP-URI of the SOAP-SIP adaptor 6a. The To URI 5027 indicates the SIP-URI of the SOAP-SIP adaptor 6 to be connected. In the example of FIG. 6B, it indicates the SIP-URI of the SOAP-SIP adaptor 6b.

FIG. 6C is an explanatory view showing one example of the organization of a media stream control information table 5030 in the SOAP-SIP adaptor 6a according to the second embodiment.

The media stream control information table 5030 of this embodiment stores a connection ID 5031, instead of the session ID 2041 of the first embodiment, for example.

The connection ID 5031 corresponds to the connection ID 5011 of the connection information table 5010. Besides, a media stream sending or receiving IP address 5032, a media stream sending or receiving port number 5033, a partner IP address (1) 5034, a partner port number (1) 5035, a partner IP address (2) 5036, and a partner port number (2) 5037 are the same as in the first embodiment. In the SOAP-SIP adaptor 6*a* of this embodiment, the partner IP address (1) 5034 and the partner port number (1) 5035 store the IP address and port number of the SOAP-SIP adaptor 6*b*, and the partner IP address (2) 5036 and the partner port number (2) 5037 store the IP address and port number of the terminal A7*a*. Also, the media stream sending or receiving IP address 5032 and the media stream sending or receiving port number 5033 store the IP address and port number of the SOAP-SIP adaptor 6*a* as in the first embodiment.

Figure 21A:
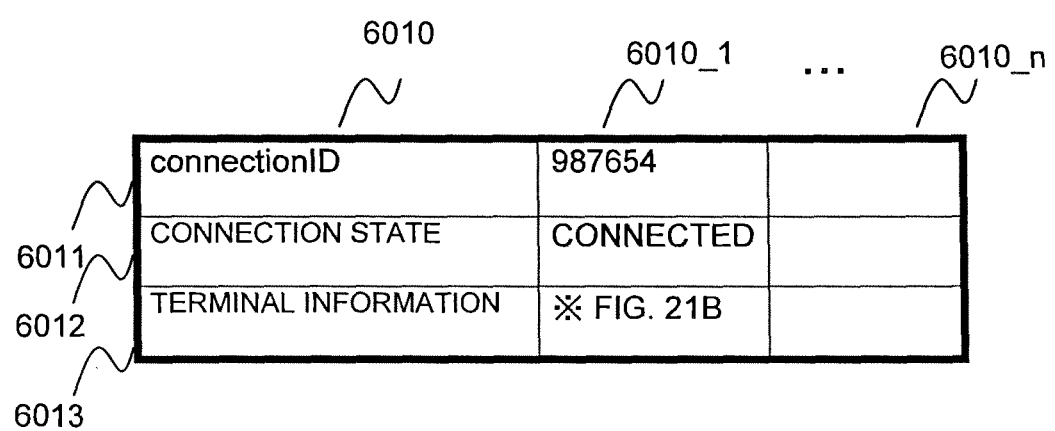
FIG. 21A is an explanatory view showing one example of the organization of a connection information table 6010 in an SOAP-SIP adaptor 6b according to the second embodiment.

FIG. 21A is an explanatory view showing one example of the organization of a connection information table 6010 in the SOAP-SIP adaptor 6*b* according to the second embodiment. FIG. 21B is an explanatory view showing one example of the organization of a terminal information table 6020 in the SOAP-SIP adaptor 6*b* according to the second embodiment. FIG. 21C is an explanatory view showing one example of the organization of a media stream control information table 6030 in the SOAP-SIP adaptor 6*b* according to the second embodiment.

The organization of each of the tables 6010, 6020 and 6030 in the SOAP-SIP adaptor 6*b* is the same as that of each of the tables 5010, 5020 and 5030 in the SOAP-SIP adaptor 6*a* as described above.

In the terminal information table 6020 of the SOAP-SIP adaptor 6*b*, a send SIP information 6024 stores the IP address and port number of the SOAP-SIP adaptor 6*b*, and recv SDP information 6025 stores the IP address and port number of the SOAP-SIP adaptor 6*a* to be connected. Also, a From URI 6026 indicates the SIP-URI of the SOAP-SIP adaptor 6*b*, and a To URI 6027 indicates the SIP-URI of the SOAP-SIP adaptor 6*a*.

Also, in the media stream control information table 6030, a partner IP address (1) 6034 and a partner port number (1) 6035 store the IP address and port number of the SOAP-SIP adaptor 6*a*, and a partner IP address (2) 6036 and a partner port number (2) 6037 store the IP address and port number of the terminal B7*b*. A media stream sending or receiving IP address 6032 and a media stream sending or receiving port number 6033 store the IP address and port number of the SOAP-SIP adaptor 6*b*.

(Operation)

Figure 16:
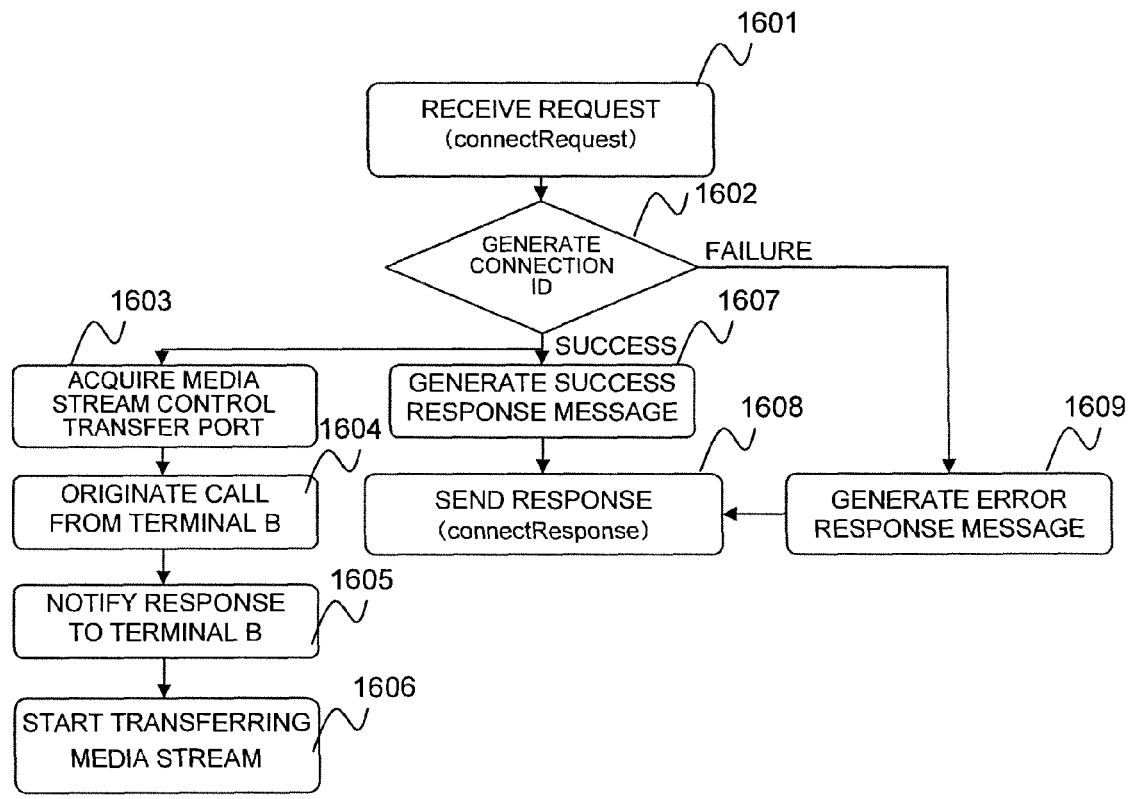
FIG. 16 is a flowchart for explaining the operation in receiving a connection start request in the SOAP-SIP adaptor 6 according to the second embodiment.
Figure 17:
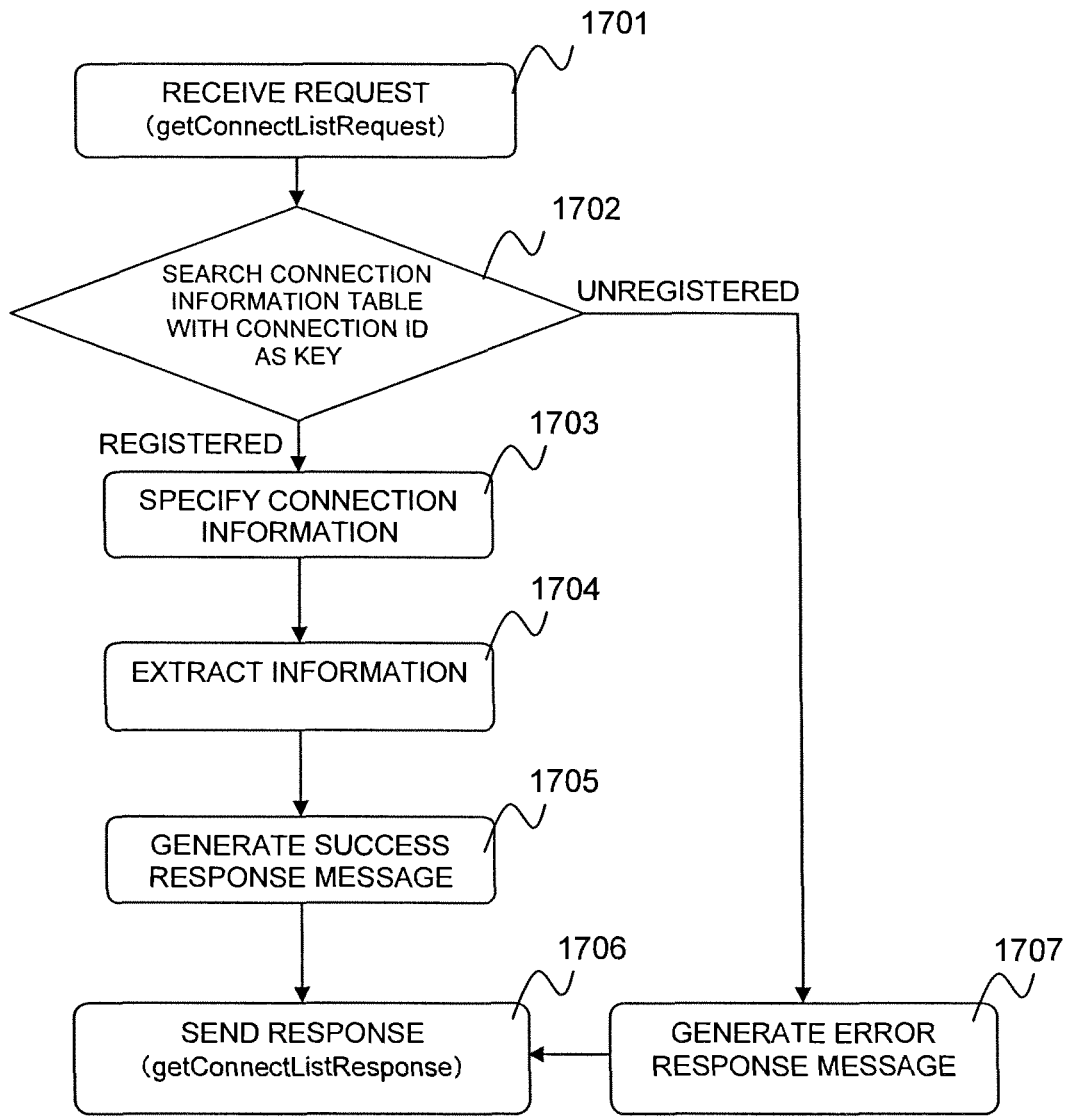
FIG. 17 is a flowchart for explaining the operation in receiving a connection information request in the SOAP-SIP adaptor 6 according to the second embodiment.
Figure 19:
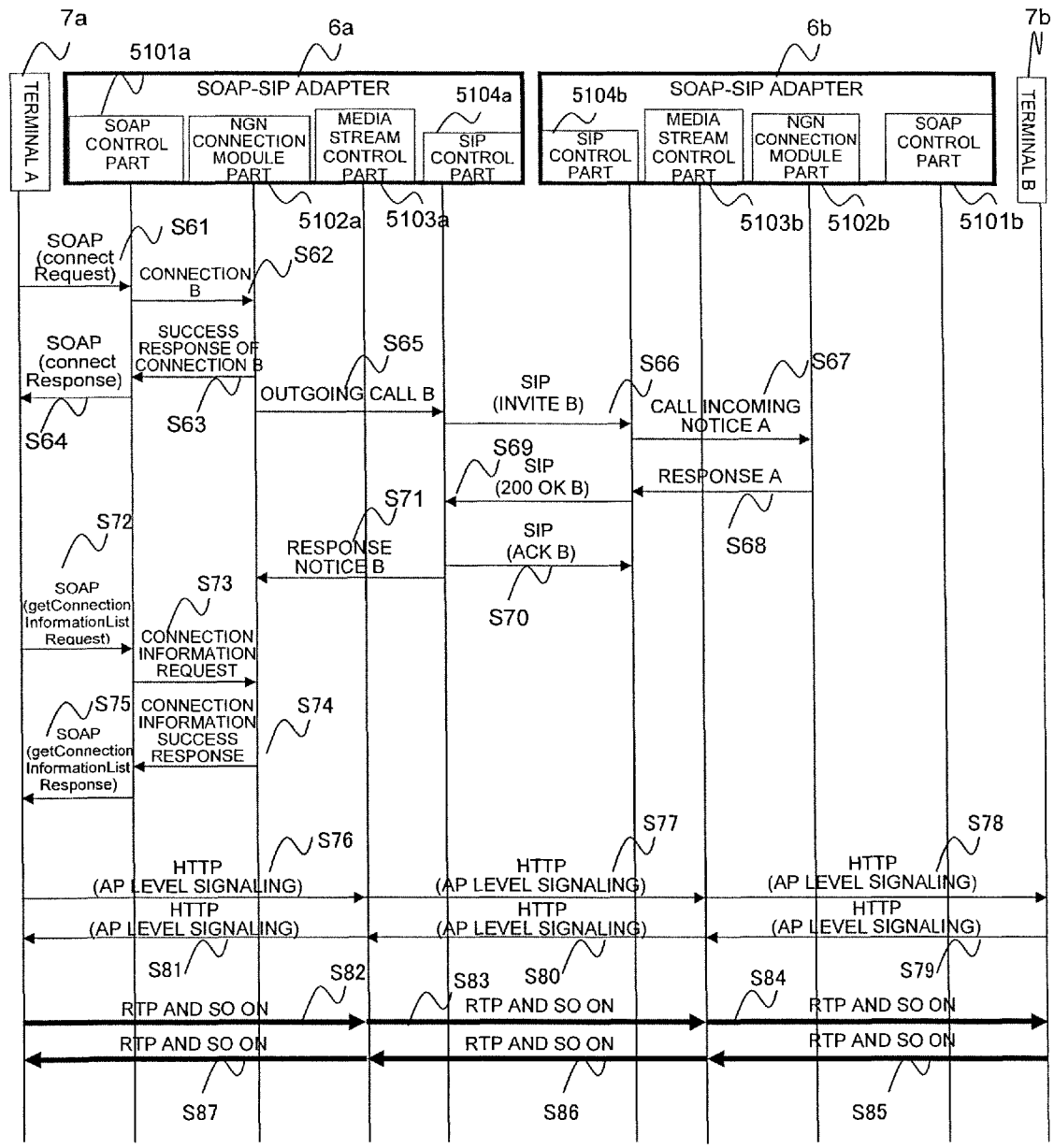
FIG. 19 is a sequence chart (1) for explaining a procedure of an NGN connection service according to the second embodiment.
Figure 22:
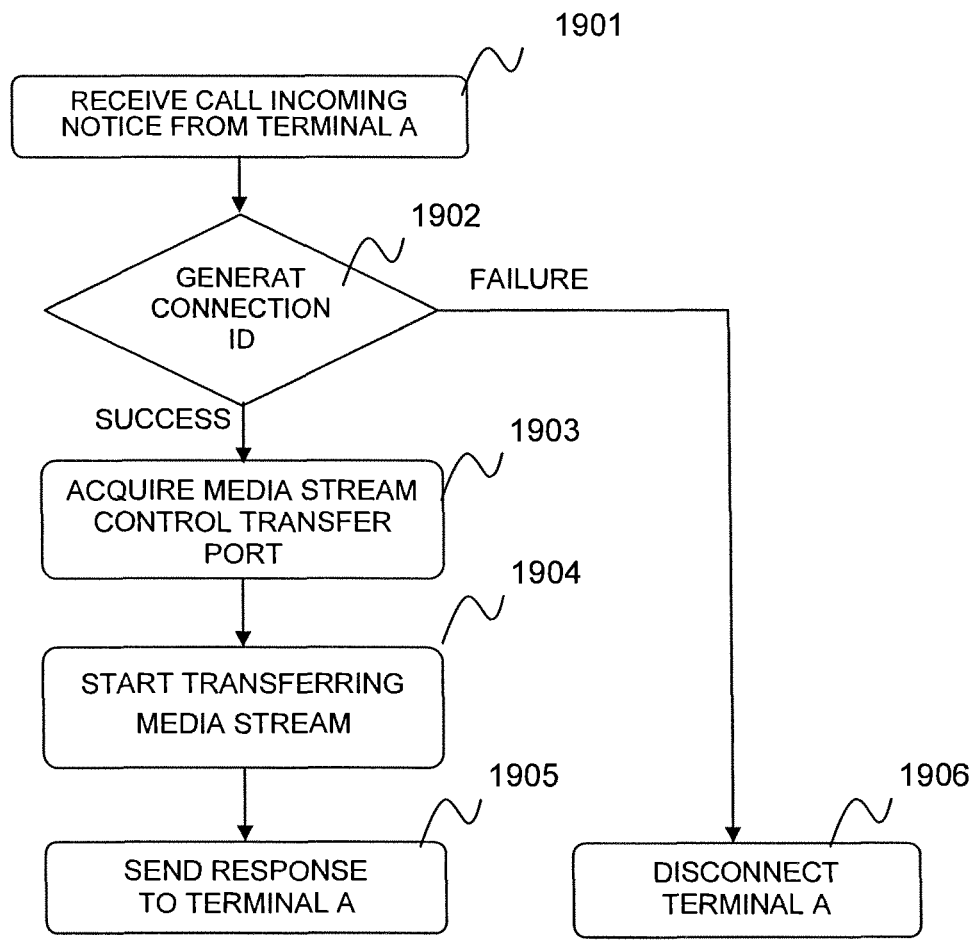
FIG. 22 is a flowchart for explaining the operation in receiving a call incoming notification in the SOAP-SIP adaptor 6 according to the second embodiment.

FIG. 19 is a sequence chart (1) for explaining a procedure of an NGN connection service according to the second embodiment. FIG. 16 is a flowchart for explaining the operation in receiving a connection start request in the SOAP-SIP adaptor 6 according to the second embodiment. FIG. 22 is a flowchart for explaining the operation in receiving a call incoming notification in the SOAP-SIP adaptor 6 according to the second embodiment. FIG. 17 is a flowchart for explaining the operation in receiving a connection information request in the SOAP-SIP adaptor 6 according to the second embodiment.

In this embodiment, a service for connecting the self terminal and the partner terminal at the other end on the NGN with the assured communication quality without being conscious of the SIP protocol can be provided.

Most of the existent application terminals do not have the SIP for securing the communication band in the NGN, and have a problem that the communication on the NGN is impossible. In this embodiment, a connection start request SOAP message is sent to the SOAP-SIP adaptor 6 with a trigger of selecting the partner to be communicated on the screen of the terminal A7*a* as one example, whereby it is possible to secure the communication band with the partner terminal B7*b* without being conscious of the SIP. After securing the communication band, the terminal 7 can make the communication in the secured band with the operation that is indifferent from the operation on the so far existent Internet.

The operation of the terminal 7 starting the connection will be described below.

The terminal A7*a* connected to the SOAP-SIP adaptor 6*a* opens (breaks) a queue port for the SOAP-SIP adapter 6*a* at start-up, for example. Thereby, the data transmission and reception between the terminal A7*a* and the SOAP-SIP adaptor 6*a* is enabled. At this time, the SOAP-SIP adaptor 6*a* receives the IP address and port number of the terminal A7*a*, and stores the received IP address and port number of the terminal A7*a* in the proper storage part. The terminal B7*b* and the SOAP-SIP adaptor 6*b* are treated in the same way. The terminal 7 is not limited to the above example, but may open the wait port at an appropriate timing. The terminal A7*a* transmits an SOAP connect Request (connection request) to the SOAP-SIP adaptor 6*a* (S61). The SOAP connect Request includes the SIP-URI of the SOAP-SIP adaptor 6*b* corresponding to the terminal B7*b* to be connected. For example, at the terminal A7*a*, the user identifier of the user to be connected or the SIP-URI of the SOAP-SIP adaptor 6 is selected from the proper input unit, based on the user operation. In selecting the user identifier, for example, the terminal A7*a* may specify the SIP-URI of the SOAP-SIP adaptor 6 corresponding to the inputted user identifier, because the user identifier and the SIP-URI of the SOAP-SIP adaptor 6 to which the terminal 7 of the user is connected are pre-stored associated. Also, the Web server in which the user identifier and the SIP-URI of the SOAP-SIP adaptor 6 to which the terminal 7 of the user is connected are pre-stored associated may be installed, and the concerned Web server may return the SIP-URI of the SOAP-SIP adaptor 6 corresponding to the user identifier selected at the terminal A7*a*.

An SOAP control part 5101*a* of the SOAP-SIP adaptor 6*a* receives an SOAP connect Request, and sends a connection request (B) to an NGN connection module part 5102*a* of the SOAP-SIP adaptor 6*a* (S62). This connection request (B) includes the SIP-URI within the SOAP connect Request. The SOAP-SIP adaptor 6*a* starts the connection to this SIP-URI.

Specifically, first of all, the NGN connection module part 5102*a* receives the connection request (B) (1601), and generates the connection ID (1602). The generation of the connection ID is the same as shown in FIG. 7 of the first embodiment and its explanation. Referring to FIGS. 6A and 6B, this embodiment will be described below, overlapping the explanation of FIG. 7. The NGN connection module part 5102*a* stores the generated connection ID in each of the connection information table 5010 and the terminal information table 5020. The NGN connection module part 5102*a* sets the connection state 5012 of the connection information table 5010 to "Initial (initial state)". Further, the NGN connection module part 5102*a* stores the SIP-URI included in the received connection request (B) in the To URI 5027 of the terminal information table 5020.

Also, the NGN connection module part 5102*a* sets the terminal state 5023 of the terminal information table 5020 to "Initial (initial state)". The NGN connection module part 5102*a* stores the send SDP information 5024 including the IP address and port number of the SOAP-SIP adaptor 6*a* in the terminal information table 5020. Also, the NGN connection module part 5102*a* stores the SIP-URI of the SOAP-SIP adaptor 6*a* in the From URI 5026 of the terminal information table 5020. The SIP-URI, IP address and port number of the SOAP-SIP adaptor 6*a* are pre-stored in the proper storage part.

The NGN connection module part 5102*a* generates a connection success response (B) (1607), and sends the generated connection success response (B) to the SOAP control part 5101*a* (S63). The connection success response (B) includes the generated connection ID. The SOAP control part 5101*a* receives the connection success response (B), and transmits an SOAP connect Response (connection success response) to the terminal A7*a* (S64, 1608). The SOAP connect Response includes the connection ID within the received connection success response (B), and is generated in accordance with the SOAP. The terminal A7*a* receives the SOAP connect Response, and stores the connection ID included in the received SOAP connect Response in the proper storage part.

If the generation of the connection ID fails at step 1602, the NGN connection module part 5102*a* generates a connection request failure response (error response message) (1609), and sends it to the SOAP control part 5101*a*. The SOAP control part 5101*a* receives the connection request failure response, and transmits an SOAP connect Response indicating the failure of connection request to the terminal A7*a* (1608).

Next, the SOAP-SIP adaptor 6*a* establishes the session with the SOAP-SIP adaptor 6*b*.

First of all, the NGN connection module part 5102*a* acquires a port for control and transfer of the media stream (1603). The NGN connection module part 5102*a* sends a call origination request (B) to an SIP control part 5104*a* of the SOAP-SIP adaptor 6*a* (S65, 1604). The call origination request (B) includes the send SDP information 5024, the From URI 5026 and the To URI 5027 stored in the terminal information table 5020.

The SIP control part 5104*a* receives the call origination request (B), and sends an INVITE message (B) of the SIP to the SOAP-SIP adaptor 6*b* in accordance with the To URI included in the received call origination request (B) (S66). The INVITE message (B) includes at least the send SDP information, the From URI and the To URI within the received call origination request (B), for example. Also, the SIP control part 5104*a* generates a handle value for identifying the session of the SIP with the SOAP-SIP adaptor 6*b*.

The operation of each part on the side of the SOAP-SIP adaptor 6*b* will be described below.

An SIP control part 5104*b* of the SOAP-SIP adaptor 6*b* receives the INVITE message (B), and sends a call incoming notification (A) to an NGN connection module part 5102*b* of the SOAP-SIP adaptor 6*b* (S67). The call incoming notification (A) includes the send SDP information, From URI and To URI within the received INVITE message (B).

The NGN connection module part 5102*b* receives the call incoming notification (A) (1901), and generates the connection ID (1902). In this embodiment, the SOAP-SIP adaptor 6*a* and the SOAP-SIP adaptor 6*b* generate the connection ID independently. The generation of the connection ID is the same as at step 1602 as described above. The NGN connection module part 5102*b* stores the generated connection ID in each of the connection information table 6010 and the terminal information table 6020. The NGN connection module part 5102*b* sets a connection state 6012 in the connection information table 6010. For example, it sets the connection state 6012 to "Initial (initial state)" or "Connected (connected state)". The "Initial" or "Connected" may be changed at an appropriate timing. Further, the NGN connection module part 5102*b* stores the send SDP information included in the received call incoming notification (A) in the recv SDP information 6025 of the terminal information table 6020. The NGN connection module part 5102*b* stores the From URI included in the received call incoming notification (A) in the To URI 6027 of the terminal information table 6020, and similarly stores the To URI (i.e., SIP-URI of its own) included in the received call incoming notification (A) in the From URI 6026.

Also, the NGN connection module part 5102*b* sets a terminal state 6023 of the terminal information table 6020. For example, it properly sets the terminal state 6023 to "Initial (initial state)" or "Call Complete (session established state)". The terminal state 6023 may be appropriately changed. The NGN connection module part 5102*b* stores the IP address and port number of the SOAP-SIP adaptor 6*b* in the send SDP information 6024 of the terminal information table 6020. The IP address and port number of the SOAP-SIP adaptor 6*b* are pre-stored in the proper storage part. Also, the SIP control part 5104*b* generates a handle value for identifying the session of the SIP with the SOAP-SIP adaptor 6*a* and stores it in the terminal information table 6020.

The NGN connection module part 5102*b* of the SOAP-SIP adaptor 6*b* acquires a port for control and transfer of the media stream (1903). The NGN connection module part 5102*b* sends the generated connection ID, the IP address and port number of the SOAP-SIP adaptor 6*a* included in the send SDP information within the received call incoming notification (A), and the IP address and port number of the terminal B7*b* stored by opening the port to a media stream control part 5103*b*. The media stream control part 5103*b* stores each of the received information in the media stream control information table 6030. For example, the media stream control part 5103*b* stores the IP address and port number of the received SOAP-SIP adaptor 6*a* in the partner IP address (1) 6034 and the partner port number (1) 6035, and stores the IP address and port number of the received terminal B7*b* in the partner IP address (2) 6036 and the partner port number (2) 6037. Also, the media stream control part 5103*b* stores the received connection ID, and stores the IP address and port number of its own in the media stream sending or receiving IP address 6032 and the media stream sending or receiving port number 6033. Thereby, the SOAP-SIP adaptor 6*b* can start to transfer the media stream (1904).

The NGN connection module part 5102*b* generates a response (A), and sends it to the SIP control part 5104*b* (S68, 1905). The response (A) includes the send SDP information 6024, the From URI 6026 and the To URI 6027 stored in the terminal information table 6020. The SIP control part 5104*b*, receiving the response (A), sends the 200 OK (B) of the SIP to the SOAP-SIP adaptor 6*a* (S69). The 200 OK (B) includes at least the send SDP information, the From URI and the To URI within the received response (A), for example.

If the generation of the connection ID fails at step 1902, the NGN connection module part 5102*b* disconnects the session of the SIP with the SOAP-SIP adaptor 6*a* corresponding to the terminal A7*a* (1906).

Turning back to the explanation of the side of the SOAP-SIP adaptor 6*a*, the SIP control part 5104*a* of the SOAP-SIP adaptor 6*a* receives the 200 OK (B), and sends the ACK (B) of the SIP to the SOAP-SIP adaptor 6*b* (S70). The SIP control part 5104*a* sends a response notification (B) to the NGN connection module part 5102*a* (S71, 1605). The response notification (B) includes the handle value generated at step S66 and the send SDP information included in the 200 OK (B) received at step S69. The NGN connection module part 5102*a* stores the handle value included in the received response notification (B) in the terminal information table 5020. Also, the NGN connection module part 5102*a* stores the send SDP information included in the received response notification (B)

in the recv SDP information 5025 of the terminal information table 5020. The handle value may be stored at an appropriate timing. The NGN connection module part 5102*a* updates the terminal state 5023 of the terminal information table 5020 to "Call Complete (session established state)". Also, the NGN connection module part 5102*a* updates the connection state 5012 of the connection information table 5010 to "Connected (connected state)". The terminal state 2033 may be properly updated in sending or receiving the SIP message (e.g., 200 OK), for example.

The NGN connection module part 5102*a* sends the generated connection ID, the IP address and port number of the terminal A7*a* stored by opening the port, and the IP address and port number of the SOAP-SIP adaptor 6*b* included in the received send SDP information to a media stream control part 5103*a*. The media stream control part 5103*a* stores each piece of the received information in the media stream control information table 5030. For example, the media stream control part 5103*a* stores the IP address and port number of the received SOAP-SIP adaptor 6*b* in the partner IP address (1) 5034 and the partner port number (1) 5035, and stores the received IP address and port number of the terminal A7*a* in the partner IP address (2) 5036 and the partner port number (2) 5037. Also, the media stream control part 5103*a* stores the received connection ID, and stores the IP address and port number of its own in the media stream sending or receiving IP address 5032 and the media stream sending or receiving port number 5033. Thereby, the SOAP-SIP adaptor 6*a* can start to transfer the media stream (1606).

The operation of the terminal 7 acquiring the connection information will be described below.

The terminal A7*a* transmits an SOAP get Connection Information List Request (connection information request) to the SOAP-SIP adaptor 6*a* (S72). The SOAP get Connection Information List Request includes the connection ID of the make connection information (connection information) to be acquired. Specifically, the terminal A7*a* generates the SOAP get Connection Information List Request including the connection ID stored at step S64 as described above. As one example, the terminal A7*a*, after receiving the SOAP connection Response at step S64, periodically performs the processing of step S72.

The SOAP-SIP adaptor 6*a* searches the connection information table 5010 held in the SOAP-SIP adaptor 6*a* with the connection ID included in the SOAP get Connection Information List Request as the key, and sends an SOAP get Connection Information List Response including the table information with the matched connection ID 5011 (S73 to S75). The detailed operation of steps S73 to S75 in the SOAP-SIP adaptor 6*a* will be described below.

First of all, the SOAP control part 5101*a* of the SOAP-SIP adaptor 6*a* receives the SOAP get Connection Information List Request, and sends the connection information request to the NGN connection module part 5102*a* (S73). This connection information request includes the connection ID within the SOAP get Connection Information List Request.

The NGN connection module part 5102*a*, receiving the connection information request (1701), searches the connection information table 5010 for the connection ID 5011, based on the connection ID included in the received connection information request (1702). If the connection ID included in the received connection information request is already registered in the connection information table 5010, the connection information corresponding to the applicable connection ID 5011 is specified (1703). The NGN connection module part 5102*a* acquires the connection state 5012 corresponding to the applicable connection ID 5011 (1704). The NGN connection module part 5102*a* may further acquire the proper information stored in the connection information table 5010 and the terminal information table 5020, besides the connection state 5012.

The NGN connection module part 5102*a* generates a connection information success response including the acquired connection state 5012 (1705), and sends the generated connection information success response to the SOAP control part 5101*a* (S74). The SOAP control part 5101*a* receives the connection information success response, and transmits an SOAP get Connection Information List Response to the terminal A7*a* (S75, 1706). The SOAP get Connection Information List Response includes the connection state within the received connection information success response, and is generated in accordance with the SOAP.

If the connection ID included in the received connection information request is not registered in the connection information table 5010 at step 1702, the NGN connection module part 5102*a* generates a connection information failure response (error response message) (1707), and sends the generated connection information failure response to the SOAP control part 5101*a*. The SOAP control part 5101*a* receives the connection information failure response, and transmits an SOAP get Connection Information List Response indicating the failure of the connection information request to the terminal A7*a* (1706).

The terminal A7*a* receives the SOAP get Connection Information List Response, and can confirm the state of connection by referring to the connection state included in the received SOAP get Connection Information List Response. Thereby, if the connection state is confirmed to be "Connected (connected state)", for example, the terminal A7*a* and the terminal B7*b* start signaling at an AP level in accordance with the HTTP (S76 to S81), and makes the communication of the media stream in accordance with the RTP (S82 to S87).

For example, for the transfer of signal and media stream, the media stream from the terminal A7*a* to the terminal B7*b* will be described below. The terminal A7*a* sets the destination at the IP address and port number of the SOAP-SIP adaptor 6*a*, and sets the sender at the IP address and port number of its own, and transmits the media stream (S82). The IP address and port number of the SOAP-SIP adaptor 6*a* are pre-stored in the proper storage part.

The media stream control part 5103*a* of the SOAP-SIP adaptor 6*a* transfers the received media stream to the SOAP-SIP adaptor 6*b* by referring to the media stream control information table 5030 (S83). The operation of transfer is the same as in the first embodiment. Referring to FIG. 6C, the SOAP-SIP adaptor 6*a* of this embodiment will be described below. The IP address and port number of the sender in the received media stream are the IP address (192.168.10.1) and port number (30000) of the terminal A7*a*, whereby the corresponding partner IP address (1) 5034 (10.0.2.1) and port number (1) 5035 (20000) are acquired. The NGN connection module part 5102*a* transfers the received media stream to the SOAP-SIP adaptor 6*b* in accordance with the acquired IP address and port number. Also, at this time, the NGN connection module part 5102*a* sets the media stream sending or receiving IP address 5032 and the media stream sending or receiving port number 5033 of the media stream control information table 5030 for the sender.

The media stream control part 5103*b* of the SOAP-SIP adaptor 6*b* receives the media stream, and transfers the received signal to the terminal B7*b* by referring to the media stream control information table 6030 (S84). Referring to FIG. 21C, the SOAP-SIP adaptor 6*b* of this embodiment will be described below. The IP address and port number of the sender in the received media stream are the IP address (10.0.1.1) and port number (10000) of the SOAP-SIP adaptor 6a, whereby the corresponding partner IP address (2) 6036 (192.168.10.2) and port number (2) 6037 (40000) are acquired. The NGN connection module part 5102b transfers the received media stream to the terminal B7b in accordance with the acquired IP address and port number. Also, at this time, the NGN connection module part 5102b sets the media stream sending or receiving IP address 6032 and the media stream sending or receiving port number 6033 of the media stream control information table 6030 for the sender.

A case of transmitting the media stream from the terminal B7b to the terminal A7a (S85 to S87) and a case of transmitting or receiving the signal at the AP level between the terminal A7a and the terminal B7b (S76 to S81) are treated in the same way.

As described above, the SOAP message of connection start request is sent to the SOAP-SIP adaptor 6a with a trigger of selecting the partner to be communicated on the screen of the terminal A7a as one example, whereby it is possible to secure the communication band with the partner terminal B7b without being conscious of the SIP. After securing the communication band, the terminal 7 can make the communication on the NGN N2 in the secured band with the operation that is indifferent from the operation on the so far existent Internet. Also, the IP address for establishing the signaling channel and the IP address for establishing the data channel are the same.

Figure 18:
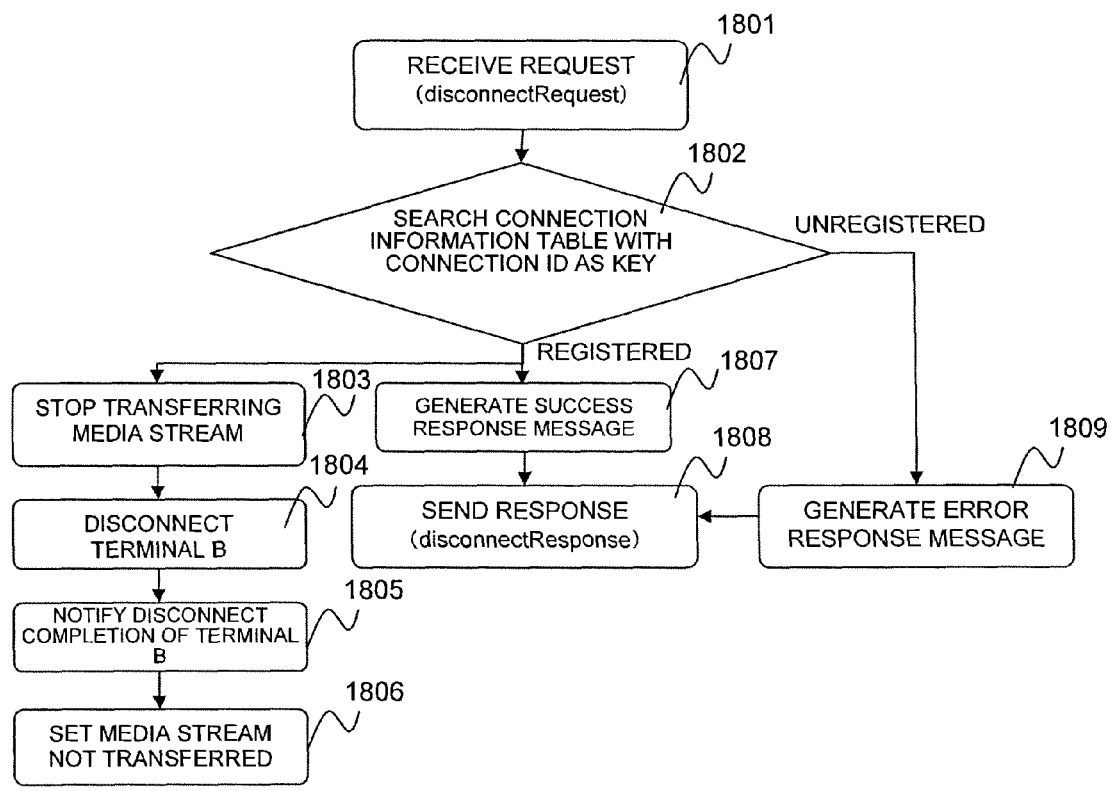
FIG. 18 is a flowchart for explaining the operation in receiving a connection termination request in the SOAP-SIP adaptor 6 according to the second embodiment.
Figure 20:
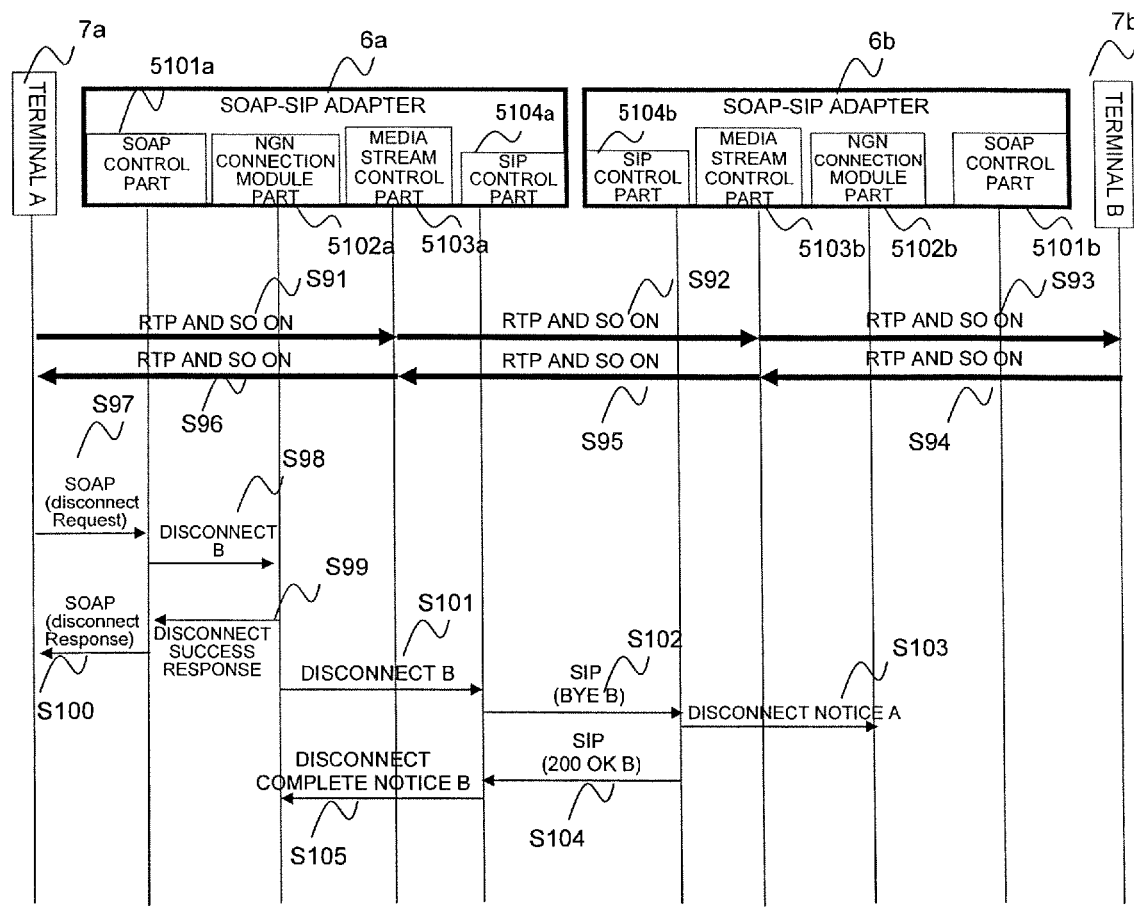
FIG. 20 is a sequence chart (2) for explaining a procedure of an NGN connection service according to the second embodiment.
Figure 23:
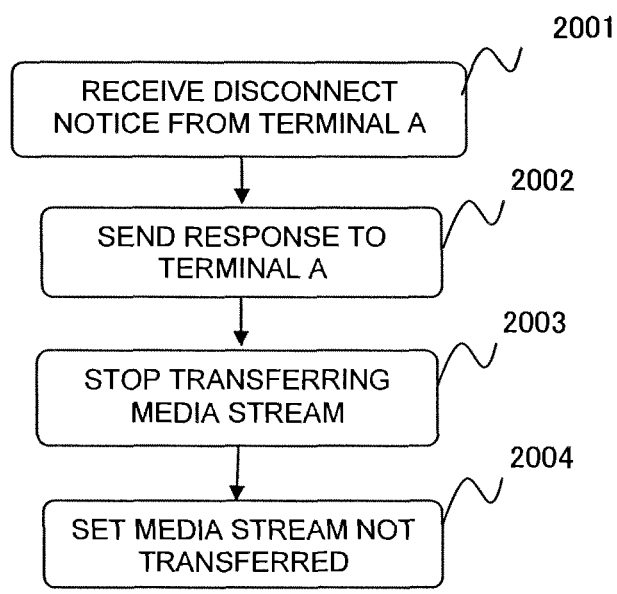
FIG. 23 is a flowchart for explaining the operation in receiving a disconnect notification in the SOAP-SIP adaptor 6 according to the second embodiment.

FIG. 20 is a sequence chart (2) for explaining a procedure of the NGN connection service according to the second embodiment. FIG. 18 is a flowchart for explaining the operation in receiving a connection termination request in the SOAP-SIP adaptor 6 according to the second embodiment. FIG. 23 is a flowchart for explaining the operation in receiving a disconnect notification in the SOAP-SIP adaptor 6 according to the second embodiment.

Referring to FIGS. 18, 20 and 23, the operation of terminating the connection will be described below. The process of steps S91 to S96 in FIG. 20 corresponds to the process of steps S82 to S87 as described above.

The terminal A7a transmits an SOAP disconnect Request (disconnect request) to the SOAP-SIP adaptor 6a (S97). The SOAP disconnect Request includes the connection ID of the call to terminate the connection. Specifically, the terminal A7a generates the SOAP disconnect Request including the connection ID stored at step S64 as described above, for example. As one example, the terminal A7a may select the connection ID of the call to terminate the connection from the connection ID stored at step S64 as described above, based on the user operation, from the proper input unit.

The SOAP-SIP adaptor 6a searches the connection information table 5010 held in the SOAP-SIP adaptor 6a with the connection ID as the key, specifies the terminal 7 to be disconnected from the table information with the matched connection ID 5011 and disconnects it (S98 to S105). The detailed operation of steps S98 to S105 in the SOAP-SIP adaptor 6a will be described below.

First of all, the SOAP control part 5101a of the SOAP-SIP adaptor 6a receives the SOAP disconnect Request, and sends a disconnect request (B) to the NGN connection module part 5102a (S98). This disconnect request (B) includes the connection ID within the SOAP disconnect Request.

The NGN connection module part 5102a, receiving the disconnect request (B) (1801), searches the connection information table 5010 for the connection ID 5011, based on the connection ID included in the received disconnect request (B) (1802). If the connection ID included in the received disconnect request (B) is already registered in the connection information table 5010, the NGN connection module part 5102a generates a disconnect success response (1807), and sends the generated disconnect success response to the SOAP control part 5101a (S99). The SOAP control part 5101a receives the disconnect success response, and transmits an SOAP disconnect Response to the terminal A7a (S100, 1808). For the SOAP disconnect Response, only the success response may be sent.

Also, the media stream control part 5103a stops transferring the media stream (1803). A media stream transfer stop request may be sent from the NGN connection module part 5102a to the media stream control part 5103a.

The NGN connection module part 5102a generates a disconnect request (B), and sends it to the SIP control part 5104a (S101, 1804). Specifically, the NGN connection module part 5102a acquires the To URI 5027 by referring to the terminal information table 5020 corresponding to the applicable connection ID 5011. The NGN connection module part 5102a sends the disconnect request (B) including the acquired To URI 5027 to the SIP control part 5104a.

The SIP control part 5104a receives the disconnect request (B), and sends a BYE message (B) of the SIP to the SOAP-SIP adaptor 6b in accordance with the To URI included in the received disconnect request (B) (S102). The SIP control part 5104b of the SOAP-SIP adaptor 6b receives the BYE message (B) (2001), and sends a disconnect notification (A) to the NGN connection module part 5102b (S103). Also, the SIP control part 5104b sends the 200 OK (B) of the SIP to the SOAP-SIP adaptor 6a (S104, 2002).

The media stream control part 5103b stops transferring the media stream (2003), and sets the media stream not transferred (2004). A media stream transfer stop request may be sent from the NGN connection module part 5102b to the media stream control part 5103b.

The SIP control part 5104a of the SOAP-SIP adaptor 6a receives the 200 OK (B), and sends a disconnect complete notification (B) to the NGN connection module part 5102a (S105, 1805). The NGN connection module part 5102a receives the disconnect complete notification (B), and sets the media stream not transferred (1806).

If the session ID included in the received call end request is not registered at step 1802, the NGN connection module part 5102a generates a call end request failure response (error response message) (1809), and sends the generated call end request failure response to the SOAP control part 5101a.

The SOAP control part 5101a receives the call end request failure response, and transmits an SOAP disconnect Response indicating the failure of the call end request to the terminal A7a (1808).

3. Others (Configuration of the First Embodiment)

In the first embodiment, a communication system including a first server (SOAP-SIP adaptor 2), a device (terminal B5c, CLIENT B) for establishment of connection to the first server in the SIP protocol, and a first terminal (terminal A5b, CLIENT A) for communicating with the first server, for example, wherein the first server has an interface (SOAP control part) for receiving a connection request message (SOAP make Call Session Request), a processing part (3PCC module part, SIP control part) for making the establishment of connection to the device in the SIP protocol in accordance with the received connection request message, and a first transfer control part (media stream control part) for transferring the data received from the first terminal to the device after the establishment of connection in the processing part.

In the above communication system, the device is a second terminal (terminal B5c, CLIENT B), wherein the communication system further includes a second server (web server 1) for transmitting the connection request message for communication between the first terminal and the second terminal to the first server, in which the processing part makes the establishment of connection to the first terminal and the second terminal in the SIP protocol, and the first transfer processing part transfers the data received from the second terminal to the first terminal and the data received from the first terminal to the second terminal.

The above communication system may be further configured in the following way.

For example, in the above communication system, the processing part may generate a session ID regarding the session between the first terminal and the second terminal, based on the connection request message.

In the above communication system, the first server may further have a storage part for storing, associated with the session ID, the first session information regarding the session with the first terminal and the second session information regarding the session with the second terminal.

In the above communication system, the second server may further have an input part for accepting the input of the session ID, in which the processing part receives an information request including the session ID inputted from the input part via the interface from the second server, performs a search process for the storage part based on the session ID, and transmits the first and second session information corresponding to the applicable session ID via the interface to the second server.

In the above communication system, the storage part stores the first session information, associated with the SIP-URI of the user at the first terminal, and stores the second session information, associated with the SIP-URI of the user at the second terminal, and the second server may further have an input part for accepting the input of the session ID and the SIP-URI, in which the processing part receives an information request including the session ID and the SIP-URI inputted by the input part via the second interface from the second server, performs a search process for the storage part based on the session ID and the SIP-URI, and transmits the first session information or second session information corresponding to the applicable session ID and SIP-URI via the interface to the second server.

In the above communication system, the first server may transmit a connection hold message to the first terminal or the second terminal, after the processing part makes the establishment of connection to the first terminal or the second terminal.

In the above communication system, the second server may further have an input part for accepting the input of the session ID, in which the processing part may receive a disconnect request including the session ID inputted by the input part via the interface from the second server, and make the establishment of disconnection for the first terminal and/or the second terminal in the SIP protocol on the session corresponding to the session ID.

In the above communication system, the processing part may include a 3PCC module.

In the above communication system, the first transfer control part may acquire the address information of the first terminal and the second terminal in the establishment of connection to the first terminal and the second terminal, store a pair of address information of the first terminal and the second terminal, and transfer the data received from the second terminal to the first terminal and the data received from the first terminal to the second terminal by referring to the stored pair of address information.

In the above communication system, the processing part may notify the address information of the first server to the first terminal and the second terminal in the establishment of connection to the first terminal and the second terminal, and the first terminal and the second terminal may transmit the data to the first server with the notified address information as the destination.

(Configuration of the Second Embodiment)

In the second embodiment, a communication system including a first server (SOAP-SIP adaptor 6a), a device (SOAP-SIP adaptor 6b) for making the establishment of connection to the first server in the SIP protocol, and a first terminal (terminal A7a, CLIENT A) for communicating with the first server, for example, wherein the first server has an interface (SOAP control part) for receiving a connection request message (SOAP connection Request), a processing part (3PCC module part, SIP control part) for making the establishment of connection to the device in the SIP protocol in accordance with the received connection request message, and a first transfer control part (media stream control part) for transferring the data received from the first terminal to the device after the establishment of connection in the processing part.

The above communication system further includes a second terminal (terminal B7b, CLIENT B), in which the device is a third server (SOAP-SIP adaptor server 6b) having a second transfer processing part (media stream control part 5103b), and the second transfer processing part receives the data transferred by the first transfer control part and transfers the data to the second terminal.

In the above communication system, the first terminal may transmit a connection request message for communication with the second terminal to the first server.

(Effects of the First and Second Embodiments)

With the first and second embodiments, in the NGN with the assured communication quality, it is possible to provide a communication system and a server for transferring data between two parties (first connection terminal and second connection terminal) for communication. Also, with the first and second embodiments, it is possible to provide a 3PCC service on the NGN with the assured communication quality. With the first and second embodiments, in a 3PCC service flow, it is possible to prevent the first connection terminal from being silent in establishing the session with the second connection terminal after establishing the session with the first connection terminal.

Further, with the first and second embodiments, it is possible to provide a communication system and a server in which the terminal secures the communication band of the NGN with the partner terminal without being conscious of the SIP, and after securing the communication band, the terminal makes the communication on the NGN in the secured band with the operation that is indifferent from the operation on the so far existent Internet. Also, with the first and second embodiments, it is possible to mount an interface capable of establishing many sessions in the SOAP-SIP adaptor, and establish several hundreds to several thousands sessions.

4. Third Embodiment 4.1 Overview

In the above embodiments, the media stream is relayed by the SOAP-SIP adaptor, in which a load of a relay process is imposed on the SOAP-SIP adaptor. Also, the SOAP-SIP adaptor manages the INVITE session. If the number of sessions increases, a larger load may be sometimes imposed on the SOAP-SIP adaptor. Also, in the normal 3PCC service, because the INVITE session is managed by a device equivalent to the SOAP-SIP adaptor, if the number of sessions increases, a larger load may be sometimes imposed on the SOAP-SIP adaptor as well.

In this embodiment, the load on the SOAP-SIP adaptor is reduced.

Figure 32:
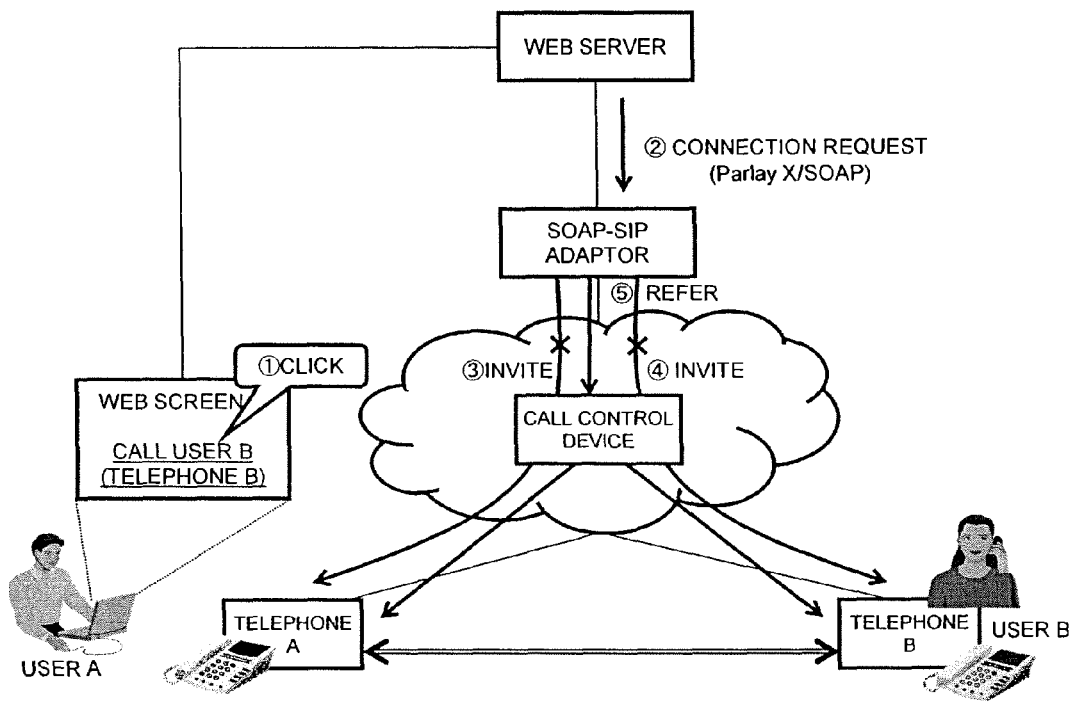
FIG. 32 is an explanatory view showing an overview of the third embodiment.

FIG. 32 is an explanatory view showing an overview of the third embodiment.

First of all, the user A chooses to call the user B on the telephone by operating a web terminal, for example ((1) in the drawing). The Web server transmits a connection request between the telephone A of the user A and the telephone B of the user B to the SOAP-SIP adaptor in accordance with a request from the web terminal ((2) in the drawing). The SOAP-SIP adaptor sends an INVITE message to each of the telephones A and B and establishes the session with each of the telephones A and B ((3, 4) in the drawing). Thereafter, the SOAP-SIP adaptor sends a REFER message to a call control device to pass the control of session to the call control device ((5) in the drawing). The call control device terminates the REFER message and manages the sessions with the telephones A and B.

4.2 Hardware Configuration

Figure 33:
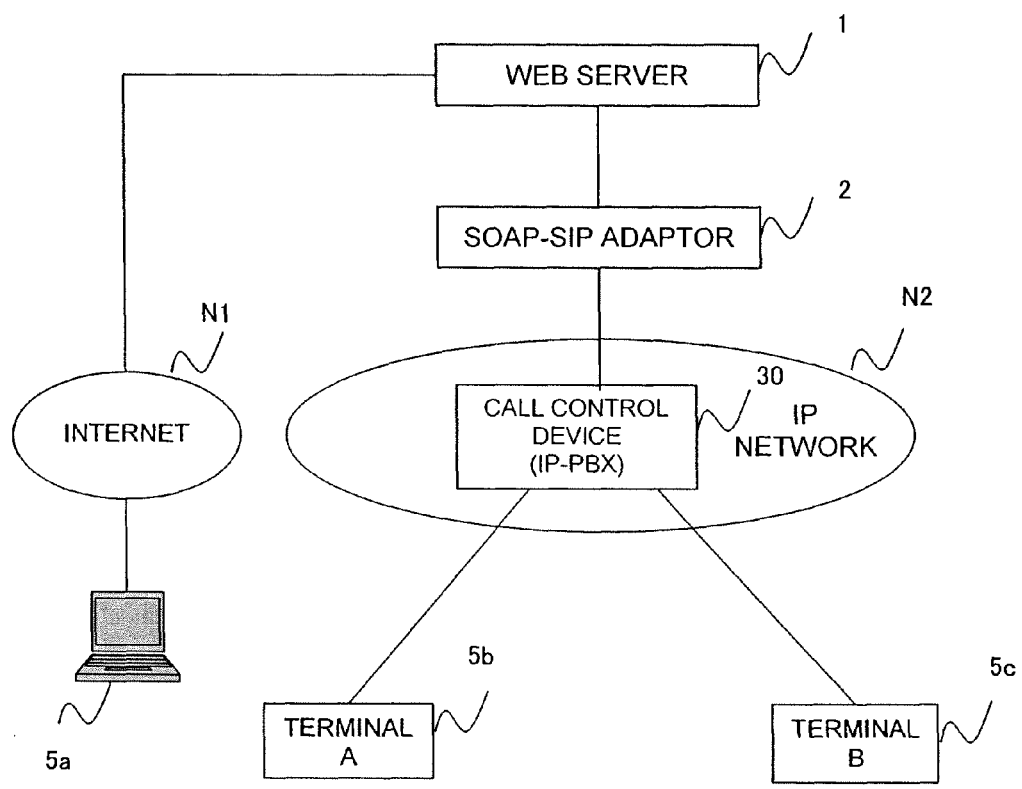
FIG. 33 is an explanatory view showing a configuration example of a communication network according to the third embodiment.

FIG. 33 is an explanatory view showing a configuration example of a communication network according to the third embodiment.

This communication network (communication system) includes the web server 1, the SOAP-SIP adaptor (server) 2, and a call control device 30, for example. The call control device 30 is installed in the general conventional IP network, for example.

The configuration of the Web server 1 and the SOAP-SIP adaptor 2 may be the same as in the above embodiments. The call control device 30 is an Internet Protocol-private branch exchange (IP-PBX: IP-private branch exchange), for example, and communicates with the terminals A5b and B5c.

Figure 34:
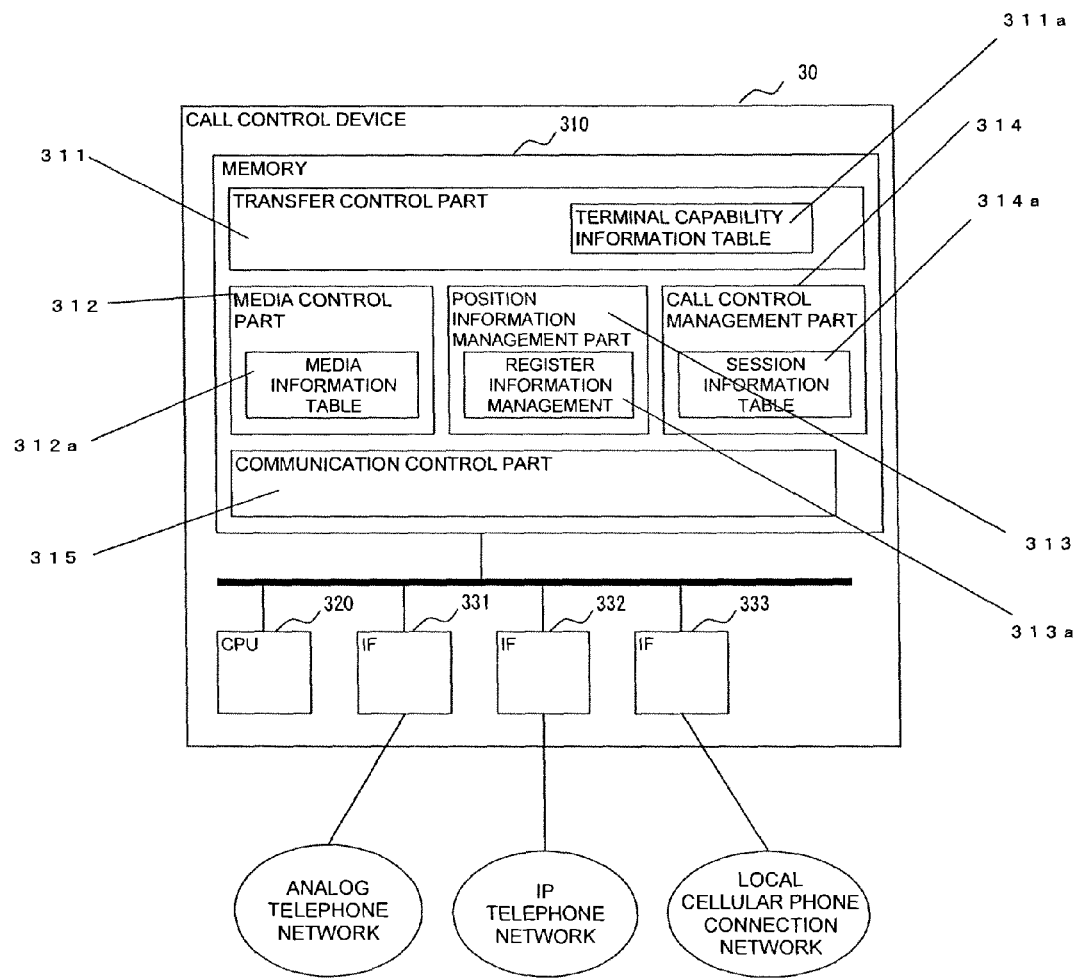
FIG. 34 is a block diagram of a call control device.

FIG. 34 is a block diagram of the call control device 30.

The call control device 30 has a memory 310, a processing part (CPU) 320, and the interfaces (IFs) 331, 332 and 333, for example.

The memory 310 has a transfer control part 311, a media control part 312, a position information management part 313, a call control management part 314, and a communication control part 315. Each of these parts can be realized in such a way that a program for implementing the function of each part is stored in the memory 310, and the CPU 320 reads and executes the program. Also, a terminal capability information table 311a, a media information table 312a, a REGISTER information management part 313a and a session information table 314a are stored in the memory 310.

The transfer processing part 311 processes a transfer request (REFER), for example. The media control part 312 has a sending function of holding tone. The position information management part 313 processes and manages the position information registration from the terminal (REGISTER). The call control management part 314 manages which telephone is connected to which telephone (INVITE). The communication control part 315 performs a communication process relating to a protocol.

The terminal capability information table 311a stores and manages the communication capability of the terminal (SDP). The media information table 312a manages the available situation of a media resource. The REGISTER information management part 313a is a mapping table of connection information such as SIP-URI and IP address used in the actual communication. The session information table 314a is a table for managing which telephone is connected to which telephone.

The call control device 30 is the IP-PBX, for example, and the interfaces 331 to 333 include the IFs to the in-house IP extension telephone, the local extension cellular phone, and the outside call. The existent extension telephone can be treated.

4.3 Processing Sequence

FIGS. 25A to 25D are the first sequence charts of the third embodiment.

In the figures, the step number (Sxx) in parentheses corresponds to the step number of the above embodiments. At each corresponding step, a process for storing the data may be performed as described above, for example. The detailed data and process such as storing into the table is the same as above, and its explanation is omitted.

First of all, the user logs in the Web server 1 by operating the terminal 5a, for example. The Web server 1 inputs the user identifiers (e.g., user names of two parties corresponding to the terminal A5b and the terminal B5c) of the users for communication from the terminal 5a. For example, the two party users for communication may be selected based on the screen displayed at the terminal 5a that has logged in the Web server 1 by the user operation.

The Web server 1 transmits an SOAP make Call Session Request (connection request) to the SOAP-SIP adaptor 2 (S1001). The SOAP make Call Session Request includes the SIP-URI corresponding to the two party users to be connected. For example, the Web server acquires the SIP-URI corresponding to the inputted user identifier, in which the user identifier and the SIP-URI of the user are pre-stored associated. The Web server 1 generates the SOAP make Call Session Request including the acquired SIP-URI, and transmits it to the SOAP-SIP adaptor 2.

The SOAP control part 2101 of the SOAP-SIP adaptor 2 receives the SOAP make Call Session Request, and sends the connection request to the 3PCC module part 2102 (S1002). This connection request can be generated in accordance with a proper protocol for use in the SOAP-SIP adaptor 2, based on the received SOAP make Call Session Request, for example, and includes the SIP-URI within the SOAP make Call Session Request. The SOAP-SIP adaptor 2 assigns a Call ID properly, and sets it to the connection request. The Call ID corresponds to the handle value in the above embodiments.

The 3PCC module part 2102 sends a connection request success response to the SOAP control part 2101 (S1003). The SOAP control part 2101 receives the connection request success response, and transmits an SOAP make Call Session Response (connection request success response) to the Web server 1 (S1004).

Next, the session between the SOAP-SIP adaptor 2 and the terminal A5b is established.

The 3PCC module part 2102 sends a call origination request (A) for the terminal A5b to the SIP control part 2104 (S1005). For example, the call origination request (A) includes at least the To URI indicating the terminal A5b.

The SIP control part 2104 transmits an INVITE message (A) to the terminal A5b via the call control device 30 in accordance with the To URI included in the call origination request (A) (S1006). From the terminal A5b, it looks like the call incoming from the SOAP-SIP adaptor (SSA in the drawing) 2. The INVITE message (A) includes an offer-SDP preset in a configuration definition, for example. The offer-SDP describes a list of communication condition information (capability information) of the terminal, such as the kind of codec (CODEC) to which the terminal corresponds, for example.

The terminal A5b properly sends a predetermined SIP message such as 100 Trying indicating processing or 180 Ringing indicating calling via the call control device 30 to the SIP control part 2104 (S1007, S1008).

The terminal A5b selects the communication condition information to be used in the communication from the offer-SDP at step S1006, and sends the 200 OK (A) including an answer-SDP (hereinafter denoted as an ans-SDP) describing the selected communication condition information to the SOAP-SIP adaptor 2 (S1009). The ans-SDP describes the selected communication condition information to be used in the communication, which corresponds to the terminal A5b, and selected from a list of communication condition information described in the received offer-SDP. One or more pieces of communication condition information may be selected. The communication condition information (information within the ans-SDP in the drawing) may be received directly from the terminal by the SOAP-SIP adaptor 2, not via the call connection device 30.

The SIP control part 2104 of the SOAP-SIP adaptor 2 receives the 200 OK (A), and sends a response notification (A) to the 3PCC module part 2102 (S1010). Also, the SIP control part 2104 transmits the ACK (A) of the SIP to the terminal A5b (S1011).

Next, the session between the SOAP-SIP adaptor 2 and the terminal B5c is established.

The 3PCC module part 2102 sends a call origination request (B) for the terminal B5c to the SIP control part 2104 (S1020). For example, the call origination request (B) includes the To URI 2038 corresponding to the terminal B5c.

The SIP control part 2104 transmits an INVITE message (B) to the terminal B5c via the call control device 30 in accordance with the To URI included in the call origination request (B) (S1021). The INVITE message (B) may include an offer-SDP indicating the communication condition information (e.g., capability information of the terminal A5b) selected by the terminal A5b, based on the ans-SDP from the terminal A5b. If there is no predetermined required codec, it is added to the offer-SDP.

The terminal B5c sends a predetermined SIP message such as 100 Trying or 180 Ringing to the SIP control part 2104 (S1022, S1023).

Also, the terminal B5c selects the communication condition information to be used in the communication from the offer-SDP at step S1021, and sends the 200 OK (B) including an ans-SDP describing the selected communication condition information to the SOAP-SIP adaptor 2 (S1024). The SIP control part 2104 of the SOAP-SIP adaptor 2 receives the 200 OK (B), and sends a response notification (B) to the 3PCC module part 2102 (S1025). The SIP control part 2104 sends the ACK (B) to the terminal B5c (S1026).

The SOAP-SIP adaptor 2 may decide the communication condition (e.g., codec for use) to be used from the communication condition information (fourth communication condition information) received at steps S1024 and S1025, and notify the decided communication condition to the terminal A5b. Also, the SOAP-SIP adaptor 2 and the call control device 30 may properly store the received communication condition information of the terminal.

The 3PCC module part 2102 sends a transfer instruction of session between the terminal A5b and the terminal B5c to the SIP control part 2104 (S1035). The moment of sending the transfer instruction may occur at the time of receiving the 180 Ringing (S1023) or receiving the 200 OK, for example. If REFER is sent at the moment of receiving the 180 Ringing, the transfer process proceeds, irrespective of whether the user of the terminal B5c answers the telephone or not, in which the secretary or telephone operator places the telephone in a hold state, and the communication partner at the other end takes the held telephone as an image, for example. On the other hand, if REFER is sent at the moment of receiving the 200 OK, the transfer process proceeds, after the user of the terminal B5c answers the telephone, in which the secretary or telephone operator talks with the communication partner at the other end on the phone and transfers a call as an image, for example. Also, the other moments may be employed.

The SIP control part 2104 sends a REFER message of the SIP to the call control device 30 (S1036). The REFER message includes the session identification information indicating the session to be transferred such as Call ID, for example.

The call control device 30 makes the negotiation about the communication capability between the terminal A5b and the terminal B5c at the moment of receiving the REFER. For example, the call control device 30 specifies the terminal A5b and the terminal B5c from the Call ID included in the REFER message. The call control device 30 can store associated the Call ID and the terminal identification information in a memory 310, at the time of receiving the INVITE message, for example. The call control device 30 sends a re-INVITE message to the terminal A5b (S1037). The re-INVITE message includes an offer-SDP describing a list of communication condition information between the terminal A5b and the terminal B5c. The terminal A5b, receiving the re-INVITE message, sends the 200 OK to the call control device 30 (S1038). The 200 OK includes the information for communicating with the terminal A5b, which is selected by the terminal A5b. The call control device 30 returns the ACK to the terminal A5b (S1039). The call control device 30 performs the same process for the terminal B5c as at the above steps S1037 to S1039 (S1040 to S1042). The 200 OK sent at step S1041 includes the information for communicating with the terminal B5c herein.

Since the SOAP-SIP adaptor 2 already acquires the communication condition information of the terminal A5b and the terminal B5c, the steps S1037 to S1042 may be omitted. In this case, the communication condition information common to the terminal A5b and the terminal B5c may be extracted, and the call control device 30 may pose with this extracted result at S1045 and following as described later.

The call control device 30 sends a 202 ACCEPT message of the SIP to the SIP control part 2104 (S1043). The SIP control part 2104 sends a response notification to the 3PCC module part 2102 (S1044).

The call control device 30 poses as the terminal B5c, and makes a request for connection destination change to the terminal A5b. For example, a re-INVITE message including the offer-SDP describing the information for communicating with the terminal B5c is sent to the terminal A5b (S1045). The information for communicating with the terminal B5c herein can be the information acquired at the step S1041 as described above. The terminal A5b sends the 200 OK (S1046). Similarly, the call control device 30 poses as the terminal A5b, and makes a request for connection destination change to the terminal B5c. For example, a re-INVITE message including the offer-SDP describing the information for communicating with the terminal A5b is sent to the terminal B5c (S1047). The information for communicating with the terminal A5b herein can be the information acquired at the step S1038 as described above. The terminal B5c sends the 200 OK (S1048). Also, the call control device 30 sends the ACK to the terminal A5b and the terminal B5c.

In the above way, the communication between the terminal A5b and the terminal B5c can be made without the interposition of the SOAP-SIP adaptor 2. The terminal A5b and the terminal B5c may directly communicate, as shown in the sequence chart, and the communication may be made via the SOAP-SIP adaptor 2 when the call control device 30 is not provided, or via the call control device 30 when the call control device 30 is provided.

Also, the call control device 30 sends a BYE message to the SIP control part 2104 (S1052, S1055). This BYE message disconnects the session with the terminal managed in the SOAP-SIP adaptor 2. For example, the BYE message at step S1052 copes with the session between the SOAP-SIP adaptor 2 and the terminal A5b and the BYE message at step S1055 copes with the session between the SOAP-SIP adaptor 2 and the terminal B5c. The SIP control part 2104 sends a disconnect request to the 3PCC module part 2102 (S1053, S1056). The SIP control part 2104 sends the 200 OK to the call control device 30 (S1055, S1057). The SOAP-SIP adaptor 2 releases the management of session between the terminal A5b and the terminal B5c in accordance with the disconnect request.

FIGS. 26A to 26D are the second sequence charts according to the third embodiment.

This sequence has a "hold" process added to the above first sequence. For example, a process for establishing the session with the terminal B5c can be performed by placing the session with the terminal A5b established by the call control device 30 in a hold state. Also, REFER can be sent to the call control device 30 by placing the session with the terminal B5c established by the call control device 30 in a hold state. This is effective to, for example, a system that can not process a plurality of calls in parallel.

The sequence from step S1001 to step S1011 is the same as the above first sequence. The 3PCC module part 2102, receiving a response notification to the call origination request for the terminal A at step S1010, sends a hold request for the terminal A5b to the SIP control part 2104 (S1014). The SIP control part 2104 sends an INVITE message for holding the session with the terminal A5b to the call control device 30 (S1015). The call control device 30, receiving the INVITE message, places the session with the terminal A5b in a hold state, and sends the 200 OK to the SIP control part 2104 (S1016). The SIP control part 2104 sends a response notification to the 3PCC module part 2102 (S1017), and returns the ACK to the call control device 30 (S1018).

After the above steps for holding, the process following step S1020 is performed. The sequence from step S1020 to step S1026 is the same as the above first sequence. The 3PCC module part 2102, receiving a response notification to the call origination request for the terminal B at step S1025, sends a hold request for the terminal B to the SIP control part 2104 (S1029). The SIP control part 2104 sends an INVITE message for holding the session with the terminal B5c to the call control device 30 in the same way as the above terminal A5b (S1030). The call control device 30, receiving the INVITE message, places the session with the terminal B5c in a hold state, and sends the 200 OK to the SIP control part 2104 (S1031). The SIP control part 2104 sends a response notification to the 3PCC module part 2102 (S1032), and returns the ACK to the call control device 30 (S1033). After the above steps for holding, the process following step S1035 is performed. The sequence from step S1035 to step S1057 is the same as the above first sequence.

FIGS. 27A to 27D are the third sequence charts according to the third embodiment.

This sequence has a process for sending and stopping a pseudo RBT that is added to the above first sequence.

The sequence from step S1001 to step S1011 is the same as the above first sequence. The 3PCC module part 2102, receiving a response notification to the call origination request for the terminal A at step S1010, for example, sends a pseudo RBT send request to the media stream control part 2103 (S1012). The media stream control part 2103, receiving the pseudo RBT send request, sends the pseudo RBT to the terminal A5b in accordance with the RTP (S1013), for example. The media stream control part 2103 may use an announcement or proper music to the effect that the partner is being called, for example, as the pseudo RBT. For example, the terminal A5b can be prevented from being silent at a stage where the establishment of session with the terminal A5b is completed and the establishment of session with the terminal B5c is started, or at a stage where the REFER message is sent to transfer the session to the call control device. This pseudo RBT can be continually sent until there is a stop request as will be described later.

While the pseudo RBT is being sent, for example, the process following step S1020 is performed. The sequence from step S1020 to step S1026 is the same as the above first sequence. The 3PCC module part 2102, receiving a response notification to the call origination request for the terminal B at step S1025, sends the pseudo RBT to the terminal B5c in the same way as the terminal A5b (S1027, S1028). After the above process, the process following step S1035 is performed. The sequence from step S1035 to step S1057 is the same as the above first sequence.

The 3PCC module part 2102 sends a pseudo RBT send stop request to the media stream control part 2103. The send timing may be after sending a transfer request from the 3PCC module part 2102 (S2001, S2002), or after receiving a response notification to the transfer request (S2003, S2004), for example. The media stream control part 2103 stops sending the pseudo RBT to the terminal A5b and the terminal B5c in accordance with the pseudo RBT send stop request.

FIGS. 28A to 28D are the fourth sequence charts according to the third embodiment.

This sequence has both a "hold" process and a process for sending and stopping the pseudo RBT that are added to the above first sequence.

First of all, the session between the SOAP-SIP adaptor 2 and the terminal A5b is established in accordance with an SOAP make Call Session Request (connection request) from the Web server 1 (S1001 to S1011). The details of each step are the same as described above, and the explanation of each step is omitted. Thereafter, the SOAP-SIP adaptor 2 sends a pseudo RBT to the terminal A5b (S1012 to S1013). Also, the SOAP-SIP adaptor 2 holds the session with the terminal A5b (S1014 to S1018). Herein, the 3PCC module part 2102 may send a pseudo RBT send stop request to the media stream control part 2103, and the media stream control part 2103 may stop sending the pseudo RBT to the terminal A5b (S1019). The process for stopping sending the pseudo RBT may be performed at the same timing as in the above third sequence.

Next, for the terminal B5c, similarly, the session between the SOAP-SIP adaptor 2 and the terminal B5c is established (S1020 to S1026), and the pseudo RBT is sent to the terminal B5c (S1027 to S1028). Also, the SOAP-SIP adaptor 2 holds the session with the terminal A5b (S1029 to S1033). Herein, the 3PCC module part 2102 may send a pseudo RBT send stop request to the media stream control part 2103, and the media stream control part 2103 may stop sending the pseudo RBT to the terminal B5c (S1034).

Thereafter, the SOAP-SIP adaptor 2 performs a process for transferring the session to the call control device 30 (S1035 to S1057).

FIGS. 29A to 29D are the fifth sequence charts according to the third embodiment.

This sequence is an example in which the process begins with the holding control.

The sequence from step S1001 to step S1004 is the same as the above first sequence. The 3PCC module part 2102 artificially places the terminal A and the terminal B in a hold state (S1014 to S1018, S1029 to S1033). The details of each step are the same as described above, and the explanation of each step is omitted.

In this state, the 3PCC module part 2102 sends a transfer request (S1035). This transfer request may include the identification information for identifying the terminal A and the terminal B. Also, in the above holding process, a hold request including the Call ID and the identification information of the terminal may be sent to the call control device, which stores associated the Call ID and the identification information of the terminal, and a transfer request including the Call ID may be sent in the same way as in the above sequence. The process following step S1035 is the same as in the above first sequence.

5. Fourth Embodiment

In this embodiment, whether or not the relay in the SOAP-SIP adaptor 2 or the process for providing the predetermined service is required is judged based on the communication condition information of each of a plurality of terminals having established the session in the process according to the above third embodiment. Also, the SOAP-SIP adaptor 2 performs a process for converting the media information, for example.

FIGS. 30A to 30D are the first sequence charts according to the fourth embodiment.

This sequence is an example in which a relay determination processing step (S2010) of the media stream control part 2103 is added to the first sequence according to the above third embodiment.

The sequence from step S1001 to step S1011 and from step S1020 to step S1026 is the same as the above first sequence.

The media stream control part 2103 of the SOAP-SIP adaptor 2 performs a relay determination process after step S1024, for example (S2010). The relay determination process may be performed after receiving the connection response (200 OK) in the session control with the terminal B, after the response notification to the 3PCC module part 2002 at step S1025 (call origination B), or after sending the ACK to the terminal B5c at step S1026. If the communication condition information (capability information) of the terminal is received at the other timing than the 200 OK, it may be performed after receiving this communication condition information.

Herein, an example of the SOAP-SIP adaptor relay determination process will be described below. In the relay determination process, a determination as to whether or not the relay in the SOAP-SIP adaptor 2 is required and a determination for available service at the time of relay are made using the predetermined keys. For example, if the IP version is unmatched, if the codec is inconsistent, or if there is additional service, the operation goes to the media relay sequence, or otherwise, the operation goes to the REFER sequence.

In the media relay sequence, if the session is placed in the hold state, the SOAP-SIP adaptor 2 sends a hold release request to release the holding and communicate the media between the terminals via the SOAP-SIP adaptor 2. The REFER sequence is the same as the process following step 1035.

The information serving as the key for judgment and the available service at the time of relay are exemplified below. The keys as shown below may be combined. For example, only a specific subscriber from the subscriber information of an SIP header may perform the trans-codec.

(1) Example of Using the SIP Header as the Key

As the key for judgment, for example, the from URI of the SIP or a P-Preferred-Identity header may be employed. The SIP header has the information indicating the sender (subscriber). The SOAP-SIP adaptor 2 searches a "subscriber-subscription service" table (subscription service table) with the subscriber information (subscriber identification information) extracted from the SIP header as the key, and judges the applicable service. The "subscriber-subscription service" table pre-stores the information of identifying the service (subscription service identification information) that the subscriber contracts, associated with the subscriber information. Examples of the service may include a speech communication recording service, a simultaneous interpretation service and a minutes service. The speech communication recording service involves recording the speech communication between the first terminal and the second terminal, for example. The simultaneous interpretation service involves simultaneously interpreting and transferring the speech communication between the first terminal and the second terminal. The minutes service involves documenting and storing the speech communication between the first terminal and the second terminal. The other proper services may be provided.

If there is the applicable service, the SOAP-SIP adaptor 2 does not send the REFER, but the terminal A5b and the terminal B5c are communicated via the SOAP-SIP adaptor 2 to provide the applicable service. For example, in the speech communication recording service, the speech communication between the terminal A5b and the terminal B5c is recorded. On the other hand, if there is no applicable service, the REFER is performed in the same way as in the third embodiment. The sequence of FIG. 30 shows an instance where the applicable service does not exist and the REFER is performed.

(2) Example of Using the Answer-SDP Received from the External Operation Apparatus and Analyzed as the Key As the key for judgment, for example, the s line (session information) included in the SDP may be employed. A "session type-provided service" table (provided service table) is searched with the s line as the key, to judge the presence or absence of applicable service. The "session type-provided service" table pre-stores the information of identifying the service, associated with the session type. The information of identifying the service may be the service that the subscriber contracts. If there is the applicable service, the SOAP-SIP adaptor 2 does not send the REFER, but the terminal A5b and the terminal B5c are communicated via the SOAP-SIP adaptor 2 to provide the applicable service. On the other hand, if there is no applicable service, the REFER is performed in the same way as in the third embodiment. In addition to the s line, the SDP has the information effective for determining the provided service, such as e line, p line and u line, which can be employed. The SDP line was disclosed in RFC2327 and RFC3264, for example.

(3) Example of Using 488 Response Received from the External Operation Apparatus as the Key If the corresponding apparatus (terminal A5b or terminal B5c) makes a 488 (warn code 300/301) response to an offer-SDP sent by the SOAP-SIP adaptor 2, the SOAP-SIP adaptor 2 performs the network protocol conversion between IPv4 and IPv6, for example. Herein, warn code 300/301 is a response code meaning a mismatch of the network protocol.

On the other hand, if the corresponding apparatus makes a 488 (warn code 305) response to the offer-SDP sent by the SOAP-SIP adaptor 2, the SOAP-SIP adaptor 2 performs the trans-codec. Herein, warn code 305 is a response code meaning a mismatch of the codec. Besides using the response code meaning the mismatch of the network protocol or the mismatch of the codec, the protocol used by the terminal or the identification information of the codec may be received and collated to judge the match/mismatch.

The SOAP-SIP adaptor 2 may further include a codec processing part. The codec processing part may be provided within the media stream control part 2103, or externally provided. For the trans-codec in the codec processing part, the appropriate methods may be used.

Another example of the SOAP-SIP adaptor relay determination process will be described below.

The SOAP-SIP adaptor 2 receives a connection response 200 OK including the communication condition information (information within the ans-SDP in the drawing, capability information) of the terminal A5b from the terminal A5b at step S1009. Also, the SOAP-SIP adaptor 2 generates and sends a connection request INVITE to the terminal B5c, using at least part of the communication condition information from the terminal A5b, for example, at step S1021. Further, it receives the 200 OK including the communication condition information of the terminal B5c from the terminal B5c at step S1024.

If the SOAP-SIP adaptor 2 receives the 200 OK at step S1024, for example, the media stream control part 2103 collates it with the previously received communication condition information of the terminal A5b, and judges whether or not the change of the codec of the media for communication between the terminals A and B is required. For example, if the terminal B5c selects part of the communication condition information of the terminal A5b, it is judged that the change is required. If the change is made, the changed communication condition information is sent to the terminal A5b, using an UPDATE message or INVITE message of the SIP. For example, the communication condition information selected by the terminal B5c is sent to the terminal A5b.

Thereby, the adjustment of media codec between the terminals A and B can be realized. The communication condition information is the port setting information corresponding to the codec, which is stored in the SDP field of the SIP message, for example.

FIGS. 31A to 31D are the second sequence charts according to the fourth embodiment.

This sequence is an example in which a processing judgment step (S2010) of the media stream control part 2103 is added to the fourth sequence according to the above third embodiment. The processing of each step is the same as described above, and the explanation of each step is omitted.

Though in this embodiment, it is shown by way of example that the processing judgment step is added to the first sequence and the fourth sequence of the above third embodiment, the processing judgment step may be added to any of the first to fifth sequences of the third embodiment.

The present invention is applicable in an IP network, for example.

What is claimed is:

1. A communication system comprising:
a server configured to receive a connection request message between a first terminal and a second terminal from an upper-level apparatus, and to establish a session with the first terminal and a session with the second terminal respectively; and
a call control device for managing the first terminal and the second terminal;
wherein:
the server, after establishing the session between the server and the first terminal and the session between the server and the second terminal, is configured to send a transfer request of the session to the call control device,
the call control device, upon receiving the transfer request, is configured to newly establish a session between the call control device and the first terminal and a session between the call control device and the second terminal, and to send a disconnect request for the session between the server and the first terminal and a disconnect request for the session between the server and the second terminal to the server, and
thereafter, the call control device is configured to manage the session between the call control device and the first terminal and the session between the call control device and the second terminal.

2. The communication system according to claim 1, wherein the transfer request is a REFER message of a Session Initiation Protocol ("SIP").

3. The communication system according to claim 1, wherein the server, upon receiving a message indicating calling or a message indicating a response confirmation in a process for establishing the session between the server and the first terminal and the session between the server and the second terminal, is configured to:
send a hold instruction for placing the session between the server and the first terminal or the session between the server and the second terminal in a hold state to the call control device: and
send a session establishment request for the session between the server and the second terminal or the transfer request to the call control device in the hold state.

4. The communication system according to claim 1, wherein the server, after establishing the session between the server and the first terminal or the session between the server and the second terminal, is configured to send a Ringing Back Tone ("RBT") to the first terminal or the second terminal.

5. The communication system according to claim 4, wherein the server, upon sending the transfer request to the call control device, or receiving a response notification for the transfer request from the call control device, is configured to stop sending the RBT.

6. The communication system according to claim 1, wherein the server is configured to:
extract predetermined key information from data received in establishing the sessions with the first and second terminals.

7. The communication system according to claim 6, wherein the key information is information indicating a mismatch between codecs, or identification information of a codec for use in the first and second terminals.

8. The communication system according to claim 6, wherein the key information is information indicating a mismatch between protocols, or identification information of a protocol for use in the first and second terminals.

9. The communication system according to claim 6, wherein the key information is subscriber identification information extracted from a Session Initiation Protocol ("SIP") header, and the server has a subscription service table in which the service identification information for identifying a service that the subscriber contracts is pre-stored associated with the subscriber identification information, and
wherein the server is configured to extract the subscriber identification information from the SIP header received in the process for establishing the session with the first and second terminals.

10. The communication system according to claim 9, wherein the service includes one or more of a speech communication recording service, a simultaneous interpretation service and a minutes service.

11. The communication system according to claim 6,
wherein the key information is part of Session Description Protocol ("SDP") information included in the data received in establishing the sessions with the first and second terminals,
wherein the server is configured to extract the predetermined SDP information from the data received in establishing the session with the first and second terminals.

12. The communication system according to claim 1, wherein the call control device is configured to specify the first terminal or the second terminal from session identification information included in the transfer request.

13. The communication system according to claim 1, wherein the call control device is configured to store session identification information, identification information for the first terminal, and identification information for the second terminal in association with each other when establishing the session between the server and the first terminal or the session between the server and the second terminal.

14. The communication system according to claim 1, wherein the call control device, after receiving the transfer request, is configured to send a first connection request message including communication condition information to the first terminal and to send a second connection request message including the communication condition information to the second terminal.

15. The communication system according to claim 1, wherein the call control device, after receiving the transfer request, is configured to:
(i) send a first connection request message including a list of communication condition information to the first terminal, and receive a first response message including communication condition information selected from the list, and
(ii) send a second connection request message including the list of communication condition information to the second terminal, and receive a second response message including communication condition information selected from the list.

16. The communication system according to claim 15, wherein the communication condition information is communication condition for communication between the first terminal and the second terminal.

17. The communication system according to claim 16, wherein each of the first connection request message and the second connection request message is a re-INVITE message of a SIP, and each of the first response message and the second response message is a 200 OK message of the SIP.

* * * * *